(12) United States Patent
Abhyanker et al.

(10) Patent No.: US 9,071,367 B2
(45) Date of Patent: Jun. 30, 2015

(54) EMERGENCY INCLUDING CRIME BROADCAST IN A NEIGHBORHOOD SOCIAL NETWORK

(71) Applicants: Raj V. Abhyanker, Cupertino, CA (US); Peter Jensen-Haxel, Mountian View, CA (US)

(72) Inventors: Raj V. Abhyanker, Cupertino, CA (US); Peter Jensen-Haxel, Mountian View, CA (US)

(73) Assignee: FATDOOR, INC., Mountain View, CA (US)

( * ) Notice: Subject to any disclaimer, the term of this patent is extended or adjusted under 35 U.S.C. 154(b) by 0 days.

(21) Appl. No.: 14/089,779

(22) Filed: Nov. 26, 2013

(65) Prior Publication Data

US 2014/0087780 A1 Mar. 27, 2014

Related U.S. Application Data

(63) Continuation-in-part of application No. 11/603,442, filed on Nov. 22, 2006, now abandoned, and a continuation-in-part of application No. 11/653,194, filed on Jan. 12, 2007, and a continuation-in-part of (Continued)

(51) Int. Cl.
*H04H 20/59* (2008.01)
*H04W 4/22* (2009.01)
(Continued)

(52) U.S. Cl.
CPC ............... *H04H 20/59* (2013.01); *H04W 4/22* (2013.01); *G06F 3/0484* (2013.01);
(Continued)

(58) Field of Classification Search
CPC ............................ H04W 4/021; G06Q 50/265
USPC ........................................................ 705/325

IPC ........................................................ H04W 4/021
See application file for complete search history.

(56) References Cited

U.S. PATENT DOCUMENTS 2,035,218 A 3/1936 Bloom
3,253,806 A 5/1966 Eickmann
(Continued)

FOREIGN PATENT DOCUMENTS

EP 1426876 A1 6/2004
KR 101069834 B1 10/2010
(Continued)

OTHER PUBLICATIONS

"Friends and Neighbors on the Web", 2001 by Lada A. Adamic et al. (pp. 9) http://www.hpl.hp.com/research/idl/papers/web10/fnn2.pdf.
(Continued)

*Primary Examiner* — Susanna M Meinecke Diaz
(74) *Attorney, Agent, or Firm* — Raj Abhyanker, P.C.

(57) ABSTRACT

Disclosed are a method, a device and a system of emergency including crime broadcast data generation and publication in a constrained geospatial vicinity around a broadcast location of a neighborhood social network. In one embodiment, the emergency broadcast data is radially distributed as a notification data through an on-page posting, an electronic communication, and/or a push notification delivered to (1) a set of recipients through an internet protocol (IP) based network associated with users and/or their user profiles around an epicenter defined at a set of geospatial coordinates associated with the emergency broadcast data generated through a computing device or (2) a set of service providers through a cellular network using the radial algorithm in addition to the set of recipients through the IP based network associated with users and/or their user profiles.

8 Claims, 42 Drawing Sheets

Related U.S. Application Data application No. 11/731,465, filed on Mar. 29, 2007, and a continuation-in-part of application No. 11/827,400, filed on Jul. 10, 2007, and a continuation-in-part of application No. 11/827,774, filed on Jul. 13, 2007, now abandoned, and a continuation-in-part of application No. 13/236,964, filed on Sep. 20, 2011, now abandoned, and a continuation-in-part of application No. 13/242,303, filed on Sep. 23, 2011, now abandoned, and a continuation-in-part of application No. 13/272,245, filed on Oct. 13, 2011, now Pat. No. 8,660,897, and a continuation-in-part of application No. 14/079,611, filed on Nov. 13, 2013.

(60) Provisional application No. 60/783,226, filed on Mar. 17, 2006, provisional application No. 60/817,470, filed on Jun. 28, 2006, provisional application No. 60/853,499, filed on Oct. 19, 2006, provisional application No. 60/854,230, filed on Oct. 25, 2006, provisional application No. 61/526,693, filed on Aug. 24, 2011, provisional application No. 61/894,443, filed on Oct. 23, 2013.

(51) Int. Cl.
| | | |
|---|---|---|
| *G06F 3/0484* | (2013.01) | |
| *G06Q 10/08* | (2012.01) | |
| *G06Q 10/10* | (2012.01) | |
| *G06Q 30/02* | (2012.01) | |
| *G06Q 50/00* | (2012.01) | |
| *H04W 76/00* | (2009.01) | |
| *H04W 4/02* | (2009.01) | |
| *G06Q 99/00* | (2006.01) | |
| *G06F 21/31* | (2013.01) | |

(52) U.S. Cl.
CPC ............ *H04W 76/007* (2013.01); *H04W 4/021* (2013.01); *G06Q 99/00* (2013.01); *G06F 21/31* (2013.01); *G06Q 10/087* (2013.01); *G06Q 10/10* (2013.01); *G06Q 30/02* (2013.01); *G06Q 50/01* (2013.01)

(56) References Cited

U.S. PATENT DOCUMENTS

| | | | | |
|---|---|---|---|---|
| 3,556,438 | A | | 1/1971 | Meditz |
| 3,762,669 | A | | 10/1973 | Curci |
| 4,161,843 | A | | 7/1979 | Hui |
| 5,032,989 | A | * | 7/1991 | Tornetta ................. 705/313 |
| 5,325,294 | A | | 6/1994 | Keene |
| 5,521,817 | A | | 5/1996 | Burdoin et al. |
| 5,581,630 | A | * | 12/1996 | Bonneau, Jr. ............. 382/116 |
| 5,584,025 | A | * | 12/1996 | Keithley et al. ............. 707/752 |
| 5,590,062 | A | | 12/1996 | Nagamitsu et al. |
| 5,671,342 | A | * | 9/1997 | Millier et al. ............. 345/418 |
| 5,805,810 | A | | 9/1998 | Maxwell |
| 5,831,664 | A | * | 11/1998 | Wharton et al. ............. 725/81 |
| 5,905,499 | A | | 5/1999 | McDowall et al. |
| 5,926,765 | A | * | 7/1999 | Sasaki ................. 455/456.1 |
| 5,930,474 | A | * | 7/1999 | Dunworth et al. ............ 709/217 |
| 5,937,413 | A | | 8/1999 | Hyun et al. |
| 5,940,806 | A | | 8/1999 | Danial |
| 6,024,288 | A | | 2/2000 | Gottlich et al. |
| 6,029,141 | A | | 2/2000 | Bezos et al. |
| 6,029,195 | A | | 2/2000 | Herz |
| 6,034,618 | A | | 3/2000 | Tatebayashi et al. |
| 6,036,601 | A | | 3/2000 | Heckel |
| 6,047,194 | A | | 4/2000 | Andersson |
| 6,073,138 | A | | 6/2000 | de l'Etraz et al. |
| 6,088,702 | A | * | 7/2000 | Plantz et al. ............. 1/1 |
| 6,175,831 | B1 | | 1/2001 | Weinreich et al. |
| 6,229,533 | B1 | | 5/2001 | Farmer et al. |
| 6,269,369 | B1 | | 7/2001 | Robertson |
| 6,308,177 | B1 | | 10/2001 | Israni et al. |
| 6,317,718 | B1 | * | 11/2001 | Fano ................. 705/14.39 |
| 6,336,111 | B1 | | 1/2002 | Ashby et al. |
| 6,339,745 | B1 | | 1/2002 | Novik |
| 6,401,085 | B1 | * | 6/2002 | Gershman et al. ............. 1/1 |
| 6,408,307 | B1 | * | 6/2002 | Semple et al. ............. 707/724 |
| 6,498,982 | B2 | | 12/2002 | Bellesfield et al. |
| 6,507,776 | B1 | | 1/2003 | Fox, III |
| 6,513,069 | B1 | | 1/2003 | Abato et al. |
| 6,532,007 | B1 | | 3/2003 | Matsuda |
| 6,542,813 | B1 | * | 4/2003 | Kovacs ................. 701/484 |
| 6,542,936 | B1 | | 4/2003 | Mayle et al. |
| 6,557,013 | B1 | | 4/2003 | Ziff et al. |
| 6,615,039 | B1 | | 9/2003 | Eldering |
| 6,629,136 | B1 | * | 9/2003 | Naidoo ................. 709/219 |
| 6,633,311 | B1 | | 10/2003 | Douvikas et al. |
| 6,636,803 | B1 | * | 10/2003 | Hartz et al. ............. 701/459 |
| 6,643,663 | B1 | | 11/2003 | Dabney et al. |
| 6,647,383 | B1 | | 11/2003 | August et al. |
| 6,654,800 | B1 | * | 11/2003 | Rieger, III ................. 709/223 |
| 6,658,410 | B1 | * | 12/2003 | Sakamaki et al. ............. 1/1 |
| 6,662,016 | B1 | * | 12/2003 | Buckham et al. ............. 455/457 |
| 6,684,196 | B1 | * | 1/2004 | Mini et al. ................. 705/14.34 |
| 6,687,878 | B1 | | 2/2004 | Eintracht et al. |
| 6,691,114 | B1 | * | 2/2004 | Nakamura ............. 1/1 |
| 6,711,414 | B1 | | 3/2004 | Lightman et al. |
| 6,716,101 | B1 | | 4/2004 | Meadows et al. |
| 6,719,570 | B2 | | 4/2004 | Tsuchioka |
| 6,721,748 | B1 | | 4/2004 | Knight et al. |
| 6,745,196 | B1 | * | 6/2004 | Colyer et al. ................. 707/608 |
| 6,750,881 | B1 | | 6/2004 | Appelman |
| 6,798,407 | B1 | | 9/2004 | Benman |
| 6,816,850 | B2 | | 11/2004 | Culliss |
| 6,834,229 | B2 | | 12/2004 | Rafiah et al. |
| 6,882,307 | B1 | | 4/2005 | Gifford |
| 6,883,748 | B2 | | 4/2005 | Yoeli |
| 6,889,213 | B1 | | 5/2005 | Douvikas et al. |
| 6,926,233 | B1 | | 8/2005 | Corcoran, III |
| 6,950,791 | B1 | | 9/2005 | Bray et al. |
| 6,968,179 | B1 | * | 11/2005 | De Vries ................. 455/414.1 |
| 6,968,513 | B1 | * | 11/2005 | Rinebold et al. ............. 715/854 |
| 6,987,976 | B2 | | 1/2006 | Kohar et al. |
| 7,006,881 | B1 | | 2/2006 | Hoffberg et al. |
| 7,013,292 | B1 | | 3/2006 | Hsu et al. |
| 7,024,455 | B2 | | 4/2006 | Yokobori et al. |
| 7,047,202 | B2 | | 5/2006 | Jaipuria et al. |
| 7,068,309 | B2 | | 6/2006 | Toyama et al. |
| 7,069,308 | B2 | | 6/2006 | Abrams |
| 7,072,849 | B1 | | 7/2006 | Filepp et al. |
| 7,080,019 | B1 | * | 7/2006 | Hurzeler ............. 705/6 |
| 7,080,096 | B1 | | 7/2006 | Imamura |
| 7,085,650 | B2 | * | 8/2006 | Anderson ................. 702/2 |
| 7,099,745 | B2 | | 8/2006 | Ebert |
| 7,099,862 | B2 | | 8/2006 | Fitzpatrick et al. |
| 7,117,254 | B2 | | 10/2006 | Lunt et al. |
| 7,136,915 | B2 | * | 11/2006 | Rieger, III ................. 709/223 |
| 7,158,878 | B2 | * | 1/2007 | Rasmussen et al. ............ 701/431 |
| 7,174,301 | B2 | * | 2/2007 | Florance et al. ............. 705/313 |
| 7,177,872 | B2 | | 2/2007 | Schwesig et al. |
| 7,188,153 | B2 | | 3/2007 | Lunt et al. |
| 7,209,803 | B2 | | 4/2007 | Okamoto et al. |
| 7,228,232 | B2 | | 6/2007 | Bodin et al. |
| 7,233,781 | B2 | * | 6/2007 | Hunter et al. ............. 455/404.1 |
| 7,249,123 | B2 | | 7/2007 | Elder et al. |
| 7,249,732 | B2 | | 7/2007 | Sanders, Jr. et al. |
| 7,251,647 | B2 | | 7/2007 | Hoblit |
| 7,269,590 | B2 | | 9/2007 | Hull et al. |
| 7,293,019 | B2 | | 11/2007 | Dumais et al. |
| 7,296,026 | B2 | | 11/2007 | Patrick et al. |
| 7,306,186 | B2 | | 12/2007 | Kusic |
| 7,353,034 | B2 | * | 4/2008 | Haney ............. 455/457 |
| 7,353,199 | B1 | | 4/2008 | DiStefano, III |
| 7,359,871 | B1 | | 4/2008 | Paasche et al. |
| 7,359,894 | B1 | | 4/2008 | Liebman et al. |
| 7,383,251 | B2 | | 6/2008 | Might |
| 7,386,542 | B2 | | 6/2008 | Maybury et al. |
| 7,424,438 | B2 | | 9/2008 | Vianello |
| 7,424,541 | B2 | | 9/2008 | Bourne |

(56) References Cited

U.S. PATENT DOCUMENTS

| | | | |
|---|---|---|---|
| 7,433,832 B1 | 10/2008 | Bezos et al. | |
| 7,433,868 B1 | 10/2008 | Satomi et al. | |
| 7,437,368 B1 | 10/2008 | Kolluri et al. | |
| 7,441,031 B2* | 10/2008 | Shrinivasan et al. | 709/225 |
| 7,447,685 B2* | 11/2008 | Nye | 1/1 |
| 7,447,771 B1 | 11/2008 | Taylor | |
| 7,454,524 B2 | 11/2008 | Jeong | |
| 7,477,285 B1 | 1/2009 | Johnson | |
| 7,478,324 B1 | 1/2009 | Ohtsu | |
| 7,480,867 B1 | 1/2009 | Racine et al. | |
| 7,487,114 B2* | 2/2009 | Florance et al. | 705/27.2 |
| 7,496,603 B2 | 2/2009 | Deguchi et al. | |
| 7,505,919 B2 | 3/2009 | Richardson | |
| 7,520,466 B2 | 4/2009 | Bostan | |
| 7,562,023 B2 | 7/2009 | Yamamoto | |
| 7,581,702 B2 | 9/2009 | Olson et al. | |
| 7,587,276 B2 | 9/2009 | Gold et al. | |
| 7,599,935 B2 | 10/2009 | La Rotonda et al. | |
| 7,658,346 B2 | 2/2010 | Goossen | |
| 7,668,405 B2 | 2/2010 | Gallagher | |
| 7,669,123 B2 | 2/2010 | Zuckerberg et al. | |
| 7,680,673 B2* | 3/2010 | Wheeler | 705/313 |
| 7,725,492 B2 | 5/2010 | Sittig et al. | |
| 7,734,254 B2 | 6/2010 | Frost et al. | |
| 7,756,467 B2 | 7/2010 | Bent et al. | |
| 7,792,815 B2 | 9/2010 | Aravamudan et al. | |
| 7,797,256 B2 | 9/2010 | Zuckerberg et al. | |
| 7,801,542 B1* | 9/2010 | Stewart | 455/518 |
| 7,802,290 B1 | 9/2010 | Bansal et al. | |
| 7,809,709 B1 | 10/2010 | Harrison, Jr. | |
| 7,809,805 B2 | 10/2010 | Stremel et al. | |
| 7,810,037 B1 | 10/2010 | Edwards et al. | |
| 7,812,717 B1* | 10/2010 | Cona et al. | 340/506 |
| 7,827,120 B1* | 11/2010 | Evans et al. | 705/344 |
| 7,827,208 B2 | 11/2010 | Bosworth et al. | |
| 7,827,265 B2 | 11/2010 | Cheever et al. | |
| 7,860,889 B1 | 12/2010 | Martino et al. | |
| 7,886,024 B2 | 2/2011 | Kelly et al. | |
| 7,933,810 B2 | 4/2011 | Morgenstern | |
| 7,937,291 B2 | 5/2011 | Carlson et al. | |
| 7,945,653 B2 | 5/2011 | Zuckerberg et al. | |
| 7,958,011 B1* | 6/2011 | Cretney et al. | 705/26.1 |
| 7,966,567 B2* | 6/2011 | Abhyanker | 715/757 |
| 7,970,657 B2 | 6/2011 | Morgenstern | |
| 8,013,734 B2* | 9/2011 | Saigh et al. | 340/539.13 |
| 8,027,943 B2 | 9/2011 | Juan et al. | |
| 8,032,413 B2 | 10/2011 | Carlson | |
| 8,064,590 B2* | 11/2011 | Abhyanker | 379/266.07 |
| 8,073,907 B2* | 12/2011 | Roumeliotis et al. | 709/204 |
| 8,095,430 B2* | 1/2012 | Abhyanker | 705/26.41 |
| 8,107,879 B2 | 1/2012 | Pering et al. | |
| 8,136,145 B2 | 3/2012 | Fetterman et al. | |
| 8,149,113 B2* | 4/2012 | Diem | 340/539.13 |
| 8,167,234 B1 | 5/2012 | Moore | |
| 8,171,128 B2 | 5/2012 | Zuckerberg et al. | |
| 8,190,357 B2* | 5/2012 | Abhyanker et al. | 701/408 |
| 8,204,776 B2* | 6/2012 | Abhyanker | 705/7.32 |
| 8,204,952 B2 | 6/2012 | Stremel et al. | |
| 8,225,376 B2 | 7/2012 | Zuckerberg et al. | |
| 8,249,943 B2 | 8/2012 | Zuckerberg et al. | |
| 8,271,057 B2* | 9/2012 | Levine et al. | 455/574 |
| 8,292,215 B2 | 10/2012 | Olm et al. | |
| 8,296,373 B2 | 10/2012 | Bosworth et al. | |
| 8,301,743 B2 | 10/2012 | Curran et al. | |
| 8,328,130 B2 | 12/2012 | Goossen | |
| 8,370,003 B2 | 2/2013 | So et al. | |
| 8,391,909 B2 | 3/2013 | Stewart | |
| 8,402,094 B2 | 3/2013 | Bosworth et al. | |
| 8,433,609 B2* | 4/2013 | Abhyanker | 705/14.1 |
| 8,433,650 B1* | 4/2013 | Thomas | 705/38 |
| 8,447,810 B2* | 5/2013 | Roumeliotis et al. | 709/204 |
| 8,521,127 B2* | 8/2013 | Strahs | 455/404.2 |
| 8,521,656 B2 | 8/2013 | Zimberoff et al. | |
| 8,543,143 B2* | 9/2013 | Chandra et al. | 455/466 |
| 8,600,602 B1 | 12/2013 | Mcandrew et al. | |
| 8,627,506 B2 | 1/2014 | Vera et al. | |
| 8,660,541 B1 | 2/2014 | Beresniewicz et al. | |
| 8,660,897 B2* | 2/2014 | Abhyanker | 705/14.64 |
| 8,695,919 B2 | 4/2014 | Shachor et al. | |
| 8,732,846 B2 | 5/2014 | D'Angelo et al. | |
| D710,454 S | 8/2014 | Barajas et al. | |
| 8,794,566 B2 | 8/2014 | Hutson | |
| 8,832,556 B2 | 9/2014 | Steinberg | |
| 2001/0005829 A1* | 6/2001 | Raveis, Jr. | 705/1 |
| 2001/0020955 A1 | 9/2001 | Nakagawa et al. | |
| 2001/0029501 A1* | 10/2001 | Yokobori et al. | 707/10 |
| 2001/0036833 A1 | 11/2001 | Koshima et al. | |
| 2001/0037721 A1 | 11/2001 | Hasegawa et al. | |
| 2001/0042087 A1 | 11/2001 | Kephart et al. | |
| 2001/0049616 A1 | 12/2001 | Khuzadi et al. | |
| 2001/0049636 A1 | 12/2001 | Hudda et al. | |
| 2002/0019739 A1 | 2/2002 | Juneau et al. | |
| 2002/0026388 A1 | 2/2002 | Roebuck | |
| 2002/0029350 A1 | 3/2002 | Cooper et al. | |
| 2002/0030689 A1 | 3/2002 | Eichel et al. | |
| 2002/0038225 A1 | 3/2002 | Klasky et al. | |
| 2002/0046243 A1 | 4/2002 | Morris et al. | |
| 2002/0049617 A1 | 4/2002 | Lencki et al. | |
| 2002/0059201 A1 | 5/2002 | Work | |
| 2002/0065691 A1* | 5/2002 | Twig et al. | 705/7 |
| 2002/0065739 A1* | 5/2002 | Florance et al. | 705/26 |
| 2002/0070967 A1* | 6/2002 | Tanner et al. | 345/764 |
| 2002/0077901 A1 | 6/2002 | Katz | |
| 2002/0078171 A1 | 6/2002 | Schneider | |
| 2002/0087506 A1 | 7/2002 | Reddy | |
| 2002/0090996 A1 | 7/2002 | Maehiro | |
| 2002/0091556 A1 | 7/2002 | Fiala et al. | |
| 2002/0097267 A1 | 7/2002 | Dinan et al. | |
| 2002/0099693 A1 | 7/2002 | Kofsky | |
| 2002/0103813 A1 | 8/2002 | Frigon | |
| 2002/0103892 A1* | 8/2002 | Rieger, III | 709/223 |
| 2002/0124053 A1 | 9/2002 | Adams et al. | |
| 2002/0130906 A1* | 9/2002 | Miyaki | 345/837 |
| 2002/0147638 A1 | 10/2002 | Banerjee et al. | |
| 2002/0156782 A1 | 10/2002 | Rubert | |
| 2002/0156917 A1 | 10/2002 | Nye | |
| 2002/0169662 A1 | 11/2002 | Claiborne | |
| 2002/0184496 A1 | 12/2002 | Mitchell et al. | |
| 2003/0004802 A1 | 1/2003 | Callegari | |
| 2003/0005035 A1 | 1/2003 | Rodgers | |
| 2003/0018521 A1* | 1/2003 | Kraft et al. | 705/14 |
| 2003/0023489 A1 | 1/2003 | McGuire et al. | |
| 2003/0023586 A1* | 1/2003 | Knorr | 707/3 |
| 2003/0033176 A1* | 2/2003 | Hancock | 705/6 |
| 2003/0061503 A1 | 3/2003 | Katz et al. | |
| 2003/0063072 A1 | 4/2003 | Brandenberg et al. | |
| 2003/0064705 A1* | 4/2003 | Desiderio | 455/412 |
| 2003/0069002 A1* | 4/2003 | Hunter et al. | 455/404 |
| 2003/0078897 A1* | 4/2003 | Florance et al. | 705/80 |
| 2003/0088520 A1 | 5/2003 | Bohrer et al. | |
| 2003/0145093 A1 | 7/2003 | Oren et al. | |
| 2003/0154213 A1* | 8/2003 | Ahn | 707/103 X |
| 2003/0177019 A1* | 9/2003 | Santos et al. | 705/1 |
| 2003/0177192 A1 | 9/2003 | Umeki et al. | |
| 2003/0200192 A1* | 10/2003 | Bell et al. | 707/1 |
| 2003/0218253 A1 | 11/2003 | Avanzino et al. | |
| 2003/0220807 A1* | 11/2003 | Hoffman et al. | 705/1 |
| 2003/0222918 A1 | 12/2003 | Coulthard | |
| 2003/0225632 A1 | 12/2003 | Tong et al. | |
| 2004/0002871 A1* | 1/2004 | Geranio | 705/1 |
| 2004/0003283 A1 | 1/2004 | Goodman et al. | |
| 2004/0021584 A1* | 2/2004 | Hartz et al. | 340/995.24 |
| 2004/0024846 A1 | 2/2004 | Randall et al. | |
| 2004/0030525 A1 | 2/2004 | Robinson et al. | |
| 2004/0030741 A1 | 2/2004 | Wolton et al. | |
| 2004/0039581 A1* | 2/2004 | Wheeler | 705/1 |
| 2004/0054054 A1* | 3/2004 | Sheha et al. | 700/56 |
| 2004/0088177 A1 | 5/2004 | Travis et al. | |
| 2004/0109012 A1 | 6/2004 | Kraus et al. | |
| 2004/0111302 A1 | 6/2004 | Falk et al. | |
| 2004/0128215 A1* | 7/2004 | Florance et al. | 705/28 |
| 2004/0135805 A1 | 7/2004 | Gottsacker et al. | |
| 2004/0139049 A1* | 7/2004 | Hancock et al. | 707/1 |
| 2004/0148275 A1 | 7/2004 | Achlioptas | |

(56) References Cited

U.S. PATENT DOCUMENTS

| | | |
|---|---|---|
| 2004/0153466 A1* | 8/2004 | Ziff et al. .................. 707/100 |
| 2004/0158488 A1* | 8/2004 | Johnson ........................ 705/14 |
| 2004/0162064 A1* | 8/2004 | Himmelstein ............ 455/422.1 |
| 2004/0166878 A1 | 8/2004 | Erskine et al. |
| 2004/0167787 A1 | 8/2004 | Lynch et al. |
| 2004/0186766 A1 | 9/2004 | Fellenstein et al. |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1* | 11/2004 | Gargi et al. .................... 707/3 |
| 2004/0257340 A1 | 12/2004 | Jawerth |
| 2004/0260604 A1* | 12/2004 | Bedingfield, Sr. ............ 705/14 |
| 2005/0015488 A1 | 1/2005 | Bayyapu |
| 2005/0018177 A1 | 1/2005 | Rosenberg et al. |
| 2005/0021750 A1* | 1/2005 | Abrams ........................ 709/225 |
| 2005/0027723 A1 | 2/2005 | Jones et al. |
| 2005/0034075 A1* | 2/2005 | Riegelman et al. ............ 715/714 |
| 2005/0044061 A1 | 2/2005 | Klemow |
| 2005/0049971 A1* | 3/2005 | Bettinger .................... 705/51 |
| 2005/0055353 A1* | 3/2005 | Marx et al. .................... 707/10 |
| 2005/0091027 A1 | 4/2005 | Zaher et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114759 A1 | 5/2005 | Williams et al. |
| 2005/0114783 A1* | 5/2005 | Szeto .......................... 715/747 |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0149432 A1* | 7/2005 | Galey .......................... 705/38 |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0197775 A1* | 9/2005 | Smith .......................... 702/3 |
| 2005/0197846 A1* | 9/2005 | Pezaris et al. .................... 705/1 |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1* | 9/2005 | Florance et al. .................... 705/1 |
| 2005/0203807 A1 | 9/2005 | Bezos et al. |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1* | 10/2005 | Douglass et al. ............ 340/506 |
| 2005/0235062 A1* | 10/2005 | Lunt et al. .................... 709/225 |
| 2005/0240580 A1 | 10/2005 | Zamir et al. |
| 2005/0251331 A1* | 11/2005 | Kreft .......................... 701/207 |
| 2005/0256756 A1 | 11/2005 | Lam et al. |
| 2005/0259648 A1 | 11/2005 | Kodialam et al. |
| 2005/0273346 A1* | 12/2005 | Frost .......................... 705/1 |
| 2005/0283497 A1 | 12/2005 | Nurminen et al. |
| 2005/0288957 A1* | 12/2005 | Eraker et al. .................... 705/1 |
| 2005/0288958 A1* | 12/2005 | Eraker et al. .................... 705/1 |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1* | 2/2006 | Johnson ........................ 235/462.1 |
| 2006/0023881 A1 | 2/2006 | Akiyama et al. |
| 2006/0026147 A1 | 2/2006 | Cone et al. |
| 2006/0036748 A1* | 2/2006 | Nusbaum et al. ............ 709/228 |
| 2006/0041543 A1 | 2/2006 | Achlioptas |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0059023 A1 | 3/2006 | Mashinsky |
| 2006/0064431 A1 | 3/2006 | Kishore et al. |
| 2006/0075335 A1 | 4/2006 | Gloor |
| 2006/0080613 A1 | 4/2006 | Savant |
| 2006/0085419 A1 | 4/2006 | Rosen |
| 2006/0089882 A1 | 4/2006 | Shimansky |
| 2006/0113425 A1 | 6/2006 | Rader |
| 2006/0123053 A1 | 6/2006 | Scannell |
| 2006/0136127 A1* | 6/2006 | Coch et al. .................... 701/208 |
| 2006/0136419 A1* | 6/2006 | Brydon et al. .................... 707/9 |
| 2006/0143066 A1 | 6/2006 | Calabria |
| 2006/0143067 A1 | 6/2006 | Calabria |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1* | 8/2006 | Heflin .......................... 705/1 |
| 2006/0190281 A1 | 8/2006 | Kott et al. |
| 2006/0194186 A1 | 8/2006 | Nanda |
| 2006/0200311 A1* | 9/2006 | Arutunian et al. ............ 701/210 |
| 2006/0200384 A1* | 9/2006 | Arutunian et al. ............ 705/14 |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0226281 A1 | 10/2006 | Walton |
| 2006/0229058 A1 | 10/2006 | Rosenberg |
| 2006/0229063 A1 | 10/2006 | Koch |
| 2006/0230061 A1 | 10/2006 | Sample et al. |
| 2006/0238383 A1* | 10/2006 | Kimchi et al. ............ 340/995.1 |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1* | 11/2006 | Pannu et al. .................... 726/1 |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270421 A1* | 11/2006 | Phillips et al. ................. 455/457 |
| 2006/0293976 A1 | 12/2006 | Nam |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0033064 A1 | 2/2007 | Abrahamsohn |
| 2007/0043947 A1 | 2/2007 | Mizikovsky et al. |
| 2007/0050360 A1 | 3/2007 | Hull et al. |
| 2007/0061405 A1 | 3/2007 | Keohane et al. |
| 2007/0078747 A1* | 4/2007 | Baack .......................... 705/37 |
| 2007/0078772 A1 | 4/2007 | Dadd |
| 2007/0099609 A1 | 5/2007 | Cai |
| 2007/0105536 A1* | 5/2007 | Tingo .......................... 455/414.1 |
| 2007/0106627 A1 | 5/2007 | Srivastava et al. |
| 2007/0112645 A1 | 5/2007 | Traynor et al. |
| 2007/0112729 A1* | 5/2007 | Wiseman et al. .................... 707/3 |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1* | 7/2007 | Godar .......................... 705/1 |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1* | 7/2007 | Ross .......................... 709/204 |
| 2007/0162942 A1* | 7/2007 | Hamynen et al. ............ 725/105 |
| 2007/0167204 A1 | 7/2007 | Lyle et al. |
| 2007/0174389 A1 | 7/2007 | Armstrong et al. |
| 2007/0179905 A1 | 8/2007 | Buch et al. |
| 2007/0192299 A1 | 8/2007 | Zuckerberg et al. |
| 2007/0208613 A1 | 9/2007 | Backer |
| 2007/0208802 A1* | 9/2007 | Barman et al. ................. 709/203 |
| 2007/0208916 A1 | 9/2007 | Tomita |

(56) References Cited

U.S. PATENT DOCUMENTS

| | | |
|---|---|---|
| 2007/0214141 A1 | 9/2007 | Sittig et al. |
| 2007/0218900 A1* | 9/2007 | Abhyanker ............... 455/435.1 |
| 2007/0219659 A1* | 9/2007 | Abhyanker et al. ............. 700/98 |
| 2007/0219712 A1* | 9/2007 | Abhyanker ................. 701/208 |
| 2007/0220174 A1* | 9/2007 | Abhyanker ................. 709/250 |
| 2007/0226314 A1 | 9/2007 | Eick et al. |
| 2007/0233291 A1 | 10/2007 | Herde et al. |
| 2007/0233367 A1* | 10/2007 | Chen et al. ................... 701/207 |
| 2007/0233375 A1 | 10/2007 | Garg et al. |
| 2007/0233582 A1* | 10/2007 | Abhyanker ................... 705/28 |
| 2007/0239552 A1* | 10/2007 | Sundaresan .................... 705/26 |
| 2007/0245002 A1* | 10/2007 | Nguyen et al. ................ 709/223 |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0259654 A1 | 11/2007 | Oijer |
| 2007/0260599 A1* | 11/2007 | McGuire et al. ................... 707/5 |
| 2007/0261071 A1 | 11/2007 | Lunt et al. |
| 2007/0266003 A1 | 11/2007 | Wong et al. |
| 2007/0266097 A1* | 11/2007 | Harik et al. ................... 709/204 |
| 2007/0266118 A1 | 11/2007 | Wilkins |
| 2007/0273558 A1 | 11/2007 | Smith et al. |
| 2007/0281689 A1* | 12/2007 | Altman et al. ............. 455/435.1 |
| 2007/0282987 A1 | 12/2007 | Fischer et al. |
| 2007/0288621 A1 | 12/2007 | Gundu et al. |
| 2007/0294357 A1* | 12/2007 | Antoine ........................ 709/206 |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0020814 A1 | 1/2008 | Kernene |
| 2008/0032666 A1* | 2/2008 | Hughes et al. ............. 455/404.1 |
| 2008/0032703 A1* | 2/2008 | Krumm et al. ............. 455/456.1 |
| 2008/0033739 A1 | 2/2008 | Zuckerberg et al. |
| 2008/0033776 A1 | 2/2008 | Marchese |
| 2008/0038370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065611 A1 | 3/2008 | Hepworth et al. |
| 2008/0070593 A1* | 3/2008 | Altman et al. ................. 455/457 |
| 2008/0070697 A1 | 3/2008 | Robinson et al. |
| 2008/0071929 A1 | 3/2008 | Motte et al. |
| 2008/0077581 A1 | 3/2008 | Drayer et al. |
| 2008/0077642 A1* | 3/2008 | Carbone et al. ......... 707/E17.14 |
| 2008/0086368 A1 | 4/2008 | Bauman et al. |
| 2008/0086458 A1 | 4/2008 | Robinson et al. |
| 2008/0091723 A1 | 4/2008 | Zuckerberg et al. |
| 2008/0097999 A1* | 4/2008 | Horan ............................ 707/10 |
| 2008/0104227 A1* | 5/2008 | Birnie et al. .................. 709/224 |
| 2008/0115082 A1 | 5/2008 | Simmons et al. |
| 2008/0115226 A1 | 5/2008 | Welingkar et al. |
| 2008/0117928 A1* | 5/2008 | Abhyanker ................... 370/431 |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1* | 6/2008 | Brewer et al. ................. 715/738 |
| 2008/0154733 A1 | 6/2008 | Wolfe |
| 2008/0155019 A1 | 6/2008 | Wallace et al. |
| 2008/0162211 A1 | 7/2008 | Addington |
| 2008/0162260 A1 | 7/2008 | Rohan et al. |
| 2008/0168068 A1* | 7/2008 | Hutheesing ................... 707/10 |
| 2008/0168175 A1* | 7/2008 | Tran ............................ 709/229 |
| 2008/0172173 A1* | 7/2008 | Chang et al. ................. 701/207 |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1* | 8/2008 | Abhyanker ....................... 705/1 |
| 2008/0208956 A1 | 8/2008 | Spiridellis et al. |
| 2008/0215994 A1 | 9/2008 | Harrison et al. |
| 2008/0221846 A1 | 9/2008 | Aggarwal et al. |
| 2008/0221984 A1* | 9/2008 | Abhyanker ..................... 705/14 |
| 2008/0222140 A1 | 9/2008 | Lagad et al. |
| 2008/0222308 A1* | 9/2008 | Abhyanker ................... 709/245 |
| 2008/0228719 A1* | 9/2008 | Abhyanker et al. ............... 707/3 |
| 2008/0228775 A1* | 9/2008 | Abhyanker et al. ............. 707/10 |
| 2008/0229424 A1* | 9/2008 | Harris et al. .................... 726/26 |
| 2008/0231630 A1 | 9/2008 | Shenkar et al. |
| 2008/0240397 A1* | 10/2008 | Abhyanker .............. 379/218.01 |
| 2008/0242317 A1* | 10/2008 | Abhyanker ................. 455/456.3 |
| 2008/0243598 A1* | 10/2008 | Abhyanker ..................... 705/12 |
| 2008/0243667 A1 | 10/2008 | Lecomte |
| 2008/0250025 A1* | 10/2008 | Abhyanker ..................... 707/10 |
| 2008/0255759 A1* | 10/2008 | Abhyanker ................... 701/209 |
| 2008/0263460 A1 | 10/2008 | Altberg et al. |
| 2008/0270158 A1* | 10/2008 | Abhyanker ....................... 705/1 |
| 2008/0270945 A1* | 10/2008 | Abhyanker ................... 715/848 |
| 2008/0281854 A1* | 11/2008 | Abhyanker ................... 707/102 |
| 2008/0284587 A1* | 11/2008 | Saigh et al. ............. 340/539.13 |
| 2008/0288277 A1 | 11/2008 | Fasciano |
| 2008/0288612 A1 | 11/2008 | Kwon |
| 2008/0294678 A1* | 11/2008 | Gorman et al. ............... 707/102 |
| 2008/0294747 A1* | 11/2008 | Abhyanker ................... 709/218 |
| 2008/0300979 A1* | 12/2008 | Abhyanker ..................... 705/14 |
| 2008/0301565 A1* | 12/2008 | Abhyanker ................... 715/744 |
| 2008/0306754 A1* | 12/2008 | Abhyanker ....................... 705/1 |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0319778 A1* | 12/2008 | Abhyanker ....................... 705/1 |
| 2008/0319806 A1* | 12/2008 | Abhyanker ....................... 705/5 |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0015582 A1* | 1/2009 | Abhyanker ................... 345/419 |
| 2009/0018850 A1* | 1/2009 | Abhyanker ....................... 705/1 |
| 2009/0018925 A1* | 1/2009 | Abhyanker ..................... 705/26 |
| 2009/0019004 A1* | 1/2009 | Abhyanker ....................... 707/3 |
| 2009/0019085 A1* | 1/2009 | Abhyanker ................. 707/104.1 |
| 2009/0019122 A1* | 1/2009 | Abhyanker ................... 709/206 |
| 2009/0019366 A1* | 1/2009 | Abhyanker ................... 715/706 |
| 2009/0019373 A1* | 1/2009 | Abhyanker ................... 715/751 |
| 2009/0024740 A1* | 1/2009 | Abhyanker ................... 709/225 |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1* | 2/2009 | Abhyanker et al. ............. 705/14 |
| 2009/0044254 A1 | 2/2009 | Tian |
| 2009/0048922 A1 | 2/2009 | Morgenstern et al. |
| 2009/0049070 A1 | 2/2009 | Steinberg |
| 2009/0049127 A1 | 2/2009 | Juan et al. |
| 2009/0061883 A1* | 3/2009 | Abhyanker ................... 455/445 |
| 2009/0061902 A1* | 3/2009 | Abhyanker ................. 455/456.3 |
| 2009/0063252 A1* | 3/2009 | Abhyanker ................... 705/10 |
| 2009/0063467 A1* | 3/2009 | Abhyanker ....................... 707/5 |
| 2009/0063500 A1 | 3/2009 | Zhai et al. |
| 2009/0063565 A1* | 3/2009 | Abhyanker ................. 707/104.1 |
| 2009/0064011 A1* | 3/2009 | Abhyanker ................... 715/764 |
| 2009/0064144 A1* | 3/2009 | Abhyanker ................... 718/100 |
| 2009/0069034 A1* | 3/2009 | Abhyanker ................. 455/456.3 |
| 2009/0070435 A1* | 3/2009 | Abhyanker ................... 709/218 |
| 2009/0102644 A1* | 4/2009 | Hayden ........................ 340/540 |
| 2009/0171950 A1 | 7/2009 | Lunenfeld |
| 2009/0247116 A1* | 10/2009 | Sennett et al. ............. 455/404.2 |
| 2009/0254971 A1 | 10/2009 | Herz et al. |
| 2009/0284530 A1 | 11/2009 | Lester et al. |
| 2010/0011081 A1 | 1/2010 | Crowley et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0083125 A1 | 4/2010 | Zafar et al. |

(56) References Cited

U.S. PATENT DOCUMENTS

| | | | |
|---|---|---|---|
| 2010/0106731 A1 | 4/2010 | Cartmell et al. | |
| 2010/0108801 A1 | 5/2010 | Olm et al. | |
| 2010/0243794 A1 | 9/2010 | Jermyn | |
| 2010/0279656 A1* | 11/2010 | Hazzani | 455/411 |
| 2011/0001020 A1 | 1/2011 | Forgac | |
| 2011/0060640 A1 | 3/2011 | Thompson et al. | |
| 2011/0066648 A1* | 3/2011 | Abhyanker et al. | 707/770 |
| 2011/0093340 A1 | 4/2011 | Kramer et al. | |
| 2011/0174920 A1 | 7/2011 | Yoeli | |
| 2011/0184643 A1* | 7/2011 | Abhyanker | 701/201 |
| 2011/0191181 A1 | 8/2011 | Blackhurst et al. | |
| 2011/0218864 A1 | 9/2011 | Pentz et al. | |
| 2011/0219318 A1* | 9/2011 | Abhyanker | 715/757 |
| 2011/0221657 A1 | 9/2011 | Haddick et al. | |
| 2011/0291851 A1* | 12/2011 | Whisenant | 340/686.1 |
| 2012/0123667 A1* | 5/2012 | Gueziec | 701/119 |
| 2012/0138732 A1 | 6/2012 | Olm et al. | |
| 2012/0166935 A1* | 6/2012 | Abhyanker | 715/234 |
| 2012/0232958 A1 | 9/2012 | Silbert | |
| 2012/0254774 A1 | 10/2012 | Patton | |
| 2013/0041761 A1 | 2/2013 | Voda | |
| 2013/0054317 A1* | 2/2013 | Abhyanker | 705/14.4 |
| 2013/0068876 A1 | 3/2013 | Radu | |
| 2013/0072114 A1* | 3/2013 | Abhyanker | 455/41.1 |
| 2013/0073375 A1* | 3/2013 | Abhyanker | 705/14.39 |
| 2013/0080217 A1* | 3/2013 | Abhyanker | 705/14.1 |
| 2013/0105635 A1 | 5/2013 | Alzu'bi et al. | |
| 2013/0110930 A1* | 5/2013 | Moon et al. | 709/204 |
| 2013/0159127 A1* | 6/2013 | Myslinski | 705/26.1 |
| 2013/0183924 A1* | 7/2013 | Saigh et al. | 455/404.2 |
| 2013/0297589 A1 | 11/2013 | Work et al. | |
| 2013/0317999 A1 | 11/2013 | Zimberoff et al. | |
| 2014/0032034 A1 | 1/2014 | Raptopoulos et al. | |
| 2014/0067167 A1 | 3/2014 | Levien et al. | |
| 2014/0108540 A1 | 4/2014 | Crawford | |
| 2014/0222908 A1 | 8/2014 | Park et al. | |
| 2014/0254896 A1 | 9/2014 | Zhou et al. | |
| 2014/0277834 A1 | 9/2014 | Levien et al. | |

FOREIGN PATENT DOCUMENTS

| | | |
|---|---|---|
| KR | 1020120121376 A | 7/2012 |
| WO | 2006020471 A1 | 2/2006 |
| WO | 2007113844 A1 | 10/2007 |
| WO | 2008105766 A1 | 9/2008 |
| WO | 2011106443 A1 | 9/2011 |
| WO | 2014121145 A1 | 8/2014 |

OTHER PUBLICATIONS

"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.

"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.

"Direct Annotation: A Drag-and-Drop Strategy for Labeling Photos", University of Maryland, 2000 by Ben Shneiderman et al. (pp. 8) http://hci12.cs.umd.edu/trs/2000-06/2000-06.pdf.

"Notification for Shared Annotation of Digital Documents", Technical Report Msr—TR-2001-87, Sep. 19, 2001 by A. J. Bernheim Brush et al. (pp. 9) http://research.microsoft.com/pubs/69880/tr-2001-87.pdf.

"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.

"Computer Systems and the Design of Organizational Interaction", by Fernando Flores et al. (pp. 20) http://cpe.njit.edu/dlnotes/CIS/CIS735/ComputerSystemsandDesign.pdf.

"ChipIn—the easy way to collect money", Louis' Really Useful Finds, Mar. 12. (p. 1) http://reallyusefulthings.tumblr.com/post/28688782/chipin-the-easy-way-to-collect-money.

* cited by examiner

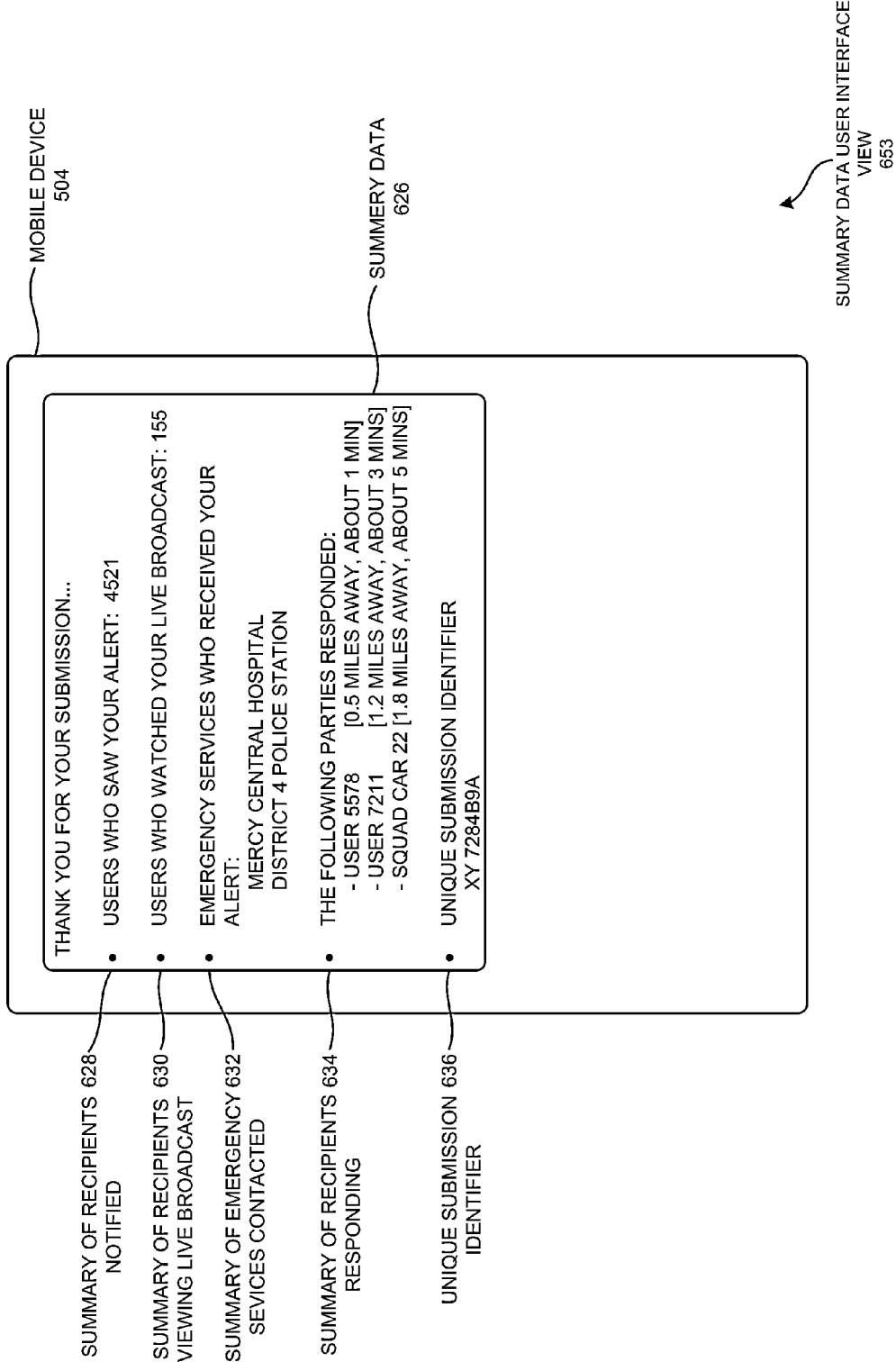

CLAIM YOUR GEOGRAPHIC LOCATION

WHICH ADDRESS ARE CLAIMING :

[201 BENSON AVE] —2002

DO YOU WANT TO SEE ADJACENT NEIGHBORHOODS ABOUT YOU   [NO ▶] —2004

UPLOAD PICTURE   [FAMILY PIC ▶]

PLEASE NOTE : YOU WILL NEED TO SUBMIT PROOF OF OWNERSHIP/ RESIDENCE IF DISPUTED —2006

CLAIM VIEW 2050

FIGURE 20

| EMAIL ADDRESS: | | 
|---|---|
| REPEAT EMAIL ADDRESS: | |
| FIRST NAME: | |
| LAST NAME: | |
| PASSWORD: | |
| REPEAT PASSWORD: | |
| GENDER: | ○ MALE   ○ FEMALE |
| INTERESTED IN MEETING PEOPLE FOR: ||
| ☑ HOBBIES          ○ FAMILIES  ○ SINGLES ☑ NEIGHBORHOOD WATCH  ○ STUDENTS ☑ FRIENDS ☑ HELP ☐ JUST HERE FOR HELP ||

DID A NEIGHBOR REFER YOU TO FATDOOR?
NEIGHBORS EMAIL ADDRESS: 
(TO AUTOMATICALLY CONNECT TO YOUR NEIGHBOR AND YOUR NEIGHBOR'S FRIENDS.)

| GROUPS: | ○ SCRAPBOOK CLUB<br>○ BIBLE STUDY GROUP<br>○ LONE STAR GROUP<br>○ NEIGHBORHOOD PROTECTORS CLUB |
|---|---|
| DATE OF BIRTH: | ▼  ▼  ▼ |
| COUNTRY: | ▼ |
| ZIP/POSTAL CODE: | (U.S. & CANADA ONLY) |
| HOME TOWN: | (WHERE YOU GREW UP) |
| OCCUPATION: | |
| INTERESTS: | (SEPARATE INTERESTS WITH COMMAS) |

FIGURE 25

| | |
|---|---|
| SUBJECT: | INVITATION TO JOIN FATDOOR FROM JOHN DOE, A NEIGHBOR TO YOU |
| FROM: | USER@DOMAIN.COM |
| TO: | (SEPARATE MULTIPLE ADDRESSES WITH COMMAS) ◄ ► [IMPORT FROM YOUR ADDRESS BOOK] |
| OPTIONAL PERSONAL MESSAGE: | ◄ ► |
| MESSAGE BODY: | JOHN DOE HAS INVITED YOU TO JOIN JOHN'S PERSONAL AND PRIVATE COMMUNITY AT FATDOOR, WHERE YOU AND JOHN CAN NETWORK WITH EACH OTHER'S NEIGHBORS.<br><br>FATDOOR IS AN ONLINE COMMUNITY THAT CONNECTS NEIGHBORS THROUGH NETWORKS OF OTHER NEIGHBORS FOR COMMUNITY SERVICE, SAFETY AND MAKING NEW FRIENDS.<br><br>YOU CAN USE FATDOOR TO:<br>* MEET NEW NEIGHBORS TO TALK WITH, THROUGH YOUR NEIGHBORS AND THEIR FRIENDS<br>* MAKE NEW FRIENDS<br>* HELP YOUR NEIGHBORS MEET NEW PEOPLE<br><br>ONCE YOU JOIN FATDOOR, YOU WILL BE AUTOMATICALLY CONNECTED TO YOUR NEIGHBOR JOHN, AND ALL OF JOHN'S FRIENDS.<br><br>CLICK BELOW TO JOIN FATDOOR<br>HTTP://WWW.FATDOOR.COM/JOIN.JSP?INVITE=140807 |

USER INTERFACE — 2702

EMERGENCY INCLUDING CRIME BROADCAST IN A NEIGHBORHOOD SOCIAL NETWORK

CLAIMS OF PRIORITY

This patent application is a continuation in part, claims priority from, and hereby incorporates by reference and claims priority from the entirety of the disclosures of the following cases and each of the cases on which they depend and further claim priority or incorporate by reference:

(1) U.S. Utility patent application Ser. No. 11/653,194 titled 'LODGING AND REAL PROPERTY IN A GEO-SPATIAL MAPPING ENVIRONMENT' filed on Jan. 12, 2007, which is a CIP of U.S. application Ser. No. 11/603,442, and provisional cases including 60/783,226 filed on Mar. 17, 2006, 60/817,470 filed on Jun. 28, 2006, 60/853,499 filed on Oct. 19, 2006, and 60/854,230 filed on Oct. 25, 2006.

(2) U.S. Utility patent application Ser. No. 11/827,400 titled 'HOT NEWS NEIGHBORHOOD BANTER IN A GEO-SPATIAL SOCIAL NETWORK' filed on Jul. 10, 2007.

(3) U.S. Utility patent application Ser. No. 11/731,465 titled 'WHITE PAGES AND YELLOW PAGE DIRECTORIES IN A GEO-SPATIAL ENVIRONMENT, filed on Mar. 29, 2007.

(4) U.S. Utility patent application Ser. No. 13/236,964 titled 'NEAR-FIELD COMMUNICATION ENABLED WEARABLE APPAREL GARMENT AND METHOD TO CAPTURE GEOSPATIALLY AND SOCIALLY RELEVANT DATA OF A WEARER OF THE WEARABLE APPAREL GARMENT AND/OR A USER OF A READER DEVICE ASSOCIATED THEREWITH' filed on Sep. 20, 2011.

(5) U.S. Utility patent application Ser. No. 13/242,303 titled 'GEOSPATIALLY CONSTRAINED GASTRONOMIC BIDDING' filed on Sep. 23, 2011.

(6) U.S. Utility patent application Ser. No. 13/272,245 titled 'NEAR-FIELD COMMUNICATION ENABLED WEARABLE APPAREL GARMENT AND METHOD TO CAPTURE GEOSPATIALLY AND SOCIALLY RELEVANT DATA OF A WEARER OF THE WEARABLE APPAREL GARMENT AND/OR A USER OF A READER DEVICE ASSOCIATED THEREWITH' filed on Oct. 13, 2011.

(7) U.S. Provisional patent application No. 61/894,443 titled 'RADIO BROADCAST, COMMERCE PUSHPINS, AND AUTOMATED PAGE UPDATES TO A GEOSPATIALLY CONSTRAINED NEIGHBORHOOD REGION THROUGH AN INTERNET NETWORK AND SEPARATELY A TRACKABLE SOCIAL COMMUNITY FORMED BASED ON TRACKABLE TAG BASED APPAREL THAT CREATES INCENTIVES AND CONNECTIONS BETWEEN USERS WEARING PROMOTIONAL APPAREL AND THOSE OTHER USERS READING THE TRACKABLE TAG ON THE APPAREL' filed on Oct. 23, 2013.

(8) U.S. Utility patent application Ser. No. 14/079,611 titled 'JOB BROADCAST DATA PUBLICATION THROUGH A WORK-OPPORTUNITY LISTING SERVER USING A RADIAL ALGORITHM TO AUTOMATICALLY DISTRIBUTE THE JOB BROADCAST DATA IN A THRESHOLD RADIAL DISTANCE FROM A SET OF GEOSPATIAL COORDINATES ASSOCIATED WITH A MOBILE DEVICE' filed on Nov. 13, 2013.

(9) U.S. Utility patent application Ser. No. 14/089,779 titled 'EMERGENCY INCLUDING CRIME BROADCAST IN A NEIGHBORHOOD SOCIAL NETWORK' filed on Nov. 26, 2013.

(10) U.S. Utility patent application Ser. No. 14/100,034 titled 'SOCIAL CONNECTIONS THROUGH TAGGABLE APPAREL' filed on Dec. 9, 2013.

(11) U.S. Utility patent application Ser. No. 14/102,474 titled 'SHORT-TERM RESIDENTIAL SPACES IN A GEO-SPATIAL MAPPING ENVIRONMENT' filed on Dec. 10, 2013.

(12) U.S. Utility patent application Ser. No. 14/141,432 titled 'HOLIDAY EXPRESSION AND MAPPING IN A GEOSPATIALLY CONSTRAINED SOCIAL NETWORK' filed on Dec. 26, 2013.

(13) U.S. Utility patent application Ser. No. 13/272,245 titled 'Near-field communication enabled wearable apparel garment and method to capture geospatially and socially relevant data of a wearer of the wearable apparel garment and/or a user of a reader device associated therewith' filed on Oct. 13, 2011.

(14) U.S. Provisional patent application No. 61/894,443 titled 'Radio broadcast, commerce pushpins, and automated page updates to a geospatially constrained neighborhood region through an internet network and separately a trackable social community formed based on trackable tag based apparel that creates incentives and connections between users wearing promotional apparel and those other users reading the trackable tag on the apparel' filed on Oct. 23, 2013.

(15) U.S. Utility patent application Ser. No. 14/079,611 titled 'Job broadcast data publication through a work-opportunity listing server using a radial algorithm to automatically distribute the job broadcast data in a threshold radial distance from a set of geospatial coordinates associated with a mobile device' filed on Nov. 13, 2013.

FIELD OF TECHNOLOGY

This disclosure relates generally to data processing devices and, more particularly, to a method, a device and/or a system of emergency including crime broadcast data generation and publication in a constrained geospatial vicinity around a broadcast location of a neighborhood social network.

BACKGROUND

A person may wish to call for emergency assistance (e.g., when they are having a heart attack or observing a violent crime). They may also wish to document evidence of a crime (for example, take photographs of a hit-and-run) and/or accident (e.g., a chemical spill or heart attack) in order to communicate the evidence or documentation to other people around them. They may be motivated by a desire to warn others (e.g., of a dangerous condition such as a gas leak), catch perpetrators (e.g., be able to identify a thief), or because they need immediate medical assistance (e.g., in need of aspirin to minimize the damage of a stroke). Under such circumstances, sending messages through a mobile device (e.g., by calling 911, sending a message through Twitter, posting on Facebook) may reach a large number irrelevant recipients who are not nearby or do not expect to be alerted to emergencies on social media and therefore may miss the important message. For example, dialing emergency services may only connect the caller with the emergency services at a central location (which may be a distance away from the location of the crime and/or emergency). Closer and more capable persons who are capable of confronting the emergency (e.g., a doctor living in a neighborhood vicinity around the emergency) may not be able to assist because they were not informed. However, trying to contact neighbors one-at-a-time maybe be inefficient, wasting critical time. The person experiencing the emergency or peril to choose between calling emergency services or attempting to contact neighbors who the caller may not know or may have difficulty getting ahold of. Therefore, help may not arrive in time.

SUMMARY

Disclosed are a method, a device and a system of emergency including crime broadcast data generation and publication in a constrained geospatial vicinity around a broadcast location of a neighborhood social network.

In one embodiment, a method of an emergency response server includes validating that an emergency broadcast data generated through a mobile device is associated with a verified user of the emergency response server using a processor and a memory. The method verifies that a set of geospatial coordinates associated with the emergency broadcast data generated through the mobile device are trusted based on a claimed geospatial location of the verified user of the emergency response server. In addition, the method determines that a time stamp associated with a creation date and a creation time of the emergency broadcast data generated through the mobile device is trusted based on the claimed geospatial location of the verified user of the emergency response server.

Furthermore, the emergency response server automatically publishes the emergency broadcast data generated through the mobile device on a set of user profiles having associated verified addresses in a threshold radial distance from the set of geospatial coordinates associated with the emergency broadcast data generated through the mobile device of the verified user of the emergency response server using a radial algorithm. The method may determine that the broadcast data is generated by the verified user of a neighborhood broadcast system when validating that the broadcast data is associated with the mobile device.

The method may also determine that an application on the mobile device is communicating the broadcast data to the emergency response network 150 when the broadcast data is processed. The verified user may be associated with a verified user profile in the emergency response network 150 through the application on the mobile device. The emergency broadcast data generated through the mobile device may be presented as an emergency alert pushpin of the emergency broadcast in a geospatial map surrounding pre-populated residential and/or business listings in a surrounding vicinity (such that the emergency alert pushpin of the emergency broadcast is automatically presented on the geospatial map in addition to being presented on the set of user profiles having associated verified addresses in the threshold radial distance from the set of geospatial coordinates associated with the emergency broadcast data generated through the mobile device of the verified user of the emergency response server).

The emergency broadcast data generated through the mobile device may be radially distributed through an on-page posting, an electronic communication, and/or a push notification (delivered to desktop and/or mobile devices). The emergency broadcast data may be associated with users and/or their user profiles around an epicenter defined at the set of geospatial coordinates associated with the emergency broadcast data.

The emergency broadcast data may be generated through the mobile device to all subscribed user profiles in a circular geo-fenced area defined by the threshold distance from the set of geospatial coordinates associated with the emergency broadcast data. Furthermore, the emergency broadcast data may be generated through the mobile device through the radial algorithm of a emergency response network 150 that measures a distance away of each address associated with each user profile 402 from the current geospatial location at the epicenter.

The verified user may be permitted to drag and drop the emergency alert pushpin on any location on the geospatial map and/or automatically determine a latitude and/or a longitude associated with a placed location. A police department, a fire department, and/or a hospital in a surrounding geospatial area to the set of geospatial coordinates associated with the emergency broadcast data generated through the mobile device may be notified.

Furthermore, the method may monitor whenever the mobile device associated with the verified user is used to generate an emergency telephone call. An audio data associated with the emergency telephone call through the mobile device may be captured through an emergency capture module of the emergency response server. Also, a transcript of the audio data through a transcription module of the emergency response server may be generated. A notification of the electronic telephone call, the audio data associated with the electronic telephone call, and/or the transcript of the electronic telephone call may be automatically broadcast through the on-page posting, the electronic communication, and/or the push notification (delivered to desktop and/or mobile devices associated with users and/or their user profiles around the epicenter defined at the set of geospatial coordinates associated with the emergency broadcast data generated through the mobile device using the radial algorithm). The geospatial coordinates may be extracted from a metadata associated with the emergency broadcast data generated through the mobile device.

The geospatial coordinated may be extracted when verifying that the set of geospatial coordinates associated with the emergency broadcast data generated through the mobile device are trusted based on the claimed geospatial location of the verified user of the emergency response server. A relative match between a persistent clock associated with the emergency response server and/or a digital clock of the mobile device may determine that the time stamp associated with the creation date and/or time of the emergency broadcast data generated through the mobile device is accurate and/or therefore trusted. The emergency broadcast data generated through the mobile device may be automatically deleted on a set of user profiles having associated verified addresses in the threshold radial distance from the set of geospatial coordinates associated with the emergency broadcast data generated through the mobile device of the verified user of the emergency response server based on an emergency alert expiration time.

A set of residential addresses each associated with a resident name in a neighborhood surrounding the mobile device may be geocoded. The set of residential addresses each associated with the resident name as the set of user profiles in the threshold radial distance from the claimed geospatial location of the verified user of the emergency response server may be populated in a neighborhood curation system communicatively coupled with the emergency response server.

The verified user may be permitted to modify content in each of the set of user profiles. The modified content may be tracked through the neighborhood curation system. A reversible history journal associated with each of the set of user profiles may be generated such that a modification of the verified user can be undone on a modified user profile page. An editing credibility of the verified user may be determined based on an edit history of the verified user and/or a community contribution validation of the verified user by other users of the neighborhood curation system.

The emergency broadcast data generated through the mobile device may be automatically published to the set of user profiles having associated verified addresses in the threshold radial distance from the claimed geospatial location of the verified user of the emergency response server using the radial algorithm. A claim request of the verified user generating the emergency broadcast data generated through the mobile device through the mobile device may be processed to be associated with an address of the neighborhood curation system.

It may be determined if the claimable neighborhood in the neighborhood curation system is associated with a private neighborhood community in the claimable neighborhood of the neighborhood curation system. The verified user may be associated with the private neighborhood community in the claimable neighborhood of the neighborhood curation system if the private neighborhood community has been activated by the verified user and/or a different verified user. The verified user may be permitted to draw a set of boundary lines in a form of a geospatial polygon such that the claimable neighborhood in a geospatial region surrounding the claim request creates the private neighborhood community in the neighborhood curation system if the private neighborhood community is inactive.

The method may verify the claim request of the verified user generating the emergency broadcast data generated through the mobile device through the mobile device to be associated with a neighborhood address of the neighborhood curation system when the address is determined to be associated with a work address and/or a residential address of the verified user.

The emergency broadcast data generated through the mobile device may be simultaneously published on the private neighborhood community associated with the verified user generating the emergency broadcast data generated through the mobile device through the mobile device in the threshold radial distance from the address associated with the claim request of the verified user of the neighborhood curation system (when automatically publishing the emergency broadcast data generated through the mobile device on a set of user profiles having associated verified addresses) in the threshold radial distance from the claimed geospatial location of the verified user of the emergency response server based on a set of preferences of the verified user using the radial algorithm.

A summary data may be provided to the verified user generating the emergency broadcast data generated through the mobile device through the mobile device of how many user profile pages were updated with an alert of the emergency broadcast data generated through the mobile device when publishing the emergency broadcast data generated through the mobile device (in the private neighborhood community and/or the set of user profiles having associated verified addresses in the threshold radial distance from the claimed geospatial location of the verified user of the emergency response server) based on the set of preferences of the verified user.

The emergency broadcast data generated through the mobile device may be live broadcast to the different verified user and/or other verified users in the private neighborhood community and/or currently within the threshold radial distance from the current geospatial location through a multicast algorithm of the emergency response server such that a live broadcast multicasts to a plurality of data processing systems associated with each of the different user and/or the other verified users simultaneously when the mobile device of the verified user generating the live-broadcast enables broadcasting of the emergency broadcast data generated through the mobile device to any one of a geospatial vicinity around the mobile device of the verified user generating the broadcast and/or in any private neighborhood community in which the verified user has a non-transitory connection.

The different verified user and/or other verified users in the private neighborhood community may be permitted to bi-directionally communicate with the verified user generating the broadcast through the emergency response server. Any private neighborhood community in which the verified user has the non-transitory connection may be the residential address of the verified user and/or a work address of the verified user that has been confirmed by the emergency response server as being associated with the verified user. The threshold distance may be between 0.2 and/or 0.4 miles from the set of geospatial coordinates associated with the emergency broadcast data generated through the mobile device to optimize a relevancy of the live-broadcast.

The emergency response server may include a crowd-sourced moderation algorithm in which multiple neighbors to a geospatial area determine what content contributed to the emergency response server persists and which is deleted. Additionally, the emergency response server may permit users to mute messages of specific verified users to prevent misuse of the emergency response server.

In another aspect, the method of an emergency response server includes determining that a time stamp associated with a creation date and a creation time of an emergency broadcast data generated through the mobile device is trusted based on the claimed geospatial location of the user of the emergency response server using a processor and a memory. The method includes automatically publishing the emergency broadcast data generated through the mobile device on a set of user profiles having associated verified addresses in a threshold radial distance from the set of geospatial coordinates associated with the emergency broadcast data generated through the mobile device of the user of the emergency response server using a radial algorithm.

In addition, the method includes radially distributing the emergency broadcast data as a notification data through an on-page posting, an electronic communication, and/or a push notification delivered to either (1) a set of recipients through an internet protocol (IP) based network associated with users and their user profiles around an epicenter defined at the set of geospatial coordinates associated with the emergency broadcast data generated through the computing device, or (2) a set of emergency services accessible by the emergency response server through a cellular network using the radial algorithm in addition to the set of recipients through the IP based network associated with users and their user profiles.

In yet another aspect, a system includes an emergency response server with a processor and a memory to automatically publish the emergency broadcast data on a set of user profiles having associated verified addresses in a threshold radial distance from the set of geospatial coordinates associated with the emergency broadcast data of a verified user of the emergency response server using a radial algorithm. The system also includes a network and a mobile device communicatively coupled with the emergency response server through the network to generate the emergency broadcast data using a camera, a microphone, and a sensory capability of the mobile device and/or to generate a captured data that is appended with a present geospatial location and a time stamp associated with a creation date and a creation time of captured data to create the emergency broadcast data.

A validation module may determine that an emergency broadcast data generated through a mobile device is associated with a verified user of the emergency response server using the processor and the memory and/or to determine that the emergency broadcast data is generated by the verified user of the neighborhood broadcast system when validating that the broadcast data is associated with the mobile device. A validation module may ensure that a set of geospatial coordinates associated with the emergency broadcast data generated through the mobile device are trusted based on a claimed geospatial location of the verified user of the emergency response server.

A time stamp module may ensure that a time stamp associated with a creation date and/or a creation time of the emergency broadcast data generated through the mobile device is trusted based on the claimed geospatial location of the verified user of the emergency response server. A listing module may automatically publish the emergency broadcast data generated through the mobile device on a set of user profiles having associated verified addresses in a threshold radial distance from the set of geospatial coordinates associated with the emergency broadcast data generated through the mobile device of the verified user of the emergency response server using a radial algorithm.

An application module may determine that an application on the mobile device is communicating the broadcast data to the emergency response network 150 when the broadcast data is processed, and/or to associate the verified user with a verified user profile in the emergency response network 150 through the application on the mobile device.

A pushpin module may present the emergency broadcast data generated through the mobile device as an emergency alert pushpin of the emergency broadcast in a geospatial map surrounding pre-populated residential and/or business listings in a surrounding vicinity, such that the emergency alert pushpin of the emergency broadcast is automatically presented on the geospatial map in addition to being presented on the set of user profiles having associated verified addresses in the threshold radial distance from the set of geospatial coordinates associated with the emergency broadcast data generated through the mobile device of the verified user of the emergency response server.

A radial distribution module may radially distribute the emergency broadcast data generated through the mobile device through an on-page posting, an electronic communication, and/or a push notification delivered to desktop and/or mobile devices associated with users and/or their user profiles around an epicenter defined at the set of geospatial coordinates associated with the emergency broadcast data generated through the mobile device to all subscribed user profiles in a circular geo-fenced area defined by the threshold distance from the set of geospatial coordinates associated with the emergency broadcast data generated through the mobile device through the radial algorithm of a emergency response network 150 that measures a distance away of each address associated with each user profile 402 from the current geospatial location at the epicenter. A placement module may enable the verified user to drag and/or drop the emergency alert pushpin on any location on the geospatial map, and/or automatically determining a latitude and/or a longitude associated a placed location.

A notification module automatically notify a police department, a fire department, and/or a hospital in a surrounding geospatial area to the set of geospatial coordinates associated with the emergency broadcast data generated through the mobile device.

An emergency surveillance module may monitor whenever the mobile device associated with the verified user is used to generate an emergency telephone call. An emergency capture module may capture an audio data associated with the emergency telephone call made through the mobile device. A transcript may be generated from a transcript of the audio data through a transcription module of the emergency response server.

An auto-notification module may automatically broadcast a notification of the electronic telephone call, the audio data associated with the electronic telephone call, and/or the transcript of the electronic telephone call through the on-page posting, the electronic communication, and/or the push notification delivered to desktop and/or mobile devices associated with users and/or their user profiles around the epicenter defined at the set of geospatial coordinates associated with the emergency broadcast data generated through the mobile device using the radial algorithm.

An extraction module may separate the geospatial coordinates from a metadata associated with the emergency broadcast data generated through the mobile device when verifying that the set of geospatial coordinates associated with the emergency broadcast data generated through the mobile device are trusted based on the claimed geospatial location of the verified user of the emergency response server.

A matching module may determine a relative match between a persistent clock associated with the emergency response server and/or a digital clock of the mobile device to determine that the time stamp associated with the creation date and/or time of the emergency broadcast data generated through the mobile device is accurate and/or therefore trusted. A deletion module may automatically remove the emergency broadcast data generated through the mobile device on a set of user profiles having associated verified addresses in the threshold radial distance from the set of geospatial coordinates associated with the emergency broadcast data generated through the mobile device of the verified user of the emergency response server based on an emergency alert expiration time. A plotting module may geocode a set of residential addresses each associated with a resident name in a neighborhood surrounding the mobile device.

A data-seeding module may prepopulate the set of residential addresses each associated with the resident name as the set of user profiles in the threshold radial distance from the claimed geospatial location of the verified user of the emergency response server in a neighborhood curation system communicatively coupled with the emergency response server. A modification module may alter content in each of the set of user profiles. A discovery module may track the modified content through the neighborhood curation system.

An undo module may generate a reversible history journal associated with each of the set of user profiles such that a modification of the verified user can be undone on a modified user profile page. A reputation module may determine an editing credibility of the verified user based on an edit history of the verified user and/or a community contribution validation of the verified user by other users of the neighborhood curation system.

A publication module may automatically publish the emergency broadcast data generated through the mobile device to the set of user profiles having associated verified addresses in a threshold radial distance from the claimed geospatial location of the verified user of the emergency response server using the radial algorithm. A claiming module may process a claim request of the verified user generating the emergency broadcast data generated through the mobile device through the mobile device to be associated with an address of the neighborhood curation system. A private-neighborhood module may determine if the claimable neighborhood in the neighborhood curation system is associated with a private neighborhood community in the claimable neighborhood of the neighborhood curation system.

An association module may associate the verified user with the private neighborhood community in the claimable neighborhood of the neighborhood curation system if the private neighborhood community has been activated by the verified user and/or a different verified user. A boundary module may permit the verified user to draw a set of boundary lines in a form of a geospatial polygon such that the claimable neighborhood in a geospatial region surrounding the claim request creates the private neighborhood community in the neighborhood curation system if the private neighborhood community is inactive. An address type module may verify the claim request of the verified user generating the emergency broadcast data generated through the mobile device through the mobile device to be associated with a neighborhood address of the neighborhood curation system when the address is determined to be associated with a work address and/or a residential address of the verified user.

A concurrency module may simultaneously publish the emergency broadcast data generated through the mobile device on the private neighborhood community associated with the verified user generating the emergency broadcast data generated through the mobile device through the mobile device in the threshold radial distance from the address associated with the claim request of the verified user of the neighborhood curation system when automatically publishing the emergency broadcast data generated through the mobile device on a set of user profiles having associated verified addresses in a threshold radial distance from the claimed geospatial location of the verified user of the emergency response server based on a set of preferences of the verified user using the radial algorithm.

A summary module may generate a summary data to the verified user generating the emergency broadcast data generated through the mobile device through the mobile device of how many user profile pages were updated with an alert of the emergency broadcast data generated through the mobile device when publishing the emergency broadcast data generated through the mobile device in the private neighborhood community and/or the set of user profiles having associated verified addresses in the threshold radial distance from the claimed geospatial location of the verified user of the emergency response server based on the set of preferences of the verified user.

A live broadcast module may live broadcast the emergency broadcast data generated through the mobile device to the different verified user and/or other verified users the private neighborhood community and/or currently within the threshold radial distance from the current geospatial location through a multicast algorithm of the emergency response server such that a live broadcast multicasts to a plurality of data processing systems associated with each of the different user and/or the other verified users simultaneously when the mobile device of the verified user generating the live-broadcast enables broadcasting of the emergency broadcast data generated through the mobile device to any one of a geospatial vicinity around the mobile device of the verified user generating the broadcast and/or in any private neighborhood community in which the verified user has a non-transitory connection.

A bi-directional communication module may permit the different verified user and/or other verified users in the private neighborhood community to bi-directionally communicate with the verified user generating the broadcast through the emergency response server. A non-transitory module may determine any private neighborhood community in which the verified user has a non-transitory connection is a residential address of the verified user and/or a work address of the verified user that has been confirmed by the emergency response server as being associated with the verified user. A threshold module may automatically set the threshold distance between 0.2 and/or 0.4 miles from the set of geospatial coordinates associated with the emergency broadcast data generated through the mobile device to optimize a relevancy of the live-broadcast. A moderation module may apply a crowdsourced moderation algorithm in which multiple neighbors to a geospatial area determine what content contributed to the emergency response server persists and/or which is deleted. A muting module may permit users to mute messages of specific verified users to prevent misuse of the emergency response server.

The emergency response server may permit the emergency broadcast data to be disseminated to adjacent neighborhoods that have been claimed by different users in a manner such that the emergency broadcast data is optionally disseminated to the surrounding claimed neighborhoods based on a preference of the verified user. A claimed neighborhood of the verified user may be activated based on a minimum number of other verified users in the threshold radial distance that have been verified through a primary residential address associated with each of the other verified users through at least one of a post card verification, a utility bill verification, a privately-published access code, and a neighbor vouching method. Access to the emergency broadcast data may be restricted to the claimed neighborhood of the verified user. Access to the emergency broadcast data may be denied to users having verified addresses outside the claimed neighborhood of the verified user.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 6D is a summary data user interface view of the mobile device of FIG. 5 in which the user may see the recipients of the broadcast, the recipients watching the live feed of FIG. 6C, and which emergency services of FIG. 3 were contacted, according to one embodiment.

FIG. 20 is a user interface view of claim view, according to one embodiment.

FIG. 25 is an exemplary graphical user interface view for data collection, according to one embodiment.

FIG. 27 is an exemplary graphical user interface view of an invitation, according to one embodiment.

Other features of the present embodiments will be apparent from the accompanying drawings and from the detailed description that follows.

DETAILED DESCRIPTION

Example embodiments, as described below, may be used to provide a method, a system and/or a device of emergency including crime broadcast data generation and publication in a constrained geospatial vicinity around a broadcast location of a neighborhood social network. Although the present embodiments have been described with reference to specific example embodiments, it will be evident that various modifications and changes may be made to these embodiments without departing from the broader spirit and scope of the various embodiments.

Figure 1:
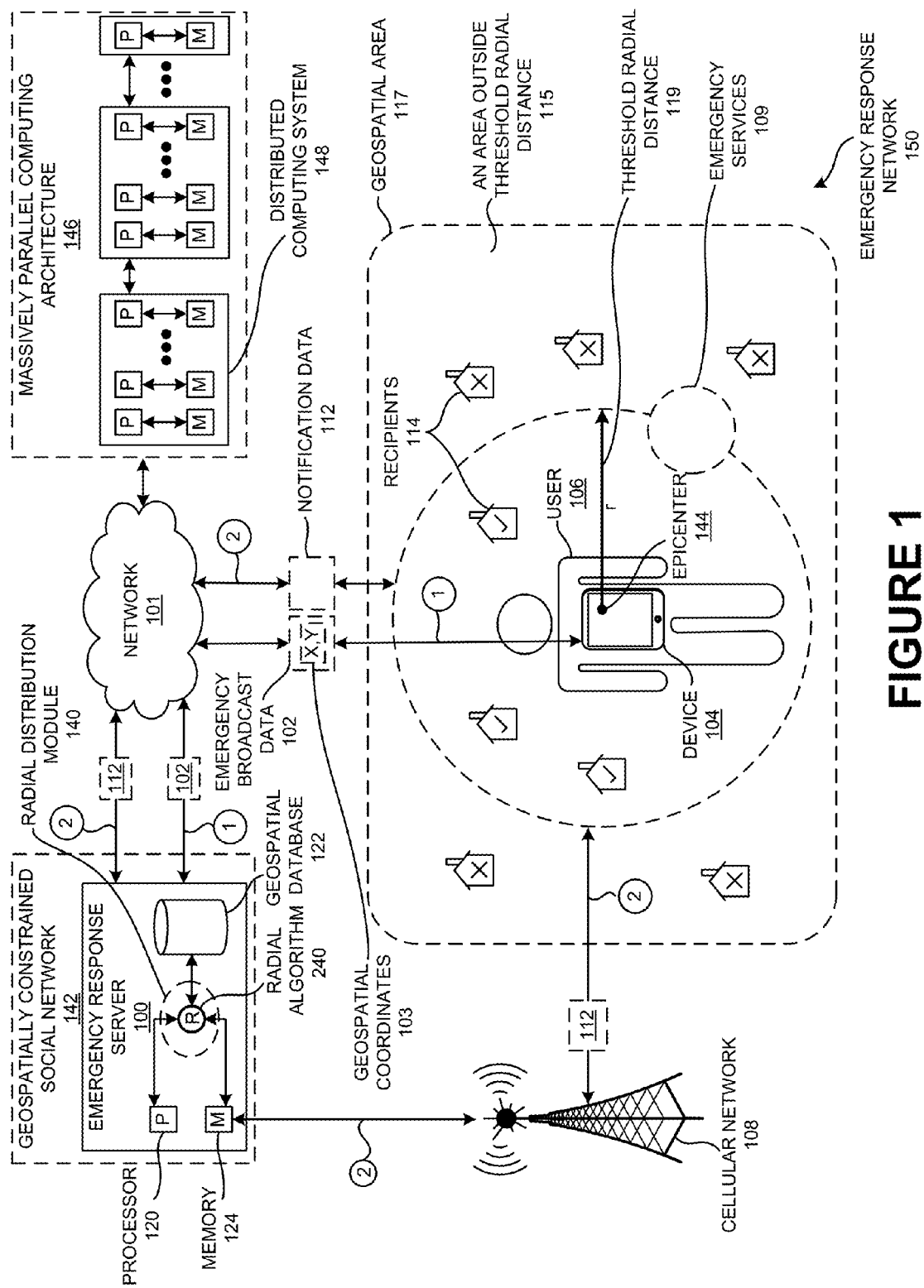
FIG. 1 is a network view of an emergency response server having a radial distribution module communicating with a device that generates a radial broadcast through an internet protocol network using a radial algorithm of the radial distribution module of the emergency response server, according to one embodiment.

FIG. 1 is a network view of an emergency response server having a radial distribution module communicating with a device that generates a radial broadcast through an internet protocol network using a radial algorithm of the radial distribution module of the emergency response server, according to one embodiment.

Particularly, FIG. 1 illustrates an emergency response network 150, according to one embodiment. The embodiment of FIG. 1 describes an emergency response server 100, a network 101, an emergency broadcast data 102, a set of geospatial coordinates 103, a device 104 (e.g., a mobile device 504), a user 106, a cellular network 108, emergency services 109 (including a hospital 309A, a police department 309B and a fire department 309C as will be described in FIG. 3), a notification data 112, a set of recipients 114, an area outside the threshold radial distance 115, a geospatial area 117, a threshold radial distance 119, a processor 120, a geospatial database 122, a memory 124, a radial distribution module 140 (e.g., that applies a radial algorithm 240 of FIG. 2 using a series of modules working in concert as described in FIG. 2), a geospatially constrained social network 142 (e.g. a global neighborhood environment), an epicenter 144, a massively parallel computing architecture 146, and a distributed computing system 148.

The emergency response server 100 includes a processor 120, a memory 124, and a geospatial database 122, according to the embodiment of FIG. 1. The emergency response server 100 may be one or more server side data processing systems (e.g., web servers operating in concert with each other) that operate in a manner that provide a set of instructions to any number of client side devices (e.g., the device 104 (e.g., a mobile device 504)) communicatively coupled with the emergency response server 100 through the network 101. For example, the emergency response server 100 may be a computing system (e.g., or a group of computing systems) that operates in a larger client-server database framework (e.g., such as in a social networking software such as Nextdoor.com, Fatdoor.com, Facebook.com, etc.).

The device 104 (e.g., a mobile device 504) (e.g., a smartphone, a tablet, a laptop) may access the emergency response server 100 through the network 101 using a browser application of the mobile device (e.g., Google® Chrome) and/or through a client-side application downloaded to the device 104 (e.g., a mobile device 504) (e.g., a Nextdoor.com mobile application, a Fatdoor.com mobile application) operated by the user 106. In an alternate embodiment, a non-mobile computing device, such as a desktop computer (not shown) may access the emergency response server 100 through the network 101.

The emergency broadcast data 102 may be communicated from the device 104 (e.g., a mobile device 504) to the emergency response server 100 through the network 101. The emergency broadcast data 102 may include information about an emergency (e.g., a heart attack, a mugging in progress) observed by the user 106 to recipients 114 and/or the emergency services 109 through the network 101. For example, the emergency may relate a type of medicine immediately needed by the user 106 (e.g., insulin) and/or identification information of a perpetrator (e.g., a license plate number).

The emergency broadcast data 102 may be generated and distributed through an application of the radial distribution module 140 (e.g., that applies the radial algorithm 240 of FIG. 2 using a series of modules working in concert as described in FIG. 2) of the emergency response server 100. The radial distribution module 140 (e.g., that applies the radial algorithm 240 of FIG. 2 using a series of modules working in concert as described in FIG. 2) may be a series of software functions/processes that simulates the experience of transmitting and receiving local broadcasts for the verified user, according to one embodiment.

Using an internet protocol based network (e.g., the network 101), the emergency response server 100 may be able to use the radial distribution module 140 (e.g., that applies the radial algorithm 240 of FIG. 2 using a series of modules working in concert as described in FIG. 2) to simulate a radio frequency (RF) based communication network using an IP network topology of the network 101. Therefore, the emergency broadcast data 102 can be distributed using the emergency response server 100 to a geo-constrained area (e.g., the recipients 114 in the geospatial area 117 and/or the emergency services 109 in a geo-constrained area around an area in which the device 104 (e.g., a mobile device 504) operates without requiring expensive broadcast towers, transceivers, transmitters, amplifiers, antennas, tuners and/or wave generating and interpreting hardware (e.g., as may be required in local ham radio communication, frequency modulation (FM) audio systems, etc.). The radial distribution module 140 (e.g., that applies the radial algorithm 240 of FIG. 2 using a series of modules working in concert as described in FIG. 2) may recreate an experience of communication between parties in a geospatially restricted area (e.g., for example in the same city, in the surrounding neighborhood, in the same zip code, in the same building, in the same claimed neighborhood) through the use of an Internet protocol network. The emergency response server 100 may overcome technical challenges of determining a user's geospatial location, calculating distance to other verified users based on relative geospatial locations, and/or coordinating information with a database of geo-coded information of interest (e.g., using the geospatial database 122) using the radial distribution module 140 (e.g., that applies the radial algorithm 240 of FIG. 2 using a series of modules working in concert as described in FIG. 2).

The radial distribution module 140 (e.g., that applies the radial algorithm 240 of FIG. 2 using a series of modules working in concert as described in FIG. 2), as a function/module of the emergency response server, may determine the location of the user 106, the distance between the user 106 and other verified users, and the distance between the user 106 and locations of interest. With that information, the radial distribution module 140 (e.g., that applies the radial algorithm 240 of FIG. 2 using a series of modules working in concert as described in FIG. 2) may further determine which verified users are within a predetermined vicinity of a user 106. This set of verified users within the vicinity of another verified user may then be determined to be receptive to broadcasts transmitted by the user 106 and to be available as transmitters of broadcasts to the user 106.

The radial distribution module 140 (e.g., that applies the radial algorithm 240 of FIG. 2 using a series of modules working in concert as described in FIG. 2) in effect may create a link between verified users of the network 101 that allows the users to communicate with each other, and this link may be based on the physical distance between the users as measured relative to a current geospatial location of the device 104 (e.g., a mobile device 504) with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the other users may also be used by the radial algorithm to determine an appropriate threshold distance for broadcasting a message.

Furthermore, the radial distribution module 140 (e.g., that applies the radial algorithm 240 of FIG. 2 using a series of modules working in concert as described in FIG. 2) may automatically update a set of pages associated with profiles of individuals and/or businesses that have not yet joined the network based on preseeded address information. In effect, the radial distribution module 140 (e.g., that applies the radial algorithm 240 of FIG. 2 using a series of modules working in concert as described in FIG. 2) may update preseeded pages in a geo-constrained radial distance from where a broadcast originates (e.g., using an epicenter 144 calculated from the current location of the device 104 (e.g., a mobile device 504)) with information about the emergency broadcast data 102. In effect, through this methodology, the radial distribution module 140 (e.g., that applies the radial algorithm 240 of FIG. 2 using a series of modules working in concert as described in FIG. 2) may leave 'inboxes' and/or post 'alerts' on pages created for users that have not yet signed up based on a confirmed address of the users through a public and/or a private data source (e.g., from Infogroup®, from a white page directory, etc.).

The radial distribution module 140 (e.g., that applies the radial algorithm 240 of FIG. 2 using a series of modules working in concert as described in FIG. 2) of the emergency response server 100 may be different from previous implementations because it is the first implementation to simulate the experience of local radio transmission between individuals using the internet and non-radio network technology by basing their network broadcast range on the proximity of verified users to one another, according to one embodiment.

FIG. 1 illustrates a number of operations between the device 104 and the recipients 114 and/or the emergency services 109. Particularly, circle '1' of FIG. 1 illustrates that the user of the device 104 communicates the emergency broadcast data 102 to the emergency response server 100 using the network 101. Then, after applying the radial algorithm 240 utilizing the radial distribution module 140, the emergency response server 100 generates and communicates an appropriate notification data (e.g., the notification data 112) associated with the emergency broadcast data 102 to a geospatially distributed set of recipients 114 in a radial area (radius represented as 'r' of FIG. 1) in a geospatial vicinity from an epicenter 144 associated a present geospatial location with the device 104 as illustrated as circle '2' in FIG. 1.

The radial algorithm 240 may operate as follows, according to one embodiment. The radial algorithm may utilize a radial distribution function (e.g., a pair correlation function)

$$g(r)$$

in the emergency response network 150. The radial distribution function may describe how density varies as a function of distance from a user 106, according to one embodiment.

If a given user 106 is taken to be at the origin O (e.g., the epicenter 144), and if $$\rho = N/V$$

is the average number density of recipients 114 in the emergency response network 150, then the local time-averaged density at a distance r from O is $$\rho g(r)$$

according to one embodiment. This simplified definition may hold for a homogeneous and isotropic type of recipients 114, according to one embodiment of the radial algorithm 240.

A more anisotropic distribution (e.g., exhibiting properties with different values when measured in different directions) of the recipients 114 will be described below, according to one embodiment of the radial algorithm 240. In simplest terms it may be a measure of the probability of finding a recipient at a distance of r away from a given user 106, relative to that for an ideal distribution scenario, according to one embodiment. The anisotropic algorithm involves determining how many recipients 114 are within a distance of r and r+dr away from the user 106, according to one embodiment. The radial algorithm 240 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the geospatially constrained social network 142 in which there are multiple residents in each floor), this normalization may be the number density of the system multiplied by the volume of the spherical shell, which mathematically can be expressed as, $$g(r)_i = 4\pi r^2 \rho dr,$$

where p may be the user density, according to one embodiment of the radial algorithm 240.

The radial distribution function of the radial algorithm 240 can be computed either via computer simulation methods like the Monte Carlo method, or via the Ornstein-Zernike equation, using approximative closure relations like the Percus-Yevick approximation or the Hypernetted Chain Theory, according to one embodiment.

This may be important because by confining the broadcast reach of a verified user in the emergency response network 150 to a specified range, the radial distribution module 140 (e.g., that applies the radial algorithm 240 of FIG. 2 using a series of modules working in concert as described in FIG. 2) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the emergency response server 100 on preseeded profile pages and/or active user pages of the emergency response server 100. Advertisement communications thus may become highly specialized and localized resulting in an increase in their value and interest to the local verified users of the network through the emergency response server 100. For example, advertisers may wish to communicate helpful home security devices to a set of users located in a geospatial area with a high concentration of home break-in broadcasts.

The radial distribution module 140 (e.g., that applies the radial algorithm 240 of FIG. 2 using a series of modules working in concert as described in FIG. 2) may also have wide application as it may solve the problem of trying to locate a receptive audience to a verified user's broadcasts, whether that broadcast may a personal emergency, an one's personal music, an advertisement for a car for sale, a solicitation for a new employee, and/or a recommendation for a good restaurant in the area. This radial distribution module 140 (e.g., that applies the radial algorithm 240 of FIG. 2 using a series of modules working in concert as described in FIG. 2) may eliminate unnecessarily broadcasting that information to those who are not receptive to it, both as a transmitter and as a recipient of the broadcast. The radial algorithm saves both time (which may be critical and limited in an emergency context) and effort of every user involved by transmitting information only to areas that a user cares about, according to one embodiment.

In effect, the radial algorithm of the emergency response server enables users to notify people around locations that are cared about (e.g., around where they live, work, and/or where they are physically located). In one embodiment, the user 106 can be provided 'feedback' and/or a communication that the recipient 114 may be responding to the emergency after the emergency broadcast data 102 may be delivered to the recipients 114 and/or to the emergency services 109 using the radial distribution module 140 (e.g., that applies the radial algorithm 240 of FIG. 2 using a series of modules working in concert as described in FIG. 2) of the emergency response server 100. For example, after the emergency broadcast data 102 may be delivered, the device 104 (e.g., a mobile device 504) may display a message saying: "3256 neighbors around a 1 radius from you have been notified on their profile pages of your crime broadcast in Menlo Park and 4 people are responding" and/or "8356 neighbors and two hospitals around a 2.7 radius from you have been notified of your medical emergency."

The various embodiments described herein of the emergency response server 100 using the radial distribution module 140 (e.g., that applies the radial algorithm 240 of FIG. 2 using a series of modules working in concert as described in FIG. 2) may solve a central problem of internet radio service providers (e.g., Pandora) by retaining cultural significance related to a person's locations of association. For example, the radial distribution module 140 (e.g., that applies the radial algorithm 240 of FIG. 2 using a series of modules working in concert as described in FIG. 2) may be used to 'create' new radio stations, television stations, and/or mini alert broadcasts to a geospatially constrained area on one end, and provide a means for those 'tuning in' to consume information posted in a geospatial area that the listener cares about and/or associates themselves with. The information provided can be actionable in that the user 106 may be able to secure new opportunities through face to face human interaction and physical meeting not otherwise possible in internet radio scenarios.

The radial algorithm may be a set of instructions that may enable users (e.g., verified users, non-verified users) of the Nextdoor.com and Fatdoor.com websites and applications to broadcast their activities (e.g., garage sale, t-shirt sale, crime alert) to surrounding neighbors within a claimed neighborhood and to guests of a claimed neighborhood, according to one embodiment. The radial algorithm may be new because current technology does not allow for users of a network (e.g., Nextdoor.com, Fatdoor.com) to locally broadcast their activity to a locally defined geospatial area. With the radial algorithm, users of the network may communicate with one another in a locally defined manner, which may present more relevant information and activities, according to one embodiment. For example, if a verified user of the network broadcasts an emergency, locally defined neighbors of the verified user may be much more interested in responding than if they observed an emergency on a general news broadcast on traditional radio, according to one embodiment. The radial distribution module 140 may solve the problem of neighbors living in the locally defined geospatial area who don't typically interact, and allows them to connect within a virtual space that did not exist before, according to one embodiment. Prior to this invention of the radial algorithm 240 operating through the radial distribution module 140, community boards (e.g., stolen or missing item boards) were the only method of distributing content in a surrounding neighborhood effectively. However, there was no way to easily distribute content related to exigent circumstances and/or with urgency in a broadcast-like manner to those listening around a neighborhood through mobile devices until the various embodiments applying the radial distribution module 140 as described herein.

A radial algorithm 240 may be a method of calculating a sequence of operations, and in this case a sequence of radio operations, according to one embodiment. Starting from an initial state and initial input, the radial algorithm 240 describes a computation that, when executed, proceeds through a finite number of well-defined successive states, eventually producing radial patterned distribution (e.g., simulating a local radio station), according to one embodiment.

The emergency response server 100 may solve technical challenges through the radial distribution module 140 (e.g., that applies the radial algorithm 240 of FIG. 2 using a series of modules working in concert as described in FIG. 2) by implementing a vigorous screening process to screen out any lewd or vulgar content in one embodiment. For example, what may be considered lewd content sometimes could be subjective, and verified users could argue that the operator of the emergency response server 100 is restricting their constitutional right to freedom of speech (e.g., if the emergency response server is operated by a government entity) through a crowd-moderation capability enabled by the radial distribution module 140 (e.g., that applies the radial algorithm 240 of FIG. 2 using a series of modules working in concert as described in FIG. 2), according to one embodiment. In one embodiment, verified users may sign an electronic agreement to screen their content and agree that the emergency response network 150 may delete any content that it deems inappropriate for broadcasting, through the radial distribution module 140 (e.g., that applies the radial algorithm 240 of FIG. 2 using a series of modules working in concert as described in FIG. 2) according to one embodiment. For example, it may be determined that a lost item such as a misplaced set of car keys does not qualify as an "emergency" that should be broadcast.

The radial distribution module 140 (e.g., that applies the radial algorithm 240 of FIG. 2 using a series of modules working in concert as described in FIG. 2), in addition to emergency broadcasts, may allow verified users to create and broadcast their own radio show, e.g., music, talk show, commercial, instructional contents, etc., and to choose their neighborhood(s) for broadcasting based on a claimed location, according to one embodiment. The radial distribution module 140 (e.g., that applies the radial algorithm 240 of FIG. 2 using a series of modules working in concert as described in FIG. 2) may allow users to choose the neighborhoods that they would want to receive the broadcasts, live and recorded broadcasts, and/or the types and topics (e.g., minor crimes, property crimes, medical emergencies) of broadcasts that interest them.

The radial distribution module 140 (e.g., that applies the radial algorithm 240 of FIG. 2 using a series of modules working in concert as described in FIG. 2) based approach of the emergency response server 100 may be a completely different concept from the currently existing neighborhood (e.g., geospatial) social networking options. The radial distribution module 140 (e.g., that applies the radial algorithm 240 of FIG. 2 using a series of modules working in concert as described in FIG. 2) may also allow the user to create his/her own radio station, television station and/or other content such as the emergency broadcast data 102 and distribute this content around locations to users and preseeded profiles around them. For example, the user may wish to broadcast their live reporting of a structure fire or interview eye-witnesses to a robbery. The radial distribution module 140 (e.g., that applies the radial algorithm 240 of FIG. 2 using a series of modules working in concert as described in FIG. 2) can allow verified users to create their content and broadcast in the selected geospatial area. It also allows verified listeners to listen to only the relevant local broadcasts of their choice.

The radial distribution module 140 (e.g., that applies the radial algorithm 240 of FIG. 2 using a series of modules working in concert as described in FIG. 2) may be important because it may provide any verified user the opportunity to create his/her own radial broadcast message (e.g., can be audio, video, pictoral and/or textual content) and distribute this content to a broad group. Radial distribution module 140 (e.g., that applies the radial algorithm 240 of FIG. 2 using a series of modules working in concert as described in FIG. 2) may also allow verified listeners to listen to any missed live broadcasts through the prerecorded features, according to one embodiment. Through this, the radial distribution module 140 (e.g., that applies the radial algorithm 240 of FIG. 2 using a series of modules working in concert as described in FIG. 2) changes the way social networks (e.g., Nextdoor, Fatdoor, Facebook, Path, etc.) operate by enabling location centric broadcasting to regions that a user cares about, according to one embodiment. Radial distribution module 140 (e.g., that applies the radial algorithm 240 of FIG. 2 using a series of modules working in concert as described in FIG. 2) may solve a technical challenge by defining ranges based on a type of an emergency type, a type of neighborhood, and/or boundary condition of a neighborhood by analyzing whether the emergency broadcast data 102 may be associated with a particular kind of recipient, a particular neighborhood, a temporal limitation, and/or through another criteria.

By using the radial distribution module 140 (e.g., that applies the radial algorithm 240 of FIG. 2 using a series of modules working in concert as described in FIG. 2) of the emergency response server 100 the user 106 may be able to filter irrelevant offers and information provided by broadcasts. In one embodiment, only the broadcasting user (e.g., the user 106) may be a verified user to create accountability for a particular broadcast and/or credibility of the broadcaster. In this embodiment, recipients 114 of the broadcast may not need to be verified users of the emergency response network. By directing traffic and organizing the onslaught of broadcasts, the radial distribution module 140 (e.g., that applies the radial algorithm 240 of FIG. 2 using a series of modules working in concert as described in FIG. 2) of the emergency response server 100 may be able to identify the origins and nature of each group of incoming information and locate recipients 114 that are relevant/interested in the emergency broadcast data 102, maximizing the effective use of each broadcast. For example, the recipient 114 may be able to specify that they own a firearm so that they would be a relevant recipient 114 for broadcast data to respond to a school shooting. In another example, a recipient 114 may specify that they are a medical professional (e.g., parametic, physician) such that they may receive medical emergency broadcasts, according to one embodiment.

The radial distribution module 140 (e.g., that applies the radial algorithm 240 of FIG. 2 using a series of modules working in concert as described in FIG. 2) of the emergency response server 100 may process the input data from the device 104 (e.g., a mobile device 504) in order to identify which notification(s) to broadcast to which individual(s). This may be separate from a traditional radio broadcast as it not only geographically constrains broadcasters and recipients 114 but also makes use of user preferences in order to allow broadcasters to target an optimal audience and allow recipients 114 to alter and customize what they consume. The user 106 may associate his/herself with a non-transitory address in order to remain constantly connected to their neighborhood and/or neighbors even when they themselves or their neighbors are away. The radial algorithm 240 may be also unique from a neighborhood social network (e.g., the geospatially constrained social network 142) as it permits users to broadcast emergencies, information, audio, video etc. to other users, allowing users to create their own stations.

In order to implement the radial distribution module 140 (e.g., that applies the radial algorithm 240 of FIG. 2 using a series of modules working in concert as described in FIG. 2), geospatial data may need to be collected and amassed in order to create a foundation on which users may sign up and verify themselves by claiming a specific address, associating themselves with that geospatial location. The radial distribution module 140 (e.g., that applies the radial algorithm 240 of FIG. 2 using a series of modules working in concert as described in FIG. 2) may then be able to utilize the geospatial database 122 to filter out surrounding noise and deliver only relevant data to recipients 114. In order to accomplish this, the radial distribution module 140 (e.g., that applies the radial algorithm 240 of FIG. 2 using a series of modules working in concert as described in FIG. 2) may be able to verify the reliability of geospatial coordinates, time stamps, and user information associated with the device 104 (e.g., a mobile device 504). In addition, threshold geospatial radii, private neighborhood boundaries, and personal preferences may be established in the emergency response server 100 and accommodated using the radial distribution module 140 (e.g., that applies the radial algorithm 240 of FIG. 2 using a series of modules working in concert as described in FIG. 2). The geospatial database 122 may work in concert with the radial distribution module 140 (e.g., that applies the radial algorithm 240 of FIG. 2 using a series of modules working in concert as described in FIG. 2) to store, organize, and manage broadcasts, pushpins, user profiles, preseeded user profiles, metadata, and epicenter 144 locations associated with the geospatially constrained social network 142 (e.g., a neighborhood social network such as Fatdoor.com, Nextdoor.com).

The radial algorithm 240 may be used to calculate relative distances between each one of millions of records as associated with each placed geo-spatial coordinate in the geospatially constrained social network 142 (e.g., a neighborhood social network such as Fatdoor.com, Nextdoor.com). Calculations of relative distance between each geospatial coordinate can be a large computational challenge because of the high number of reads, writes, modify, and creates associated with each geospatial coordinate added to the geospatially constrained social network 142 and subsequent recalculations of surrounding geospatial coordinates associated with other users and/or other profile pages based a relative distance away from a newly added set of geospatial coordinates (e.g., associated with the emergency broadcast data 102 and/or with other pushpin types). To overcome this computational challenge, the radial algorithm may leverage a massively parallel computing architecture 146 through which processing functions are distributed across a large set of processors accessed in a distributed computing system 148 through the network 101.

In order to achieve the utilization of the massively parallel computing architecture 146 in a context of a radial distribution function of a geospatially constrained social network 142, a number of technical challenges have been overcome in at least one embodiment. Particularly, the radial distribution module 140 constructs a series of tables based on an ordered geospatial ranking based on frequency of interaction through a set of 'n' number of users simultaneously interacting with the geospatially constrained social network 142, in one preferred embodiment. In this manner, sessions of access between the emergency response server 100 and users of the emergency response server 100 (e.g., the user 106) may be monitored based on geospatial claimed areas of the user (e.g., a claimed work and/or home location of the user), and/or a present geospatial location of the user. In this manner, tables associated with data related to claimed geospatial areas of the user and/or the present geospatial location of the user may be anticipatorially cached in the memory 124 to ensure that a response time of the geospatially constrained social network 142 may be not constrained by delays caused by extraction, retrieval, and transformation of tables that are not likely to be required for a current and/or anticipated set of sessions between users and the emergency response server 100.

In a preferred embodiment, an elastic computing environment may be used by the radial distribution module 140 to provide for increase/decreases of capacity within minutes of a database function requirement. In this manner, the radial distribution module 140 can adapt to workload changes based on number of requests of processing simultaneous and/or concurrent requests associated with emergency broadcast data 102 by provisioning and deprovisioning resources in an autonomic manner, such that at each point in time the available resources match the current demand as closely as possible.

The radial distribution module 140 (e.g., that applies the radial algorithm 240 of FIG. 2 using a series of modules working in concert as described in FIG. 2) may be a concept whereby a server communicating data to a dispersed group of recipients 114 over a network 101, which may be an internet protocol based wide area network (as opposed to a network communicating by radio frequency communications) communicates that data only to a geospatially-constrained group of recipients 114. The radial distribution module 140 (e.g., that applies the radial algorithm 240 of FIG. 2 using a series of modules working in concert as described in FIG. 2) may apply a geospatial constraint related to a radial distance away from an origin point, or a constraint related to regional, state, territory, county, municipal, neighborhood, building, community, district, locality, and/or other geospatial boundaries.

The radial distribution module 140 (e.g., that applies the radial algorithm 240 of FIG. 2 using a series of modules working in concert as described in FIG. 2) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the radial distribution module 140 (e.g., that applies the radial algorithm 240 of FIG. 2 using a series of modules working in concert as described in FIG. 2).

The radial distribution module 140 (e.g., that applies the radial algorithm 240 of FIG. 2 using a series of modules working in concert as described in FIG. 2) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the radial distribution module 140 (e.g., that applies the radial algorithm 240 of FIG. 2 using a series of modules working in concert as described in FIG. 2) herein describes a system in which networks are used to transmit data in a selective manner in that information may be distributed around a physical location of homes or businesses in areas of interest/relevancy.

The radial distribution module 140 (e.g., that applies the radial algorithm 240 of FIG. 2 using a series of modules working in concert as described in FIG. 2) may solve a problem of restricting data transmitted over networks to specific users who are within a specified distance from the individual who originates the data. In a broad sense, by enabling commerce and communications that are strictly limited within defined neighborhood boundaries, the radial distribution module 140 (e.g., that applies the radial algorithm 240 of FIG. 2 using a series of modules working in concert as described in FIG. 2) may enable the geospatially constrained social network 142 (e.g., a neighborhood social network such as Fatdoor.com, Nextdoor.com) communications, attacking the serious social conditions of anonymity and disengagement in community that afflict the nation and, increasingly, the world.

The radial distribution module 140 (e.g., that applies the radial algorithm 240 of FIG. 2 using a series of modules working in concert as described in FIG. 2) may comprise one or more modules that instruct the emergency response server 100 to restrict the broadcasting of the emergency broadcast data 102 to one or more parts of the geospatial area 117. For example, in the embodiment of FIG. 1, the radial distribution module 140 (e.g., that applies the radial algorithm 240 of FIG. 2 using a series of modules working in concert as described in FIG. 2) may instruct the emergency response server 100 to broadcast the emergency broadcast data 102 to the recipients 114 but not to the area outside the threshold radial distance 115.

In one or more embodiments, the radial distribution module 140 (e.g., that applies the radial algorithm 240 of FIG. 2 using a series of modules working in concert as described in FIG. 2) may allow the emergency response server 100 to function in manner that simulates a traditional radio broadcast (e.g., using a radio tower to transmit a radio frequency signal) in that both the emergency response server 100 and the radio broadcast are restricted in the geospatial scope of the broadcast transmission. In one or more embodiments, the radial distribution module 140 (e.g., that applies the radial algorithm 240 of FIG. 2 using a series of modules working in concert as described in FIG. 2) may prevent the broadcast of the emergency broadcast data 102 to any geospatial area to which the user 106 does not wish to transmit the emergency broadcast data 102, and/or to users that have either muted and/or selectively subscribed to a set of broadcast feeds.

The radial distribution module 140 (e.g., that applies the radial algorithm 240 of FIG. 2 using a series of modules working in concert as described in FIG. 2) may analyze the emergency broadcast data 102 to determine which recipients 114 may receive notification data 112 within the threshold radial distance 119 (e.g., set by the user 106 and/or auto calculated based on a type of emergency posting). The radial distribution module 140 (e.g., that applies the radial algorithm 240 of FIG. 2 using a series of modules working in concert as described in FIG. 2) may use a variety of parameters, including information associated with the emergency broadcast data (e.g., location of the emergency, type of emergency, etc.) to determine the threshold radial distance 119.

The radial distribution module 140 (e.g., that applies the radial algorithm 240 of FIG. 2 using a series of modules working in concert as described in FIG. 2) may also determine which verified addresses associated with recipients 114 having verified user profiles are located within the threshold radial distance 119. The radial distribution module 140 (e.g., that applies the radial algorithm 240 of FIG. 2 using a series of modules working in concert as described in FIG. 2) may then broadcast the notification data 112 to the profiles and/or mobile devices of the verified users having verified addresses within the threshold radial distance 119.

The radial distribution module 140 (e.g., that applies the radial algorithm 240 of FIG. 2 using a series of modules working in concert as described in FIG. 2) may therefore simulate traditional radio broadcasting (e.g., from a radio station transmission tower) over the IP network. Thus, the radial distribution module 140 (e.g., that applies the radial algorithm 240 of FIG. 2 using a series of modules working in concert as described in FIG. 2) may allow the broadcast to include information and data that traditional radio broadcasts may not be able to convey, for example geospatial coordinates and/or real-time bi-directional communications. Additionally, the radial distribution module 140 (e.g., that applies the radial algorithm 240 of FIG. 2 using a series of modules working in concert as described in FIG. 2) may allow individual users low-entry broadcast capability without resort to expensive equipment and/or licensing by the Federal Communications Commission (FCC).

Another advantage of this broadcast via the radial distribution module 140 (e.g., that applies the radial algorithm 240 of FIG. 2 using a series of modules working in concert as described in FIG. 2) may be that it may bypass obstructions that traditionally disrupt radio waves such as mountains and/or atmospheric disturbances. Yet another advantage of the radial distribution module 140 (e.g., that applies the radial algorithm 240 of FIG. 2 using a series of modules working in concert as described in FIG. 2) may be that it may expand the physical distance of broadcast capability without resort to the expense ordinarily associated with generating powerful carrier signals. In yet another advantage, the radial distribution module 140 (e.g., that applies the radial algorithm 240 of FIG. 2 using a series of modules working in concert as described in FIG. 2) may allow for almost unlimited channels and/or stations as compared to traditional radio where only a narrow band of electromagnetic radiation has been appropriated for use among a small number of entities by government regulators (e.g., the FCC).

The user 106 may be an individual who operates the device 104 (e.g., a mobile device 504) to generate the emergency broadcast data 102. It will be understood by those skilled in the art that the verified nature of the user may be an optional characteristic in an alternate embodiment. This means that in an alternate embodiment, any user (whether verified or not) may generate the emergency broadcast data 102 through the device 104 (e.g., a mobile device 504). In another alternative embodiment, the user 106 may be an electronic sensor, such as a detection sensor device (e.g., a sensory detection sensor device such as a motion detector, a chemical detection device (for example, to sense a natural gas leak), a gunshot listening sensor, etc.), and/or an appliance (e.g., a refrigerator, a home security network, and/or a motion detector). It should also be noted that the 'mobile' nature of the device 104 may be optional in yet another alternative embodiment. In such an alternate embodiment, any computing device, whether mobile/portable or fixed in location may generate the emergency broadcast data 102.

The cellular network 108 may be associated with a telephone carrier (e.g., such as AT&T, Sprint, etc.) that provides an infrastructure through which communications are generated between the emergency response server 100 and the emergency services 109 using the radial algorithm 240. For example, the cellular network 108 may provide a communication infrastructure through which the emergency broadcast data 102 may be communicated as voice and/or text messages through telephones (e.g., standard telephones and/or smart phones) operated by at least some of the emergency services 109 of FIG. 1. It should be understood that in one embodiment, the emergency services 109 are paid subscribers/customers of the geospatially constrained social network 142 in a manner such that each of the emergency services 109 may pay a fee per received emergency broadcast data 102, and/or each hired engagement to the geospatially constrained social network 142. The emergency services 109 may pay extra to be permitted access to receive the emergency broadcast data 102 even when they do not have a transitory and/or non-transitory connection to a neighborhood if they service that neighborhood area. For this reason, FIG. 1 visually illustrates that the emergency services 109 may be located (e.g., principal business address) outside the threshold radial distance 119.

The cellular network 108 (e.g., a mobile network) may be a wireless network distributed over land areas called cells, each served by at least one fixed-location transceiver, known as a cell site or base station through which the emergency broadcast data 102 is distributed from the emergency response server 100 to telephones of the emergency services 109 using the radial distribution module 140 (e.g., that applies the radial algorithm 240 of FIG. 2 using a series of modules working in concert as described in FIG. 2), according to one embodiment. The cellular network 108 may use a set of frequencies from neighboring cells, to avoid interference and provide guaranteed bandwidth within each cell, in one embodiment.

When joined together these cells of the cellular network 108 may provide radio coverage over a wide geographic area through the cellular network 108 in a manner that ensures that the emergency broadcast data 102 may be simultaneously communicated via both IP networks (e.g., to the recipients 114) and/or to the emergency services 109 through the cellular network 108. It will be appreciated that the radial distribution module 140 (e.g., that applies the radial algorithm 240 of FIG. 2 using a series of modules working in concert as described in FIG. 2) in effect permits simultaneous updates to claimed user pages, unclaimed (preseeded) user pages in a geospatially constrained social network 142 (e.g., neighborhood social network) based on a geospatial location of the device 104 (e.g., a mobile device 504) in a manner that simulates a radio (RF) based network separately from the concepts described in conjunction with the cellular network 108. However, it will be understood that the radial distribution module 140 (e.g., that applies the radial algorithm 240 of FIG. 2 using a series of modules working in concert as described in FIG. 2) may be not restricted to such topology and can multimodally communicate through different networks, such as through the cellular network 108 described in FIG. 1.

The emergency services 109 may be locations, devices, and/or mobile phones associated with individuals and/or agencies associated with emergency services (e.g., a police department, a SWAT team, a poison control center, an animal control agency). The emergency services 109 may be notified when an emergency broadcast in an area that they service including a non-transitory location (e.g., around where they live and/or work, regardless of where they currently are) and a transitory location (e.g., where they currently are) is posted using the device 104 (e.g., a mobile device 504) as the emergency broadcast data 102.

The emergency services 109 are illustrated in FIG. 1 as including a hospital 309A, a police department 309B, and a fire department 309C. In this manner, mobile devices and/or desktop computers operated by the emergency services 109 may be alerted whenever the emergency broadcast data 102 is posted in and/or around their neighborhood through a push notification (e.g., an alert popping up on their phone), through an email, a telephone call, and/or a voice message delivered to the particular mobile device operated by each of the emergency services 109 using the radial distribution module 140 (e.g., that applies the radial algorithm 240 of FIG. 2 using a series of modules working in concert as described in FIG. 2).

The emergency broadcast data 102 may be delivered as notification data 112 (which may include a number of attributes) from the emergency response server 100 to the recipients 114 and/or to the emergency services 109 using the radial distribution module 140 (e.g., that applies the radial algorithm 240 of FIG. 2 using a series of modules working in concert as described in FIG. 2) of the emergency response server 100.

The recipients 114 may be individuals that have claimed a profile (e.g., verified their profile through a postcard, a telephone lookup, a utility bill) associated with a particular non-transitory address (e.g., a home address, a work address) through a geospatial social network (e.g., a geospatially constrained social network 142 (e.g., a neighborhood social network such as Fatdoor.com, Nextdoor.com)) through which the emergency response server 100 operates. The recipients 114 may be in a geo-fenced area, in that an epicenter 144 of a broadcast message from the device 104 (e.g., a mobile device 504) may be a center through which a radial distance is calculated based on a characteristic of the emergency broadcast data 102. For example, a minor crime (e.g., vandalism) may be delivered only to an immediate 0.1 mile radius, where as a major violent crime may be automatically delivered to a broader 0.6 mile radius either automatically and/or through a user defined preference (e.g., set by the user 106).

It should be appreciated that individuals in an area outside the threshold radial distance 115 may not receive the emergency broadcast data 102 because their geospatial address may be outside a radial boundary surrounding an epicenter 144 in which the emergency broadcast data 102 originates. Additionally, the threshold radial distance 119 may be confined on its edges by a geospatial polygon at a juncture between the area defined by recipients 114 and the area outside the threshold radial distance 115, according to one embodiment.

Figure 2:
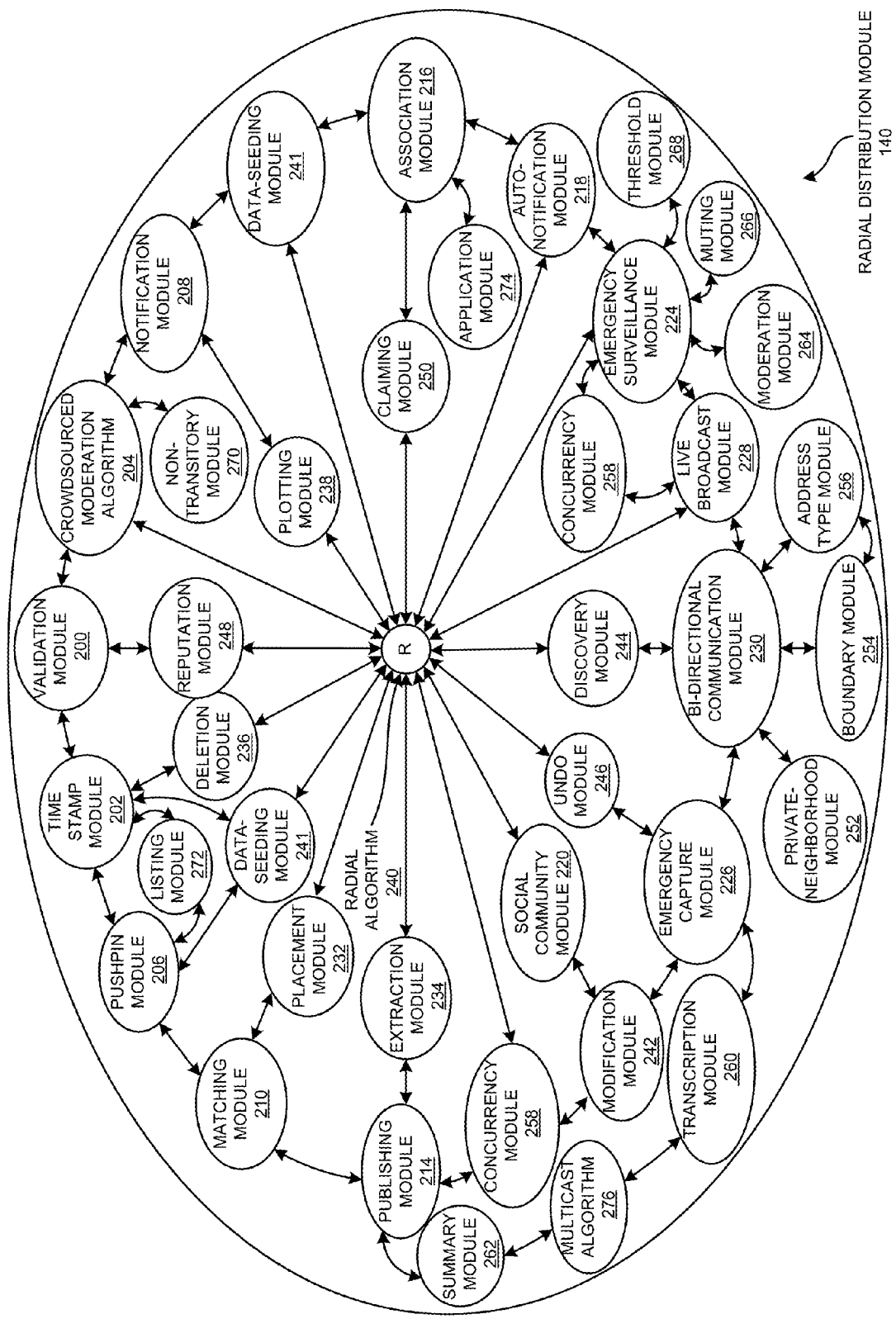
FIG. 2 is an exploded view of the radial distribution module of FIG. 1 that applies the radial algorithm, according to one embodiment.

FIG. 2 is an exploded view of the radial distribution module 140 of FIG. 1 that applies the radial algorithm 240, according to one embodiment.

Particularly, FIG. 2 illustrates an exploded view of the radial distribution module 140, according to one embodiment. A variety of software instruction sets and/or hardware components form the radial distribution module 140, according to one embodiment. Select ones of these software instruction sets and/or hardware components utilize the radial algorithm 240 to perform functions related to radially distributing information to pre-seeded user profiles, user profiles, and telephone devices (e.g., land based phones, circuit switched phones).

A validation module 200 may determine that an emergency broadcast data 102 generated through a mobile device 504 may be associated with a verified user (e.g., the user 106 of FIG. 1 as described as the verified user 706 in FIG. 7) of the emergency response server 100) using a processor 120 and/or a memory 124. In addition, the validation module 200 may determine that the broadcast data (e.g., the emergency broadcast data 102) is generated by the validated user (e.g., the user 106 of FIG. 1 as described as the verified user 706 in FIG. 7) of the neighborhood broadcast system (e.g., of the geospatially constrained social network 142) when analyzing that the broadcast data (e.g., the emergency broadcast data 102) is associated with the mobile device 504. The validation module 200 may apply the radial algorithm 240 to determine if the verified user 706 may be in a validated geospatial location based on previous history of the verified user 706, according to one embodiment.

Figure 7:
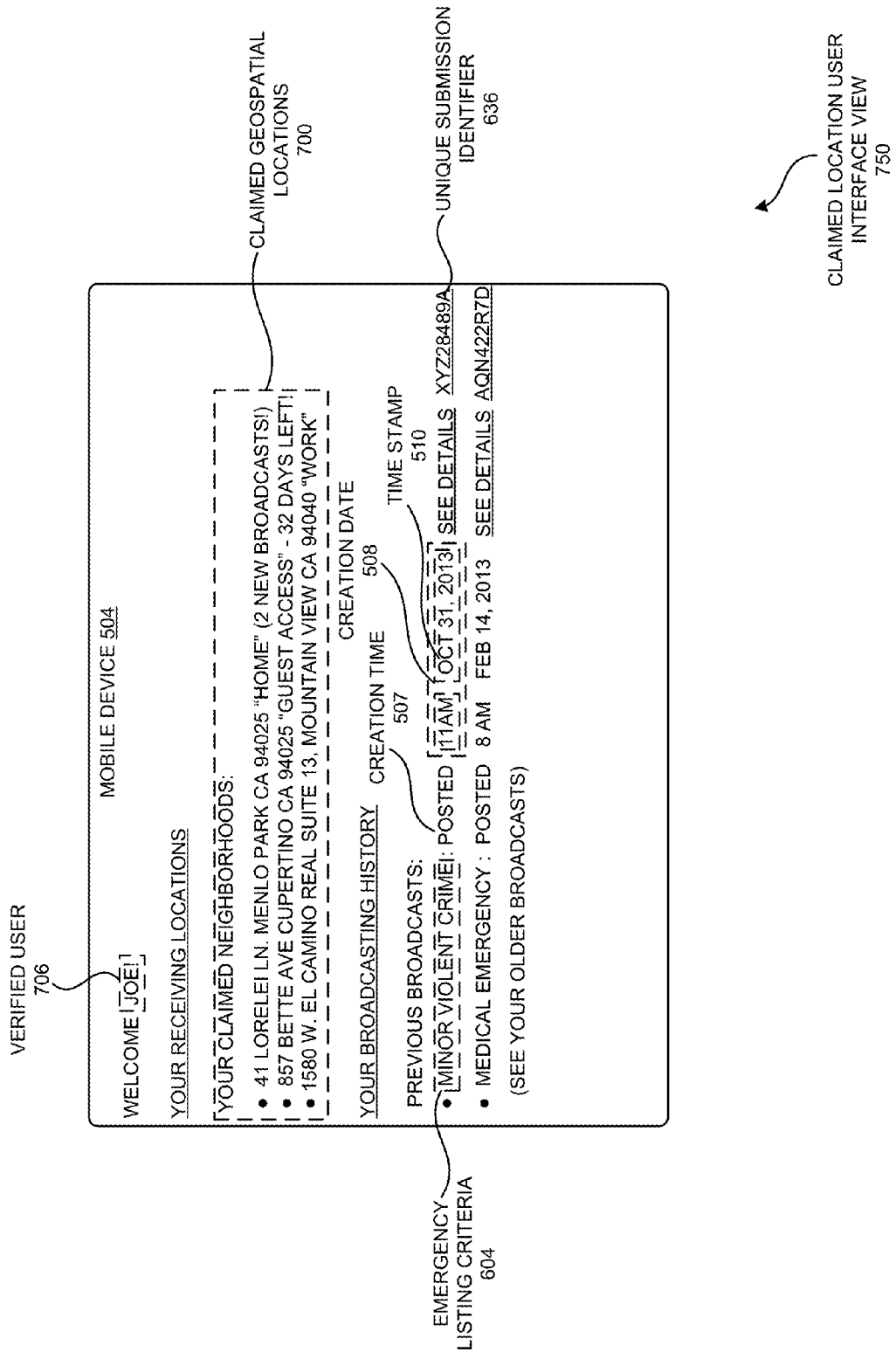
FIG. 7 is a claimed location user interface view that explains how a claimed user reviews their emergency broadcasts that they made and manages the neighborhoods that they have claimed, according to one embodiment.

In addition, the validation module 200 may ensure that a set of geospatial coordinates 103 associated with the emergency broadcast data 102 generated through the mobile device 504 are trusted based on a claimed geospatial location (e.g., any of the claimed geospatial locations 700 as described in FIG. 7 of the verified user (e.g., the user 106 of FIG. 1 as described as the verified user 706 in FIG. 7) of the emergency response server 100).

A time stamp module 202 may determine that a time stamp 510 associated with a creation date 508 and/or a creation time 507 of the emergency broadcast data 102 generated through the mobile device 504 may be trusted based on the claimed geospatial location (e.g., any of the claimed geospatial locations 700 as described in FIG. 7 of the verified user (e.g., the user 106 of FIG. 1 as described as the verified user 706 in FIG. 7) of the emergency response server 100). A listing module 272 may determine an emergency listing criteria 604 associated with the emergency broadcast data 102 including a description, a photograph, a video, a category, wherein the emergency may be a medical emergency, a property crime, vandalism, a violent crime and/or a suspected felony.

Figure 3:
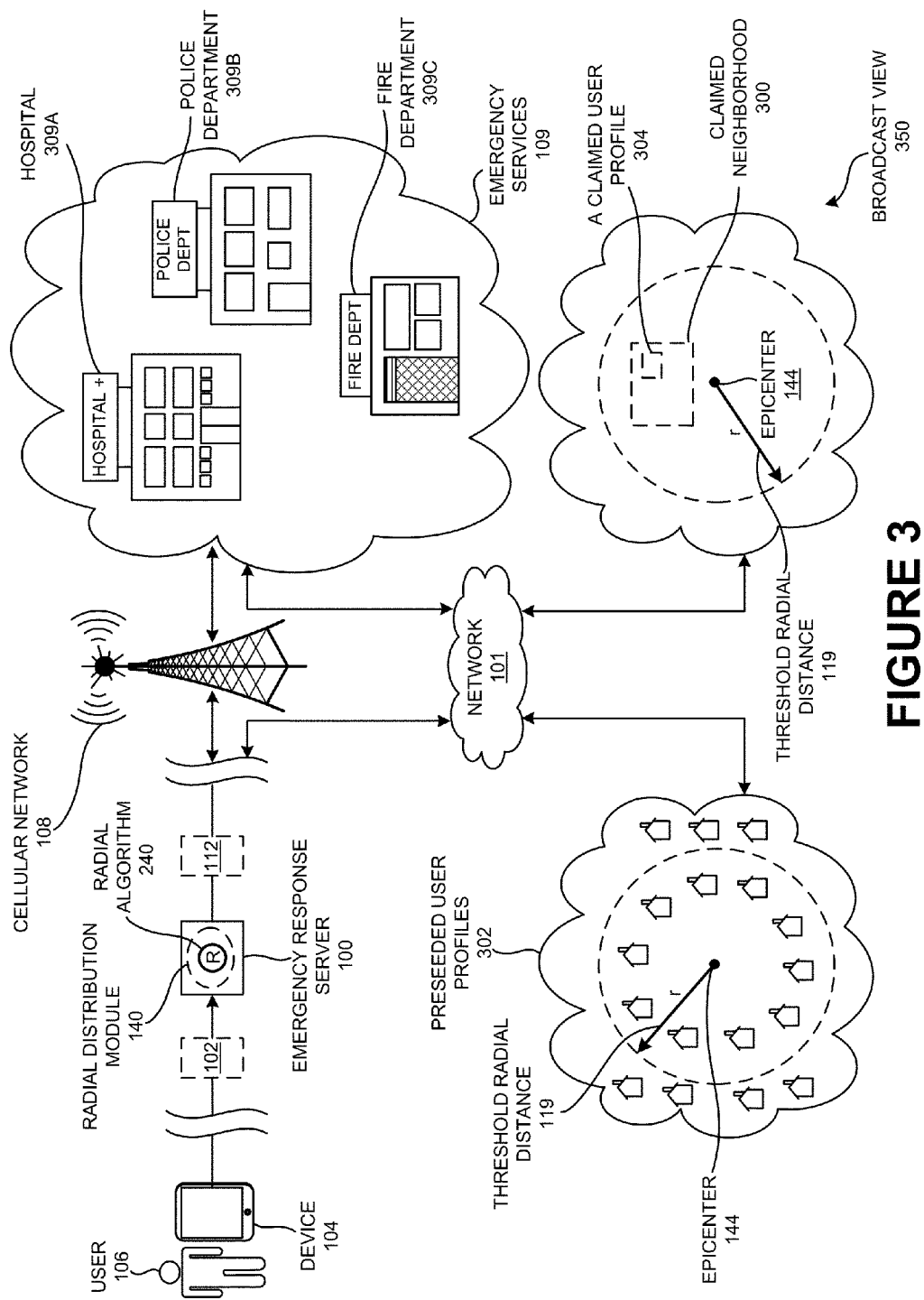
FIG. 3 is a broadcast view that demonstrates how the radial distribution module of FIG. 1 is used to communicate an emergency broadcast data to claimed user profiles, pre-seeded user profiles, and to telephone devices or internet-enabled devices of emergency services through a heterogeneous network formed through the internet protocol network of FIG. 1 and through a cellular network, according to one embodiment.

A pushpin module 206 may present the emergency broadcast data 102 generated through the mobile device 504 as an emergency alert pushpin of the emergency broadcast in a geospatial map surrounding pre-populated residential and/or business listings in a surrounding vicinity, such that the emergency alert pushpin of the emergency broadcast may be automatically presented on the geospatial map in addition to being presented on the set of user profiles (e.g., preseeded user profiles 302 and/or claimed user profiles 304 as described in FIG. 3 having associated verified addresses in the threshold radial distance 119 from the set of geospatial coordinates 103 associated with the emergency broadcast data 102 generated through the mobile device 504 of the verified user (e.g., the user 106 of FIG. 1 as described as the verified user 706 in FIG. 7) of the emergency response server 100).

A radial distribution module 140 may radially distribute the emergency broadcast data 102 generated through the mobile device 504 through an on-page posting, an electronic communication, and/or a push notification delivered to desktop and/or mobile devices 504 associated with users and/or their user profiles (e.g., preseeded user profiles 302 and/or claimed user profiles 304 as described in FIG. 3) around an epicenter defined at the set of geospatial coordinates 103 associated with the emergency broadcast data 102 generated through the mobile device 504 to all subscribed user profiles (e.g., preseeded user profiles 302 and/or claimed user profiles

304 as described in FIG. 3) in a circular geo-fenced area defined by the threshold distance from the set of geospatial coordinates 103 associated with the emergency broadcast data 102 generated through the mobile device 504 through the radial algorithm 240 of a emergency response network 150 that measures a distance away of each address associated with each user profile 402 from the current geospatial location at the epicenter. A placement module 232 may enable the verified user (e.g., the user 106 of FIG. 1 as described as the verified user 706 in FIG. 7) to drag and/or drop the emergency alert pushpin on any location on the geospatial map, and/or automatically determining a latitude and/or a longitude associated a placed location.

A notification module 208 may automatically notify a hospital 309A, a police department 309B and/or a fire department 309C in a surrounding geospatial area to the set of geospatial coordinates 103 associated with the emergency broadcast data 102 generated through the mobile device 504. An extraction module 234 may separate the geospatial coordinates 103 from a metadata associated with the emergency broadcast data 102 generated through the mobile device 504 when verifying that the set of geospatial coordinates 103 associated with the emergency broadcast data 102 generated through the mobile device 504 are trusted based on the claimed geospatial location (e.g., any of the claimed geospatial locations 700 as described in FIG. 7 of the verified user (e.g., the user 106 of FIG. 1 as described as the verified user 706 in FIG. 7) of the emergency response server 100).

Figure 12:
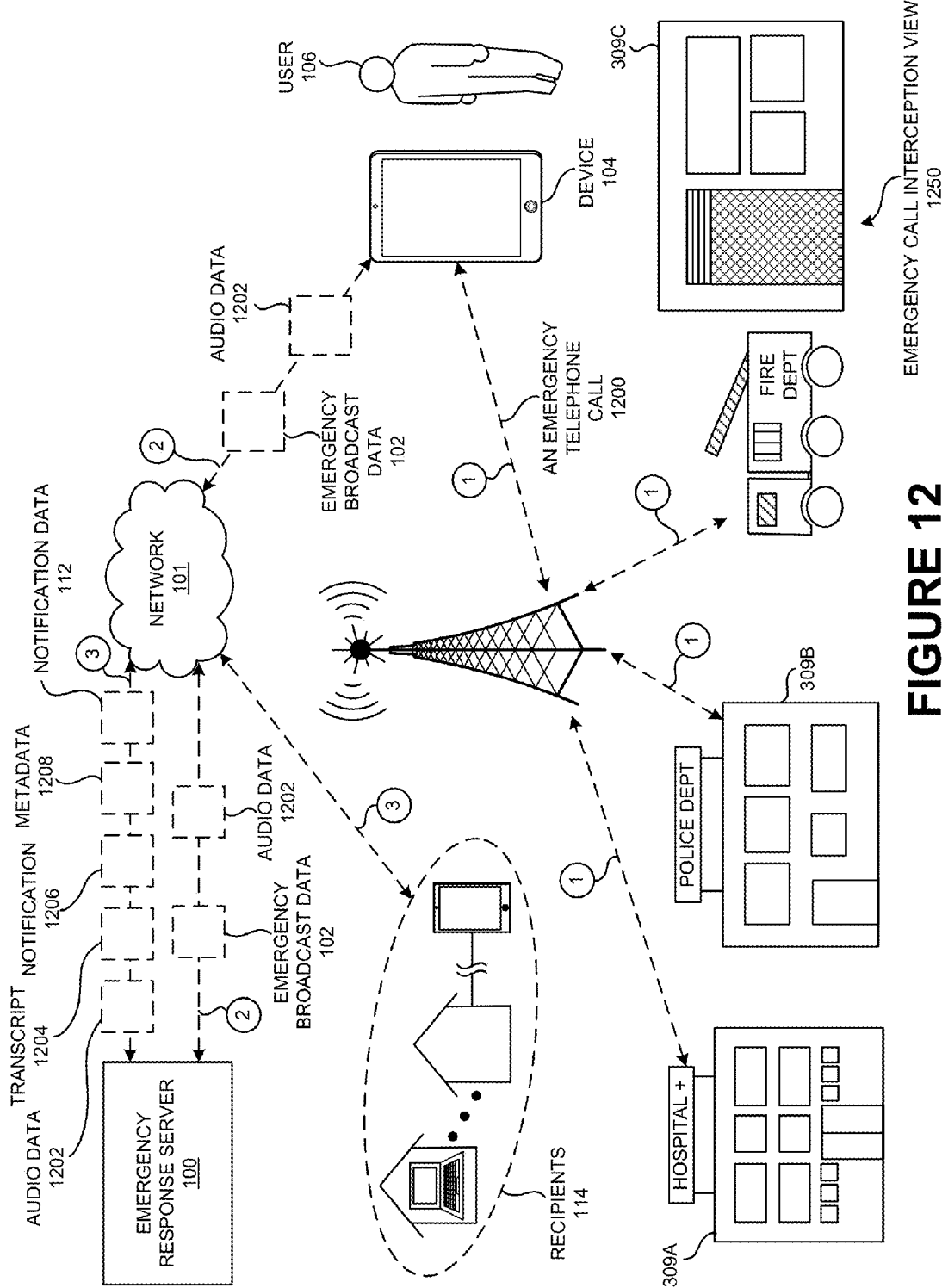
FIG. 12 is an emergency call interception view illustrating a transcript being generated and broadcast to recipients in response to an audio data of an emergency telephone call made from the user device of FIG. 1, according to one embodiment.

An emergency surveillance module 224 may monitor whenever the mobile device 504 associated with the verified user (e.g., the user 106 of FIG. 1 as described as the verified user 706 in FIG. 7) is used to generate an emergency telephone call 1200, as described in FIG. 12. An emergency capture module 226 may capture an audio data 1202 associated with the emergency telephone call 1200 made through the mobile device 504. A textual transcript may be generated from a transcript 1204 of the audio data 1202 through a transcription module 260 of the emergency response server 100.

An emergency capture module 226 may capture an audio data 1202 associated with the emergency telephone call 1200 made through the mobile device 504. A transcript may be generated from a transcript 1204 of the audio data 1202 through a transcription module 260 of the emergency response server 100.

An auto-notification module 218 may automatically broadcast a notification of the emergency telephone call 1200, the audio data 1202 associated with the emergency telephone call 1200, and/or the transcript 1204 of the emergency telephone call 1200 through the on-page posting, the electronic communication, and/or the push notification delivered to desktop and/or mobile devices 504 associated with users and/or their user profiles around the epicenter 144 defined at the set of geospatial coordinates 103 associated with the broadcast data (e.g., the emergency broadcast data 102) generated through the mobile device 504 using the radial algorithm 240.

A matching module 210 may determine a relative match between a persistent clock associated with the emergency response server 100 and/or a digital clock of the mobile device 504 to determine that the time stamp 510 associated with the creation date 508 and/or time of the emergency broadcast data 102 generated through the mobile device 504 may be accurate and/or therefore trusted. A deletion module 236 may automatically remove a publishing of the emergency broadcast data 102 generated through the mobile device 504 on a set of user profiles (e.g., preseeded user profiles 302 and/or claimed user profiles 304 as described in FIG. 3 having associated verified addresses in the threshold radial distance 119 from the set of geospatial coordinates 103 associated with the emergency broadcast data 102 generated through the mobile device 504 of the verified user (e.g., the user 106 of FIG. 1 as described as the verified user 706 in FIG. 7) of the emergency response server 100) based on an emergency alert expiration time. A plotting module 238 may geocode a set of residential addresses each associated with a resident name in a neighborhood surrounding the mobile device 504.

A data-seeding module 241 may prepopulate the set of residential addresses each associated with the resident name as the set of user profiles (e.g., preseeded user profiles 302 and/or claimed user profiles 304 as described in FIG. 3 in the threshold radial distance 119 from the claimed geospatial location (e.g., any of the claimed geospatial locations 700 as described in FIG. 7 of the verified user (e.g., the user 106 of FIG. 1 as described as the verified user 706 in FIG. 7) of the emergency response server 100) in a neighborhood curation system (e.g., part of the geospatially constrained social network 142) communicatively coupled with the emergency response server 100. A modification module 242 may alter content in each of the set of user profiles (e.g., preseeded user profiles 302 and/or claimed user profiles 304 as described in FIG. 3). A discovery module 244 may track the modified content through the neighborhood curation system (e.g., part of the geospatially constrained social network 142). An undo module 4 may generate a reversible history journal associated with each of the set of user profiles (e.g., preseeded user profiles 302 and/or claimed user profiles 304 as described in FIG. 3 such that a modification of the verified user (e.g., the user 106 of FIG. 1 as described as the verified user 706 in FIG. 7) can be undone on a modified user profile page. A reputation module 248 may determine an editing credibility of the verified user (e.g., the user 106 of FIG. 1 as described as the verified user 706 in FIG. 7) based on an edit history of the verified user (e.g., the user 106 of FIG. 1 as described as the verified user 706 in FIG. 7) and/or a community contribution validation of the verified user (e.g., the user 106 of FIG. 1 as described as the verified user 706 in FIG. 7) by other users of the neighborhood curation system (e.g., part of the geospatially constrained social network 142).

A publishing module 214 may automatically communicate the emergency broadcast data 102 generated through the mobile device 504 to a set of user profiles (e.g., preseeded user profiles 302 and/or claimed user profiles 304 as described in FIG. 3 having associated verified addresses in a threshold radial distance 119 from the claimed geospatial location (e.g., any of the claimed geospatial locations 700 as described in FIG. 7 of the verified user (e.g., the user 106 of FIG. 1 as described as the verified user 706 in FIG. 7) of the emergency response server 100) using the radial algorithm 240. A claiming module 250 may process a claim request of the verified user (e.g., the user 106 of FIG. 1 as described as the verified user 706 in FIG. 7) generating the emergency broadcast data 102 generated through the mobile device 504 to be associated with an address of the neighborhood curation system (e.g., part of the geospatially constrained social network 142). A private-neighborhood module 252 may determine if the claimable neighborhood in the neighborhood curation system (e.g., part of the geospatially constrained social network 142) may be associated with a private neighborhood community in the claimable neighborhood of the neighborhood curation system (e.g., part of the geospatially constrained social network 142).

An association module 216 may associate the verified user (e.g., the user 106 of FIG. 1 as described as the verified user

706 in FIG. 7) with the private neighborhood community in the claimable neighborhood of the neighborhood curation system (e.g., part of the geospatially constrained social network 142) if the private neighborhood community has been activated by the verified user (e.g., the user 106 of FIG. 1 as described as the verified user 706 in FIG. 7) and/or a different verified user (e.g., the user 106 of FIG. 1 as described as the verified user 706 in FIG. 7). A boundary module 254 may permit the verified user (e.g., the user 106 of FIG. 1 as described as the verified user 706 in FIG. 7) to draw a set of boundary lines in a form of a geospatial polygon such that the claimable neighborhood in a geospatial region surrounding the claim request creates the private neighborhood community in the neighborhood curation system (e.g., part of the geospatially constrained social network 142) if the private neighborhood community may be inactive. An address type module 256 may verify the claim request of the verified user (e.g., the user 106 of FIG. 1 as described as the verified user 706 in FIG. 7) generating the emergency broadcast data 102 generated through the mobile device 504 to be associated with a neighborhood address of the neighborhood curation system (e.g., part of the geospatially constrained social network 142) when the address may be determined to be associated with a work address and/or a residential address of the verified user (e.g., the user 106 of FIG. 1 as described as the verified user 706 in FIG. 7).

A concurrency module 258 may simultaneously publish the emergency broadcast data 102 generated through the mobile device 504 on the private neighborhood community associated with the verified user (e.g., the user 106 of FIG. 1 as described as the verified user 706 in FIG. 7) generating the emergency broadcast data 102 generated through the mobile device 504 in the threshold radial distance 119 from the address associated with the claim request of the verified user (e.g., the user 106 of FIG. 1 as described as the verified user 706 in FIG. 7) of the neighborhood curation system (e.g., part of the geospatially constrained social network 142) when automatically publishing the emergency broadcast data 102 generated through the mobile device 504 on a set of user profiles (e.g., preseeded user profiles 302 and/or claimed user profiles 304 as described in FIG. 3 having associated verified addresses in a threshold radial distance 119 from the claimed geospatial location (e.g., any of the claimed geospatial locations 700 as described in FIG. 7 of the verified user (e.g., the user 106 of FIG. 1 as described as the verified user 706 in FIG. 7) of the emergency response server 100) based on a set of preferences of the verified user (e.g., the user 106 of FIG. 1 as described as the verified user 706 in FIG. 7) using the radial algorithm 240.

The social community module 220 may generate a building creator in which the user 106 may create and/or modify empty unclaimed profiles (e.g., an unclaimed profile 1206 of FIG. 12A-12B, an unclaimed profile 1302 of FIG. 13A, an unclaimed profile 1706 of FIG. 17A-B), building layouts, social network pages, floor levels structures housing residents and/or businesses in the neighborhood.

A live broadcast module 228 may live broadcast the emergency broadcast data 102 generated through the mobile device 504 to the different verified user (e.g., the user 106 of FIG. 1 as described as the verified user 706 in FIG. 7) and/or other verified user (e.g., the user 106 of FIG. 1 as described as the verified user 706 in FIG. 7) in the private neighborhood community and/or currently within the threshold radial distance 119 from the current geo spatial location through the emergency response server 100 through a multicast algorithm 276 such that a live broadcast multicasts to a plurality of data processing systems associated with each of the different user and/or the other verified user (e.g., the user 106 of FIG. 1 as described as the verified user 706 in FIG. 7) simultaneously when the mobile device 504 of the verified user (e.g., the user 106 of FIG. 1 as described as the verified user 706 in FIG. 7) generating the live-broadcast enables broadcasting of the emergency broadcast data 102 generated through the mobile device 504 to any one of a geospatial vicinity around the mobile device 504 of the verified user (e.g., the user 106 of FIG. 1 as described as the verified user 706 in FIG. 7) generating the broadcast and/or in any private neighborhood community in which the verified user (e.g., the user 106 of FIG. 1 as described as the verified user 706 in FIG. 7) has a non-transitory connection.

A summary module 262 may generate a summary data 626 to the verified user (e.g., the user 106 of FIG. 1 as described as the verified user 706 in FIG. 7) generating the broadcast data (e.g., the emergency broadcast data 102) generated through the mobile device 504 through the mobile device 504 of how many user profile pages were updated with an alert of the broadcast data (e.g., the emergency broadcast data 102) generated through the mobile device 504 when publishing the broadcast data (e.g., the emergency broadcast data 102) generated through the mobile device 504 in the private neighborhood community and/or the set of user profiles having associated verified addresses in the threshold radial distance 119 from the claimed geospatial location of the verified user (e.g., the user 106 of FIG. 1 as described as the verified user 706 in FIG. 7) of the emergency response server 100 based on the set of preferences of the verified user (e.g., the user 106 of FIG. 1 as described as the verified user 706 in FIG. 7).

A bi-directional communication module 230 may permit the different verified user (e.g., the user 106 of FIG. 1 as described as the verified user 706 in FIG. 7) and/or other verified user (e.g., the user 106 of FIG. 1 as described as the verified user 706 in FIG. 7) in the private neighborhood community to bi-directionally communicate with the verified user (e.g., the user 106 of FIG. 1 as described as the verified user 706 in FIG. 7) generating the broadcast through the emergency response server 100. A moderation module 264 may apply a crowdsourced moderation algorithm 204 in which multiple neighbors to a geospatial area determine what content contributed to the emergency response server 100 persists and/or which may be deleted. A muting module 266 may permit users to mute messages of specific verified user (e.g., the user 106 of FIG. 1 as described as the verified user 706 in FIG. 7) to prevent misuse of the emergency response server 100.

An application module 274 may determine that an application on the mobile device 504 is communicating the broadcast data to the emergency response network 150 when the broadcast data is processed, and/or to associate the verified user (e.g., the user 106 of FIG. 1 as described as the verified user 706 in FIG. 7) with a verified user profile in the emergency response network 150 through the application on the mobile device 504.

A threshold module 268 may automatically set the threshold distance between 0.2 and/or 0.4 miles from the set of geospatial coordinates 103 associated with the emergency broadcast data 102 generated through the mobile device 504 to optimize a relevancy of the live-broadcast. A non-transitory module 270 may determine any private neighborhood community in which the verified user (e.g., the user 106 of FIG. 1 as described as the verified user 706 in FIG. 7) has a non-transitory connection may be a residential address of the verified user (e.g., the user 106 of FIG. 1 as described as the verified user 706 in FIG. 7) and/or a work address of the verified user (e.g., the user 106 of FIG. 1 as described as the verified user 706 in FIG. 7) that has been confirmed by the emergency response server 100 as being associated with the verified user (e.g., the user 106 of FIG. 1 as described as the verified user 706 in FIG. 7).

FIG. 3 is a broadcast view that demonstrates how the radial distribution module of FIG. 1 is used to communicate an emergency broadcast data to claimed user profiles, preseeded user profiles, and to telephone devices and/or internet-enabled devices through a heterogeneous network formed through the internet protocol network of FIG. 1 and through a cellular network, according to one embodiment.

Particularly, FIG. 3 illustrates a broadcast view 350, according to one embodiment. FIG. 3 introduces a claimed neighborhood 300, a set of preseeded user profiles 302, and a claimed user profile 304, and their relationships with elements previously described in FIG. 1. In addition, FIG. 3 explains the set of emergency services 109 of FIG. 1 to include a hospital 309A, a police department 309B, and a fire department 309C.

In FIG. 3, the claimed neighborhood 300 may refer to a region that may be claimed by the user 106 as being associated with a non-transitory location (e.g., a work address, a home address) of the user 106. The preseeded user profiles 302 may refer to address information from people and/or business directories that has been prepopulated in the geospatial social map and/or may be associated with manually placed pushpins on the geospatial map in the geospatially constrained social network 142 of FIG. 1. The claimed user profile 304 may refer to the verified user 706 associated with a verified address in the geospatial social map and/or may be associated with claimed pushpin (e.g., a previously preseeded residential and/or business profile) on the geospatial map in the geospatially constrained social network 142 of FIG. 1.

The hospital 309A, the police department 309B, and the fire department 309C may receive the emergency broadcast data 102 through their mobile devices, desktop devices, and/or through their cellular telephones. The hospital 309A, the police department 309B, and the fire department 309C may receive the emergency broadcast data 102 and may bi-directionally interact with the emergency services 109 through either cellular network 108 and/or through the network 101 (e.g., an internet protocol network). When a the emergency of the user 106 interacting with any one of the recipients 114 based on the bi-directional communication is responded to, the user 106 may be able to choose which hospital 309A, police department 309B and/or fire department 309C should respond.

The notification data 112 may be communicated through the network 101 to the preseeded user profiles 302 within a threshold radial distance 119 of the epicenter 144. Alternately, the notification data 112 may be communicated through the network 101 to different ones of the claimed user profile 304 within the claimed neighborhood 300 that are located within the threshold radial distance 119 from the epicenter 144. Additionally, as described in FIG. 4, it will be understood that the claimed neighborhood 300 may be situated partially within the threshold radial distance 119 and partially outside the threshold radial distance 119, yet the notification data 112 received by of the recipients 114 (e.g., having a claimed user profile) may be propagated to other claimed user profiles within the claimed neighborhood 300 even though they are outside the threshold radial distance 119.

The notification data 112 may also be communicated through the cellular network 108 or through the network 101 to the set of emergency services 109. For example, the hospital 309A may use the emergency response network 150 to monitor emergencies in a neighborhood and publish these emergencies to residents around a geospatial area of the neighborhood. In addition, the police department 309B and/or the fire department 309C may service a particular neighborhood and may be alerted of a new emergency based on a subscription they pay to access broadcasts from areas that they service. Additionally, it should be understood that other types of emergency service providers or businesses may receive the notification data 112. For example, additional services receiving the notification data 112 may include poison control, animal control, SWAT teams, FEMA, the national guard, the EPA, park rangers, coast guard, etc.

Figure 4:
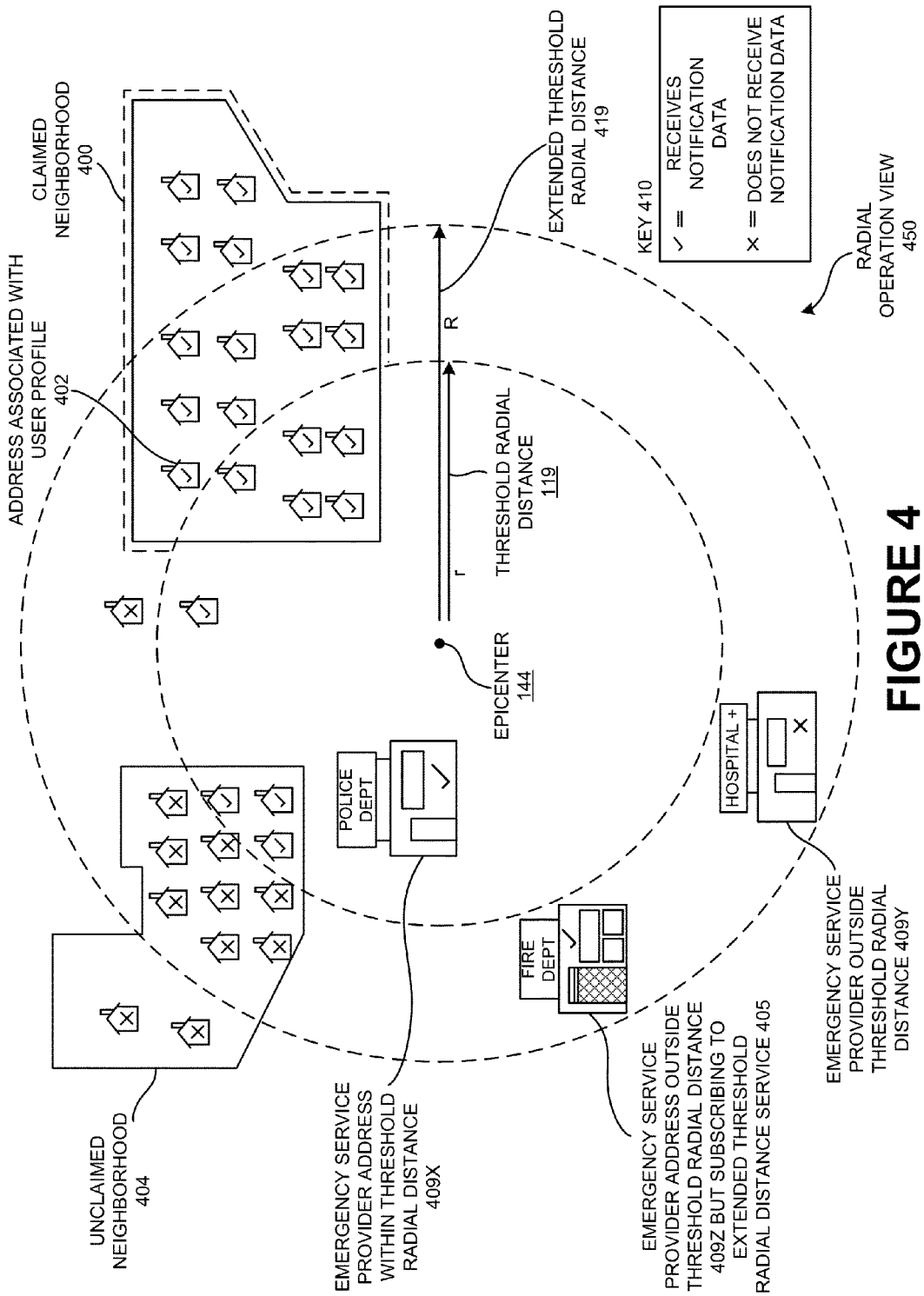
FIG. 4 is a radial operation view that illustrates an expansion of a threshold radial distance based on a claimed neighborhood at a radial boundary surrounding an epicenter formed by geospatial coordinates of the device of FIG. 1, according to one embodiment.

FIG. 4 is a radial operation view 450 that illustrates an expansion of a threshold radial distance based on a claimed neighborhood 400 at a radial boundary surrounding the epicenter 144 formed by geospatial coordinates of the device of FIG. 1, according to one embodiment. FIG. 4 illustrates a claimed neighborhood 400, an address associated with a user profile 402, an unclaimed neighborhood 404, an emergency service provider address outside the threshold radial distance as described in operation 409Z but subscribing to extend the threshold radial distance as described in operation 405, an emergency service provider within the threshold radial distance as described in operation 409X, an emergency service provider outside the threshold radial distance in operation 409Y, a key 410, and an extended threshold radial distance 419. The key 410 describes that a 'checkmark' inside a home in either the claimed neighborhood 400 and/or the unclaimed neighborhood 404 indicates that the emergency broadcast data 102 reaches a user associated with that address at a radial geospatial distance away. In contrast, the key 410 describes that an 'X mark' inside a home in either the claimed neighborhood 400 and/or the unclaimed neighborhood 404 indicates that the emergency broadcast data 102 does not reach a user associated with that address at a radial geospatial distance away.

Particularly, in FIG. 4, is an address associated with each user profile 402 is illustrated (e.g., neighbors of the user 106), according to one embodiment. In FIG. 4, because the claimed neighborhood 400 is partially within the threshold radial distance 'r', every verified user in the claimed neighborhood 400 receives the emergency broadcast data 102, according to one embodiment. Thereby, the radial broadcast distance 'r' is extended to a' as illustrated in FIG. 4 (e.g., the extended threshold radial distance 419 of FIG. 4). It should be understood that in an alternate embodiment, the radial broadcast of the emergency broadcast data 102 may not extend to the entire group of users of the claimed neighborhood 400. However, to promote neighborhood communication and cooperation, the emergency broadcast data 102 is illustrated as being extended to the claimed neighborhood 400 in the embodiment of FIG. 4.

It should be also noted that in some embodiments, the "preseeded user profiles" may be users that have previously signed up for the geospatially constrained social network 142, as opposed to users that have been preseeded there in a social network. For example, in one alternate embodiment, each of the claimed neighborhood 400 may serve as an approximate to actual radial distribution, in that broadcast messages are solely sent to claimed neighborhoods (e.g., private claimed neighborhoods) of actual users in a vicinity of a broadcast (rather than to public profiles).

FIG. 4 also illustrates an unclaimed neighborhood 404. The unclaimed neighborhood 404 may be preseeded based on public data, according to one embodiment. The unclaimed neighborhood has within it a series of addresses (e.g., associated with non-transitory homes and/or business locations), according to one embodiment as illustrated in FIG. 4. Those addresses in the unclaimed neighborhood 404 to whom the emergency broadcast data 102 is delivered have a 'checkmark', according to one embodiment. In contrast, those addresses in the unclaimed neighborhood 404 to whom the emergency broadcast data 102 is not delivered have an 'X mark', as illustrated in FIG. 4. Particularly, addresses in the radial boundary 'r' have a check mark, whereas addresses that are outside the radial boundary 'r' (e.g., and therefore outside the threshold radial distance 119) are marked with the 'X mark'. In this example embodiment of FIG. 4 showing the unclaimed neighborhood 404, the addresses within the threshold radial distance 119 are the addresses that receive the emergency broadcast data 102.

Also illustrated in FIG. 4 is the concept of the emergency service provider address within the threshold radial distance as shown in operation 409X, the service provider address outside the threshold radial distance but subscribing to extend threshold radial distance service as shown in operation 405 (e.g., a service that extends the threshold radial distance to 'R', the extended threshold radial distance 419), and the service provider outside the threshold radial distance as illustrated in operation 409Y. Each of these different operations will be compared and contrasted. The emergency service provider address in operation 409X may receive the emergency broadcast data 102 because the service provider in this example embodiment of FIG. 4 is within the threshold radial distance 119, according to one embodiment. The emergency service provider address in operation 405 may receive the emergency broadcast data 102 because they provide a consideration (e.g., pay a monthly subscription, annual fee, and/or pay per access/use fee) to the geospatially constrained social network 142, even though the emergency service provider in operation 405 does not have a physical address within the threshold radial distance 119. In an alternate embodiment, the emergency service providers need not pay a consideration for this service due to the beneficial societal nature of their participation in the geospatially constrained social network 142. The geospatially constrained social network 142 (e.g., or emergency response server 100) may verify, confirm, and/or ask for an assurance that the emergency service provider actually provides emergency services in the threshold radial distance 119. The geospatially constrained social network 142 (and other the emergency response server 100) may request feedback, reviews, and comments from homes/businesses in the geospatially constrained social network 142 for the emergency services in operation 405 and operation 409X to ensure that they continue to be recommended and/or are permitted to participate in the threshold radial distance 119 around the epicenter 144 (e.g., where the broadcast originates) in the geospatially constrained social network 142. Operation 409Y indicates that a service provider outside the threshold radial distance 119 does not receive the emergency broadcast data 102, and therefore cannot participate bi-directionally in the geospatially constrained social network 142.

Figure 5:
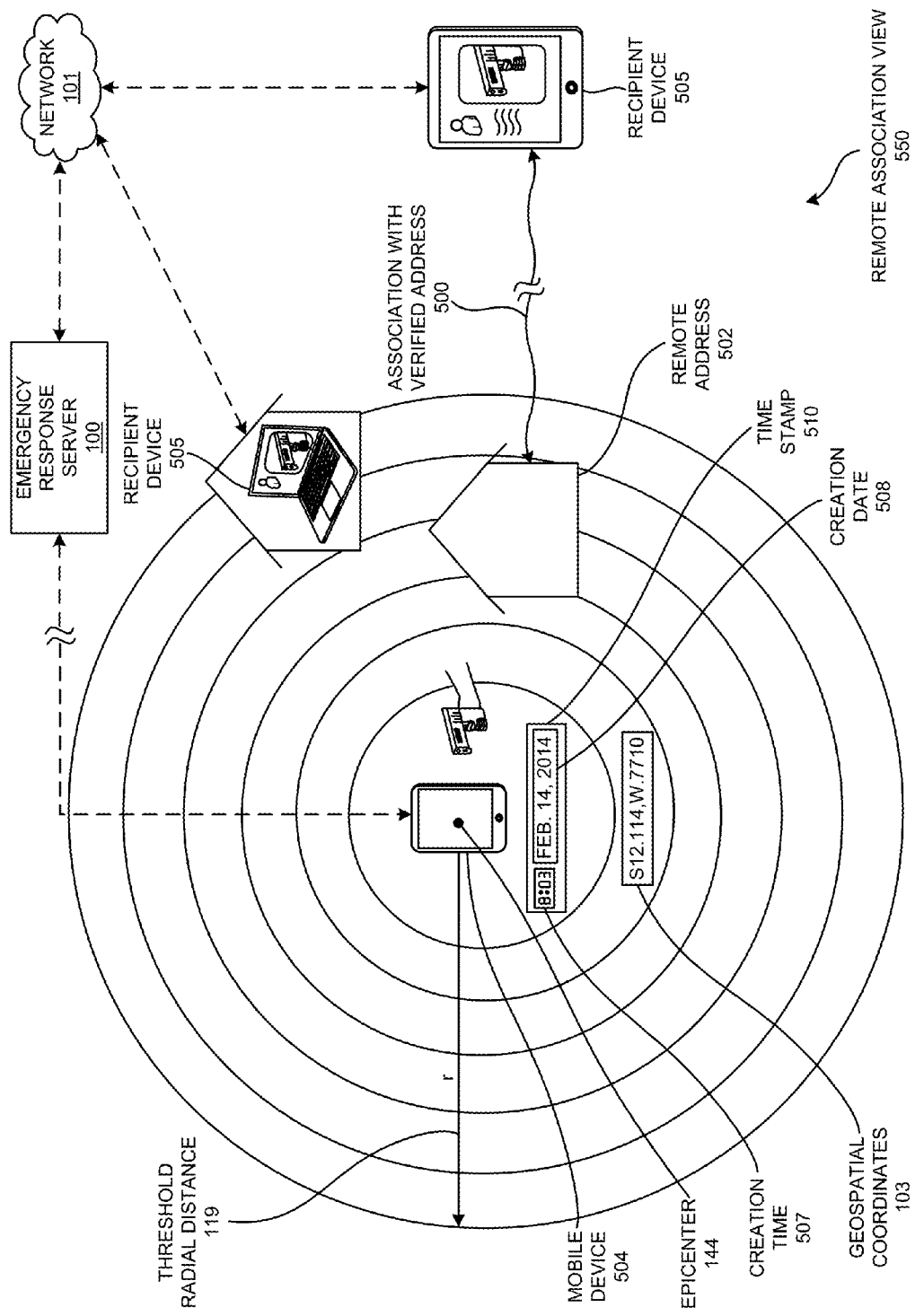
FIG. 5 illustrates a remote association view in which a recipient device receives the emergency broadcast data from a mobile device based on a non-transitory claimed address associated with a profile of the recipient even when the mobile device is outside a threshold radial distance of a broadcast, according to one embodiment.

FIG. 5 illustrates a remote association view 550 in which a recipient device 505 (e.g., a cellphone, mobile phone, a computer, a tablet) of an recipient receives the emergency broadcast data of FIG. 3 based on a non-transitory claimed address associated with a profile of the recipient even when the recipient's device is outside a threshold radial distance of a broadcast, according to one embodiment.

Particularly, FIG. 5 illustrates an operation of an association with verified address 500 which illustrates the recipient device 505 can be associated to a remote address 502, and a time stamp 510 associated with a creation time 507, a creation date 508, and a set of geospatial coordinates 103 generated from a mobile device 504. The remote address 502 may be a non-transitory location such as a home and/or a work address of the recipient 114 (e.g., the user 106 generating the emergency broadcast data 102), according to one embodiment. The non-transitory location may be a place of domicile (e.g., a home) and/or a place of situs (e.g., a physical location and/or a principle place of business) of a property (e.g., a work address) and/or business associated with the user 106), according to one embodiment. The concept illustrates that the recipient device 505 may be located at a physical location outside the threshold radial distance 119 and still get the emergency broadcast data 102 and/or the notification data 112 if the recipient device 505 (e.g., a mobile phone) has verified an address at a location that they care about and/or are associated with (e.g., a location in which they live, work, and/or have guest access) that is within the threshold radial distance 119. In other words, the user 106 may receive broadcast (e.g., the notification data 112 an/or the emergency broadcast data 102 which may be live streamed and/or through after the event notifications) related to a radial distance from their home and/or work even when physically at a location outside their claimed non-transitory location.

Figure 6A:
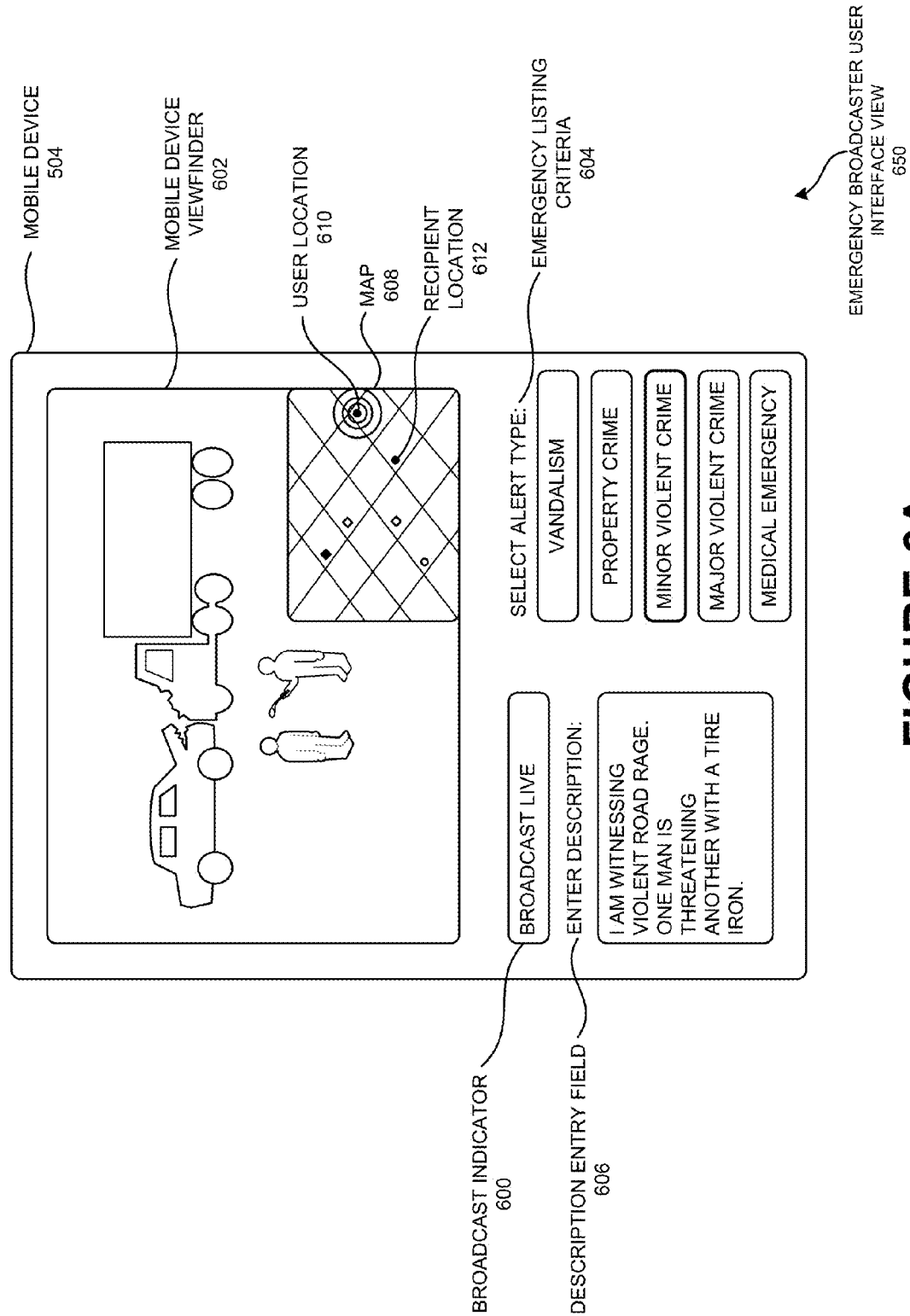
FIG. 6A is an emergency broadcaster user interface view of the mobile device of FIG. 5 that shows how the user can generate and broadcast the broadcast data, according to one embodiment.

FIG. 6A is an emergency broadcast user interface view 650 of the mobile device of FIG. 5 that shows how the user can generate the and broadcast the broadcast data, according to one embodiment.

Particularly, FIG. 6A illustrates a broadcast indicator 600, a mobile device viewfinder 602, an emergency listing criteria 604, a description entry field 606, a map 608, a user location 610 and a recipient location 612, according to one embodiment.

In FIG. 6A, the user 106 generating the emergency broadcast data 102 sent to the emergency response server 100 may use the mobile device viewfinder 602 to frame the emergency scene (e.g., a crime, an accident, a medical emergency) perceived by the mobile device camera and/or video device. The user 106 may then broadcast live the video in the mobile device viewfinder 602 by pressing and/or selecting the broadcast indicator 600. The user 106 may also enter text to help the recipients 114 of the emergency broadcast data 102 understand the emergency in the description entry field 606. The user 106 may also select the emergency listing criteria 604 (e.g., vandalism, property crime, minor violent crime, major violent crime, medical emergency) to be incorporated into the emergency broadcast data 102 and/or the notification data 112. The map 608 may also show the user location 610 so that they may navigate away from the emergency scene or see the recipient location 612 receiving and/or responding to the user 106's notification data 112. For example, the user 106, witnessing a car accident in which one man, in a fit of road-rage, is about to bludgeon another man with a tire iron, may center the mobile device viewfinder 602 on the unfolding incident, type a short description in the description entry field 606 (e.g., "I am witnessing violent road rage. One man is threatening another with a tire iron"), select the appropriate emergency listing criteria 604 (e.g., minor violent crime), and activate the broadcast indicator 600 to broadcast the notification data 112 to recipients 114 in the geospatial area around the user 106.

Figure 6B:
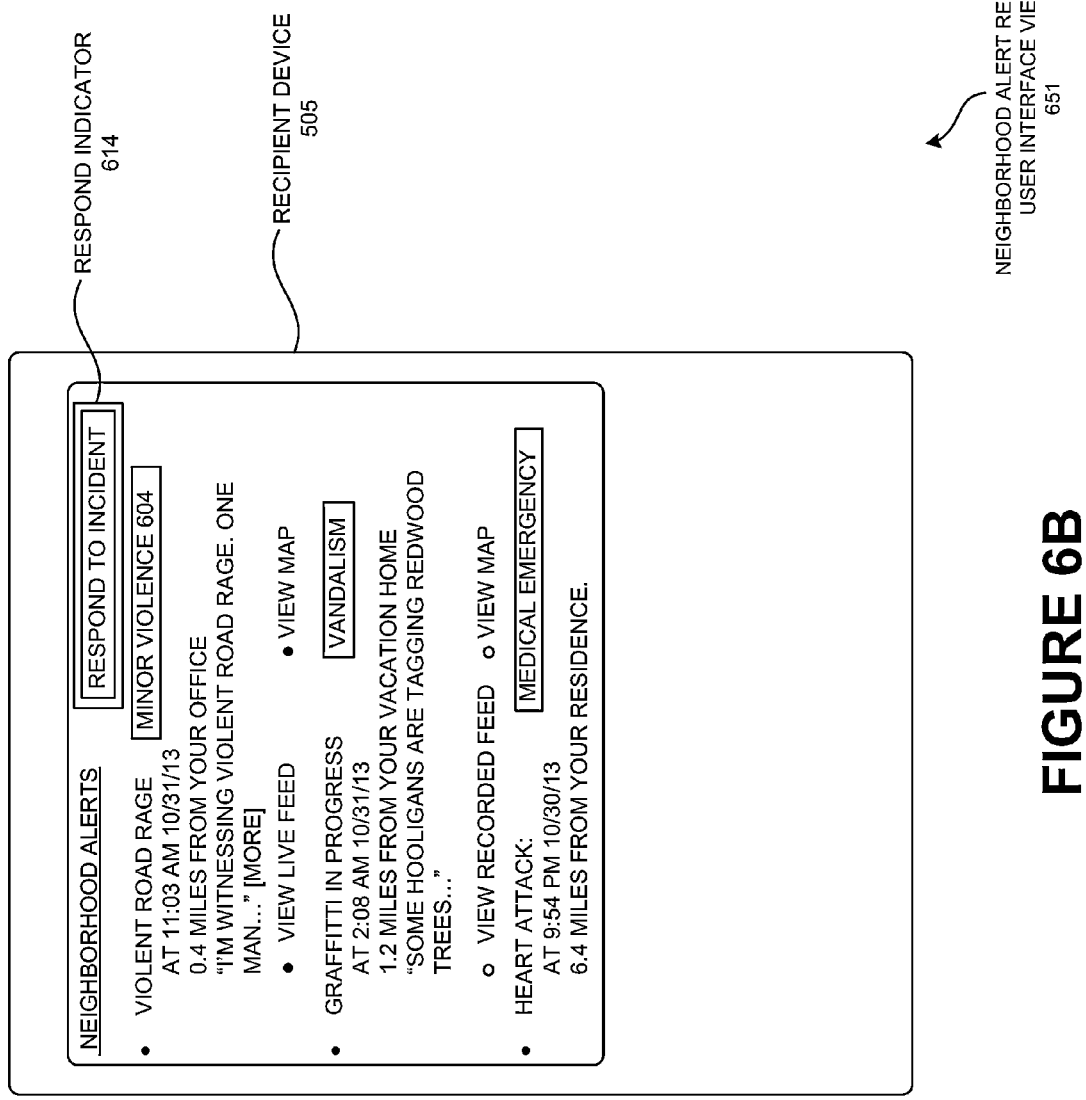
FIG. 6B is a neighborhood alert user interface view of the recipient device of FIG. 5, in which the broadcast data generated through the user interface of FIG. 6A including live video is presented to the recipient, according to one embodiment.

FIG. 6B depicts a neighborhood alert user interface view 651 of the recipient device of FIG. 5, in which the broadcast data generated through the user interface of FIG. 6A including live video is presented to the recipient, according to one embodiment.

Particularly, FIG. 6B further illustrates a respond indicator 614, according to one embodiment. In FIG. 6B a condensed form of the emergency broadcast data 102 and/or the notification data 112 is displayed to the recipient 114 on the recipient device 505. For example, the displayed information may include a time of the broadcast, a date of the broadcast, the emergency listing criteria 604, a description written by the user 106 in the description entry field 606 on the mobile device 504, and/or links allowing the recipient 114 to view the live feed of the emergency broadcast data 102 or the map of the geospatial location of the broadcast. In addition, the embodiment of the neighborhood alert recipient user interface view 651 may include a respond indicator 614 that may allow the recipient 114 to send a communication to the user 106 that the recipient 114 may be responding to the emergency.

Figure 6C:
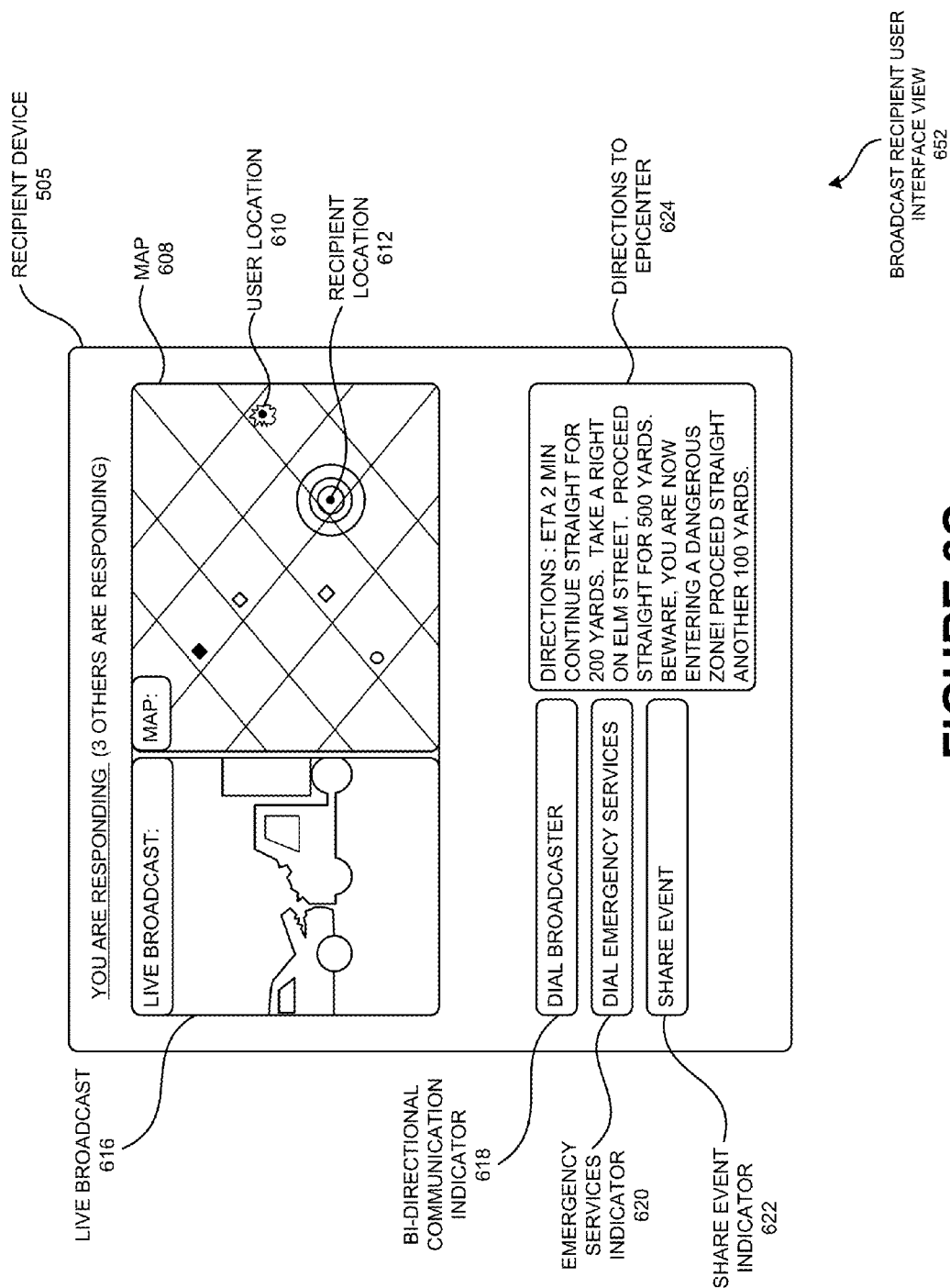
FIG. 6C is a broadcast recipient user interface view of the recipient device of FIG. 5 in which the recipient device is receiving a live broadcast after the recipient of FIG. 1 has activated the respond indicator of FIG. 6B, according to one embodiment.

FIG. 6C is a broadcast recipient user interface view 652 of the recipient device of FIG. 5 in which the recipient device is receiving a live broadcast after the recipient has activated the respond indicator of FIG. 6B, according to one embodiment.

Particularly, FIG. 6C further illustrates a live broadcast 616, a bi-directional communication indicator 618, an emergency services indicator 620, a share event indicator 622, and a directions to epicenter 624.

According to the embodiment of FIG. 6C, the recipient device 505 may display the live broadcast 616 generated by the mobile device 504. The recipient device 505 may also display the map 608 with the user location 610 and the recipient location 612 to help the recipient 114 either avoid or respond to the emergency. The recipient device 505 may display an indicator for forming a bi-directional communication with the user 106 (e.g., an indicator labeled "dial broadcaster") the bi-directional communication indicator 618. Further, the user interface depicted in FIG. 6C may include a share event indicator 622 to allow the recipient 114 to share the information with other persons (e.g., through email, test message, phone call). The embodiment of FIG. 6C also shows the direction to epicenter 624 that may help the recipient 114 navigate to the emergency. For example, the recipient 114 may press the respond indicator on the recipient device 505 in response to a neighborhood alert and then be shown the broadcast recipient user interface view 652 where the recipient 114 can view the live broadcast 616, call the user 106 by activating the bi-directional communication indicator 618, and then navigate to the emergency at the user location 610 using the map 608 and the directions to epicenter 624.

FIG. 6D is a summary data user interface view 653 of the mobile device of FIG. 5 in which the user may see the recipients of the broadcast, the recipients watching the live feed of FIG. 6C, and which emergency services of FIG. 3 were contacted, according to one embodiment.

Particularly, FIG. 6B further illustrates a summary data 626 a summary of recipients notified 628, a summary of recipients viewing live broadcast data 630, a summary of emergency services contacted 632, a summary of recipients responding 634, and a unique submission identifier 636.

In the embodiment of FIG. 6D, the user 106 is presented with a collection of the summary data 626. The summary data 626 may display on the mobile device 504 how many recipients received the live broadcast 616 by the summary of recipients notified 628. The summary data 626 may also show by the summary of recipients notified 628 how many user profile pages were updated with an alert of the emergency broadcast data 102 generated through the mobile device 504 when publishing the emergency broadcast data 102 generated through the mobile device 504 in the private neighborhood community and/or the set of user profiles (e.g., preseeded user profiles 302 and/or claimed user profiles 304 as described in FIG. 3 having associated verified addresses (in the threshold radial distance 119 from the claimed geospatial location (e.g., any of the claimed geospatial locations 700 as described in FIG. 7 of the verified user (e.g., the user 106 of FIG. 1 as described as the verified user in FIG. 7) of the emergency response server 100))) based on the set of preferences of the verified user (e.g., the user 106 of FIG. 1 as described as the verified user in FIG. 7).

Additionally, the user 106 may also be able to see who watched their live broadcast 616 by the summary of recipients viewing live broadcast data 630. The summary data 626 may also include the summary of emergency services contacted 632 and the summary of recipients responding 634 so that the user 106 may know who is responding and about how long it may take them to arrive. Additionally, the embodiment of FIG. 6D may include the unique submission identifier 636 to uniquely catalogue a submission for later evidence retrieval (e.g., aiding in preparation of insurance claims, aiding in diagnosis, aiding in criminal trial prosecution or defense).

FIG. 7 is a claimed location user interface view 750 that explains how a claimed user reviews their emergency broadcasts that they made and manages the neighborhoods that they have claimed, according to one embodiment.

FIG. 7 is a claimed location user interface view 750 that explains how a user manages notifications in neighborhoods that they have claimed and reviews their previous broadcasts, according to one embodiment. Particularly, FIG. 7 describes claimed geospatial locations 700 of a verified user ('Joe'). The claimed geospatial locations 700 will show up when the user 106 becomes the verified user (e.g., by proving the addresses of the claimed geospatial locations 700 by proving utility bills associated with that address). FIG. 7 also shows a broadcasting history of the user, including the emergency listing criteria 604, the creation time 507, the creation date 508, the time stamp 510, and the unique submission identifier 636 of past broadcasts.

Figure 8:
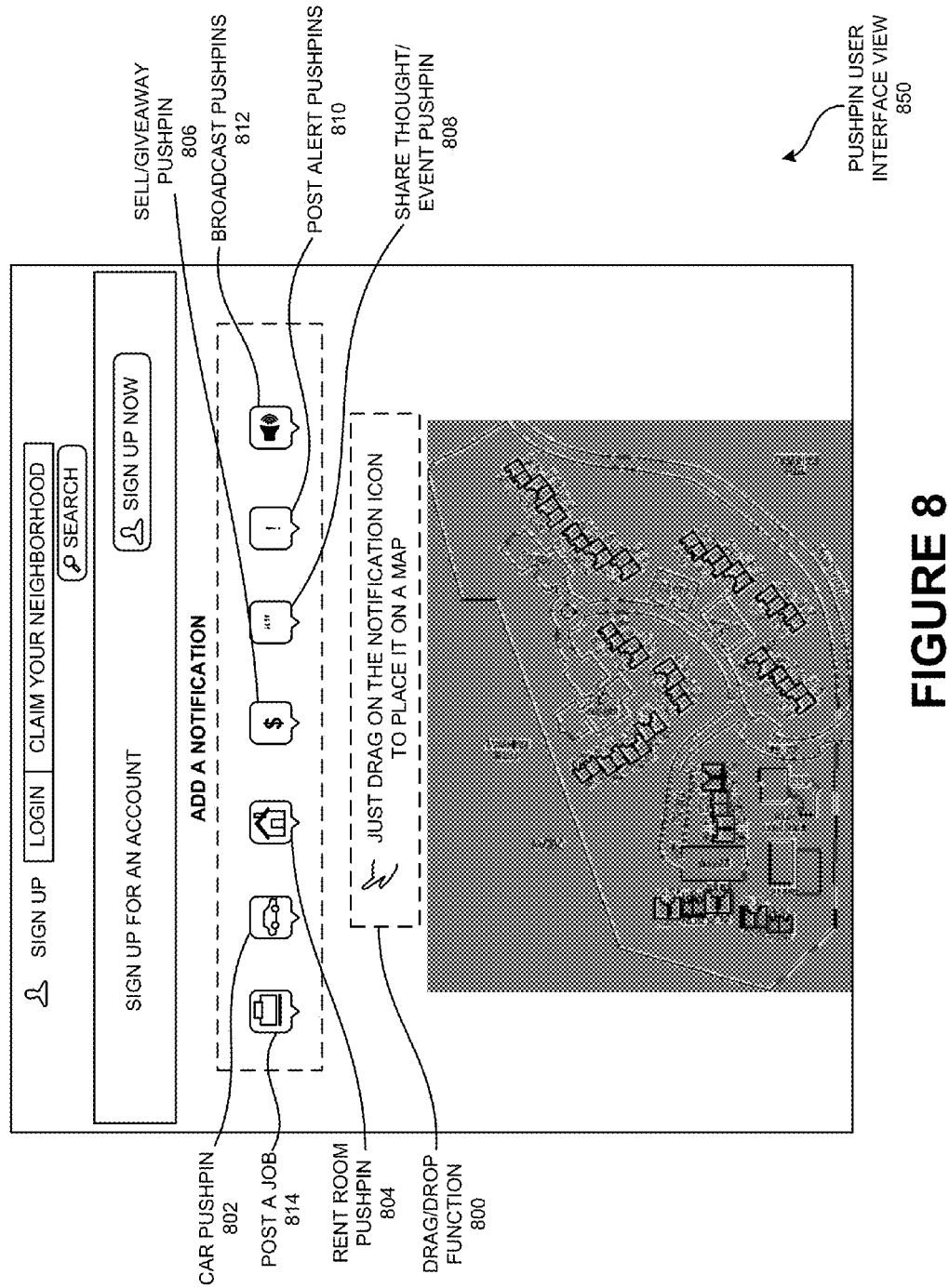
FIG. 8 is a pushpin user interface view that explains how a user drags pushspins to a map including a broadcast pushpin, which is different than other pushpins in that a time and a location of the broadcast pushpin is fixed based on a set of geospatial coordinates associated with a mobile device of the claimed user of FIG. 7, according to one embodiment.

FIG. 8 is a pushpin user interface view 850 that explains how the user drags pushspins to a map including a broadcast pushpin, which is different than other pushpins in that a time and a location of the broadcast pushpin is fixed based on a set of geospatial coordinates associated with a mobile device of the claimed user of FIG. 7, according to one embodiment. Particularly, FIG. 8 illustrates a drag/drop function 800 associated with a car pushpin 802, a rent room pushpin 804, a sell/giveaway pushpin 806, a share thought/event pushpin 808, a post emergency alert pushpin 810, a broadcast pushpin 812, and a post an emergency pushpin 814, according to one embodiment.

In FIG. 8, the broadcast pushpin 812 (e.g., that may generate the emergency broadcast data 102) may be unique in that it can only be placed through a device that has a geospatial chip and which can verify a geo-spatial location of a device making the broadcast. In this way, the broadcast pushpin 812 is fixed in time and place, whereas the other pushpins can be manually dragged to the map through the drag/drop function 800.

Figure 9:
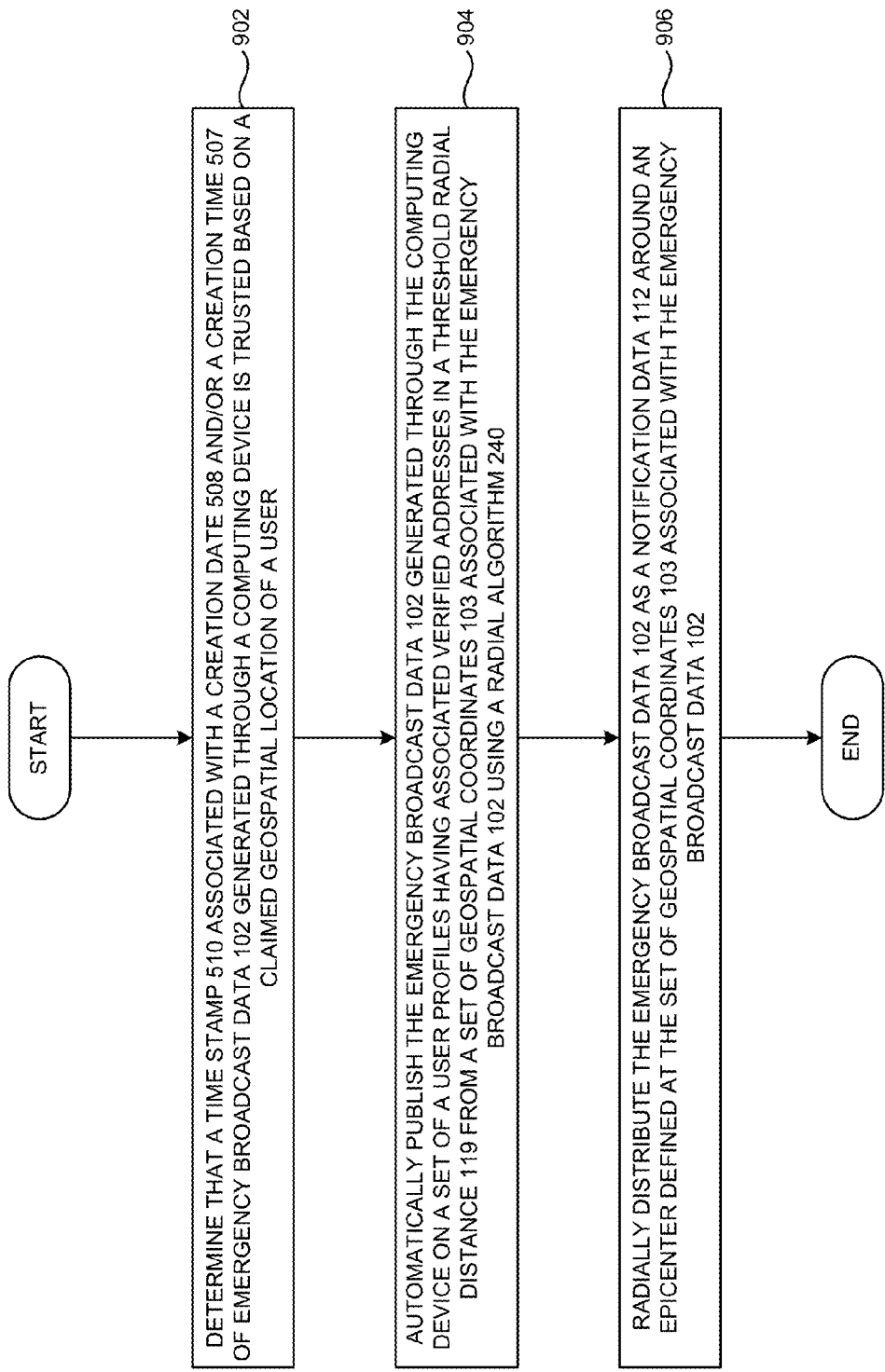
FIG. 9 is a process flow of radially distributing the emergency broadcast data of FIG. 3 as a notification data around an epicenter defined at the set of geospatial coordinates of FIG. 8 associated with the emergency broadcast data, according to one embodiment.

FIG. 9 is a process flow of radially distributing the emergency broadcast data of FIG. 3 as a notification data around an epicenter defined at the set of geospatial coordinates of FIG. 8 associated with the emergency broadcast data, according to one embodiment. Particularly, in FIG. 9, operation 902 may determine that a time stamp 510 associated with a creation date 508 and/or a creation time 507 of the emergency broadcast data 102 generated through a computing device (e.g., the device 104) is trusted based on a claimed geospatial location of a user (e.g., the user 106), according to one embodiment. Then, in operation 904, the emergency broadcast data 102 generated through the computing device may be automatically published on a set of user profiles having associated verified addresses in a threshold radial distance 119 from a set of geospatial coordinates 103 associated with the emergency broadcast data 102 using a radial algorithm 240. Next, in operation 906, the emergency broadcast data 102 may be radially distributed as the notification data 112 around an epicenter defined at the set of geospatial coordinates 103 associated with the emergency broadcast data 102.

Figure 10:
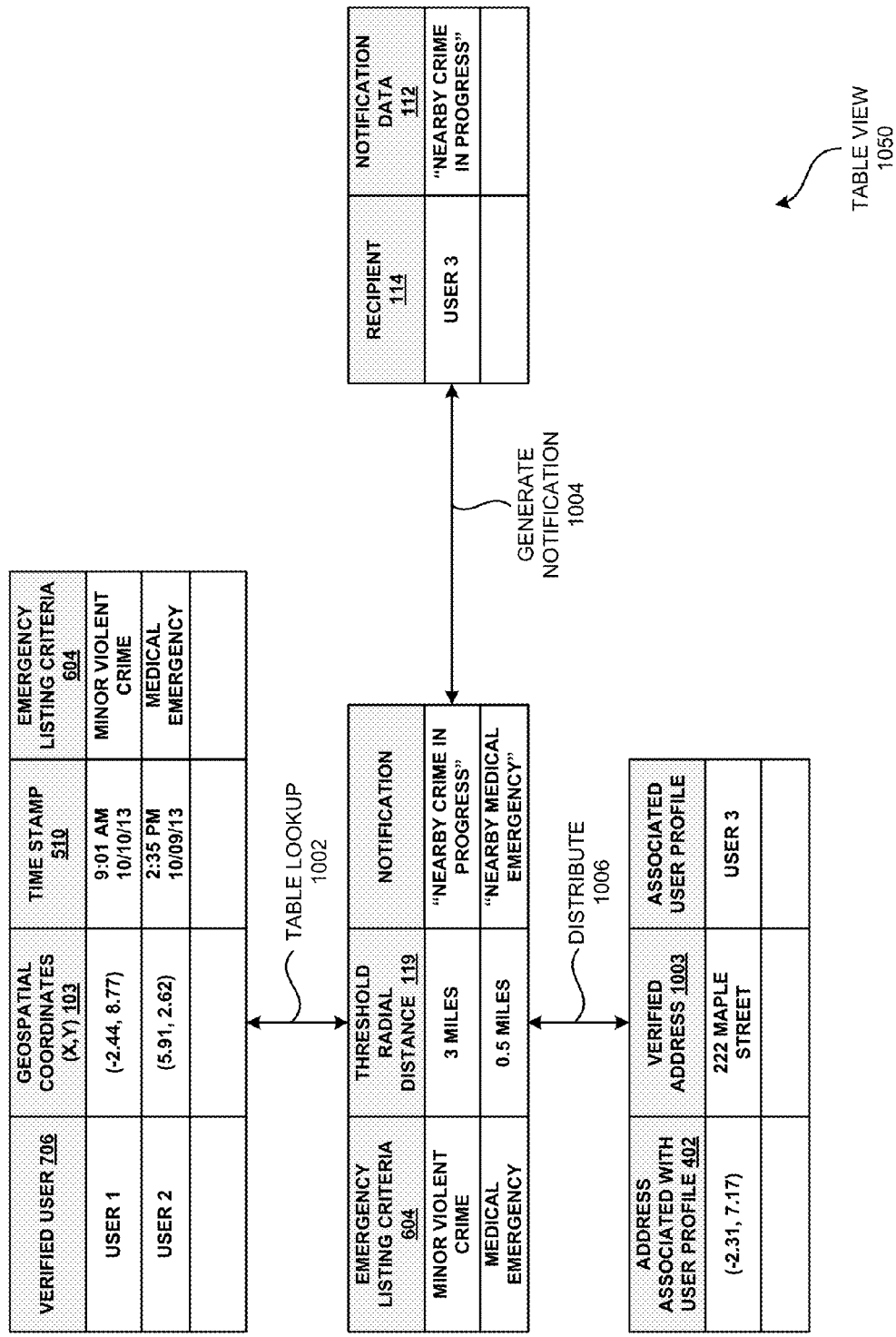
FIG. 10 is a table view illustrating data relationships between users, locations, and with a set of notification types needed to generate a broadcast, according to one embodiment.

FIG. 10 is a table view illustrating data relationships between users, locations, and with a set of notification types needed to generate a broadcast, according to one embodiment. In FIG. 10, a table lookup 1002 may be performed in which an emergency listing criteria 604 is matched with a threshold radial distance 119 and a notification data 112. Then, a notification may be generated using the generate notification operation 1004 from the recipient 114, and distributed to the verified address (e.g., the verified address 1003) in the threshold radial distance 119 using the distribute operation 1006, according to one embodiment.

Figure 11:
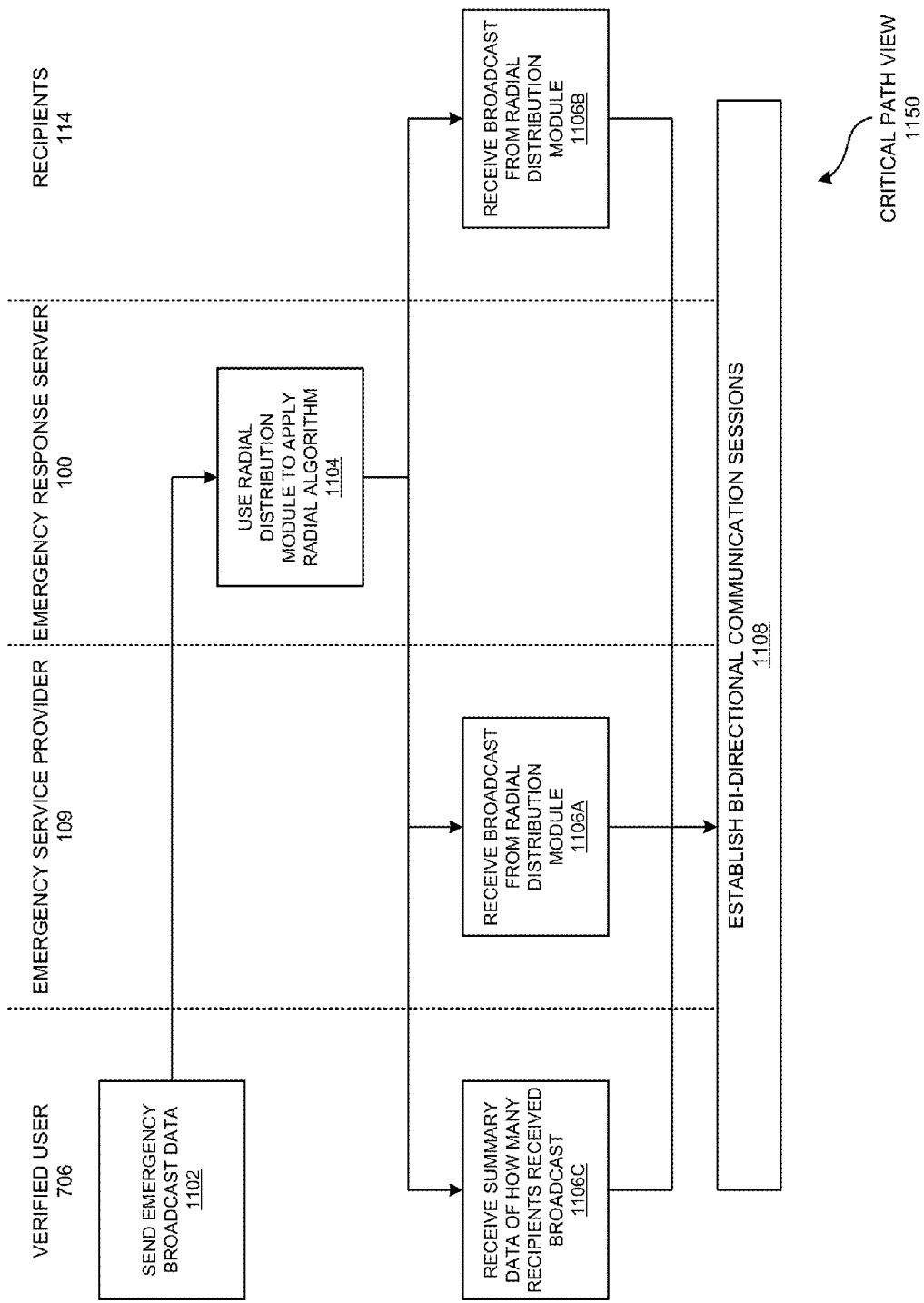
FIG. 11 is a critical path view illustrating a flow based on time in which critical operations in establishing a bi-directional session between a verified user and those individuals receiving the emergency broadcast data of FIG. 3 is established, according to one embodiment.

FIG. 11 is a critical path view 1150 illustrating a flow based on time in which critical operations in establishing a bi-directional session between a verified user and those individuals receiving the emergency broadcast data of FIG. 3 is established, according to one embodiment. In FIG. 11, a verified user sends an emergency broadcast data 102 to the emergency response server 100 in operation 1102. Then, the emergency services 109 receive the emergency broadcast data 102 from the radial distribution module 140 of the emergency response server 100 in operation 1106A, according to one embodiment. Similarly, the recipients 114 receive the emergency broadcast data 102 from the radial distribution module 140 of the emergency response server 100 in operation 1106B, according to one embodiment. Based on operation 1106A and 1106B, the verified user may automatically receive a summary (e.g., the summary data 626) of how many recipients received the emergency broadcast data 102 in operation 1106C. Next, bidirectional communication sessions are established between the verified user and the service provider and/or the recipients 114 in operation 1108.

FIG. 12 is an emergency call interception view 1250 illustrating a transcript being generated and broadcast to recipients in response to an audio data of an emergency telephone call made from the user device of FIG. 1, according to one embodiment.

Particularly, FIG. 12 further illustrates an emergency telephone call 1200, an audio data 1202, a transcript 1204, a notification 1206, and a metadata 1208. First, along path circle '1', the user 106 may make the emergency telephone call 1200 to emergency services 109 (e.g., the hospital 309A, the police department 309B, the fire department 309C). Second, the audio data 1202 and/or the emergency broadcast data 102 may be automatically generated from an application on the device 104 associated with the user 106 or by a monitoring system of the emergency response server 100 (e.g., the emergency surveillance module 224). The audio data 1202 and/or the emergency broadcast data 102 may move along path circle '2' through the network 101 to the emergency response server 100. The emergency response server may then broadcast to the recipients 114 along path circle '3' using the radial distribution module 140 the notification 1206 that the emergency telephone call 1200 was made, the audio data 1202 associated with the call, the transcript 1204 of the audio data 1202, the metadata 1208 associated with the call, or the notification data 112. For example, if the user 106 makes the emergency telephone call 1200 the audio data 1202 may be automatically sent to the emergency response server 100 where a transcript of the emergency telephone call 1200 is generated and broadcast to the recipients 114 using the radial distribution module 140 of the emergency response server 100. While dialing the emergency services 109 may be an engrained reaction of users, the associated automatic broadcast from their mobile device may allow a faster response by a more qualified, skilled, prepared or relevant assistant. It should be appreciated by one skilled in the art that the recipients 114 may also be constituents of the emergency services 109 (e.g., the hospital 309A, poison control, etc.).

Figure 13:
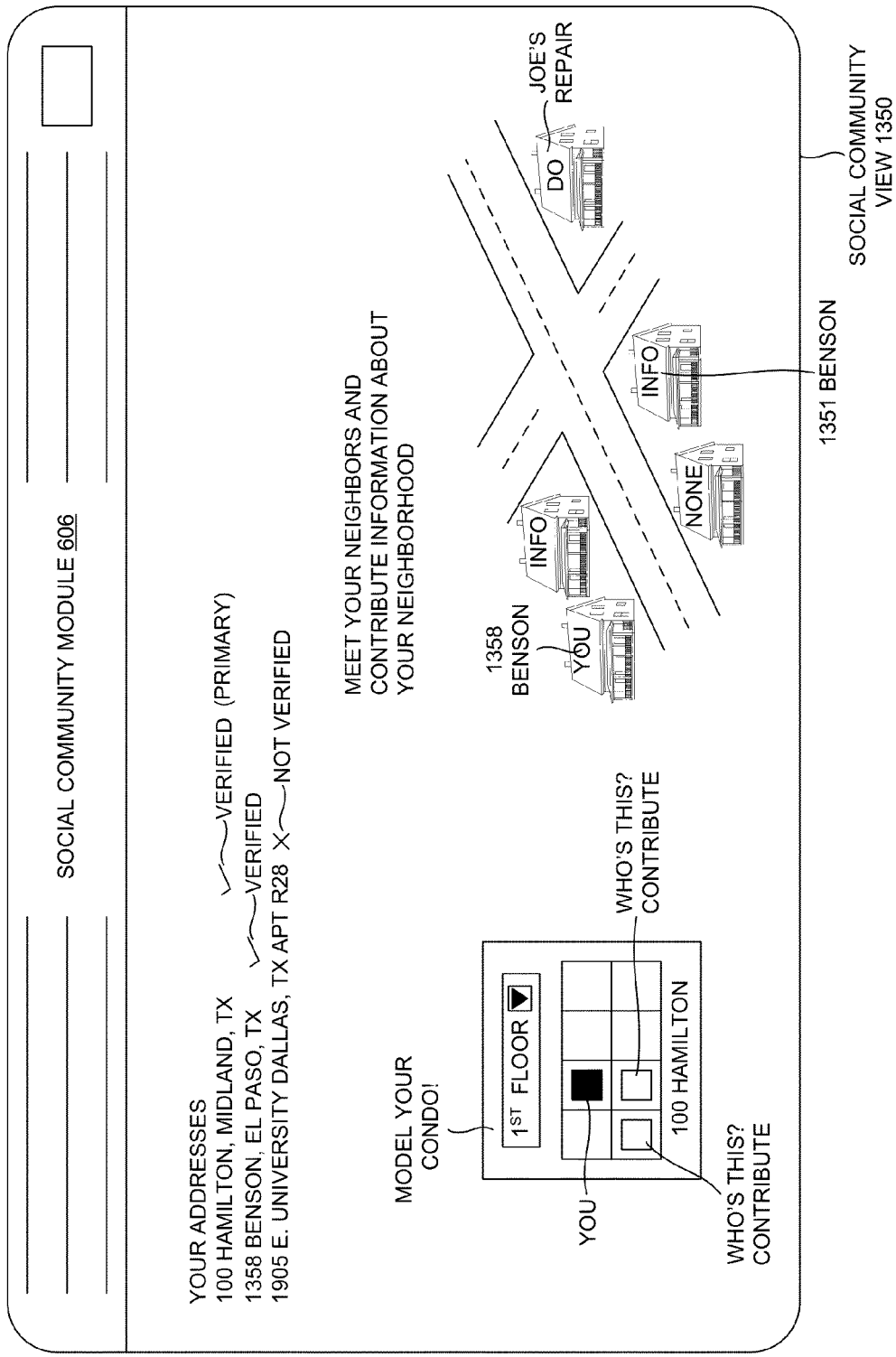
FIG. 13 is a social community view of a social community module, according to one embodiment.

FIG. 13 is a user interface view of the social community module 220, according to one embodiment. The user interface view 1350 may display the information associated with the social community module (e.g., the social community module 220 of FIG. 2). The user interface view 1350 may display map of the specific geographic location associated with the user profile of the social community module (e.g., the social community module 220 of FIG. 2). The user interface view 1350 may display the map based geographic location associated with the user profile (e.g., the user profile 1700 of FIG. 17A) only after verifying the address of the registered user of the global neighborhood environment (e.g., the geospatially constrained social network 142 of FIG. 1).

In addition, the user interface view 1350 may provide a building creator (e.g., the building builder 2102 of FIG. 21), in which the registered users of the global neighborhood environment (e.g., the geospatially constrained social network 142 of FIG. 1) may create and/or modify empty unclaimed profiles (i.e., wiki profiles such as the unclaimed profile 1706 of FIG. 17A-17B, a unclaimed profile 1802 of FIG. 18A, a unclaimed profile 2204 of FIG. 22), building layouts, social network pages, etc. The user interface view 1350 of the social community module 220 may enable access to the user (e.g., the user 106 of FIG. 1) to model a condo on any floor (e.g., basement, ground floor, first floor, etc.) selected through the drop down box by the registered user of the global neighborhood environment (e.g., the geospatially constrained social network 142 of FIG. 1). The user interface view 1350 of the social community module (e.g., the social community module 220 of FIG. 2) may enable the registered user of the global neighborhood environment (e.g., the geospatially constrained social network 142 of FIG. 1) to contribute information about their neighbors (e.g., the other addresses associated with user profiles 402 of FIG. 4).

Figure 14:
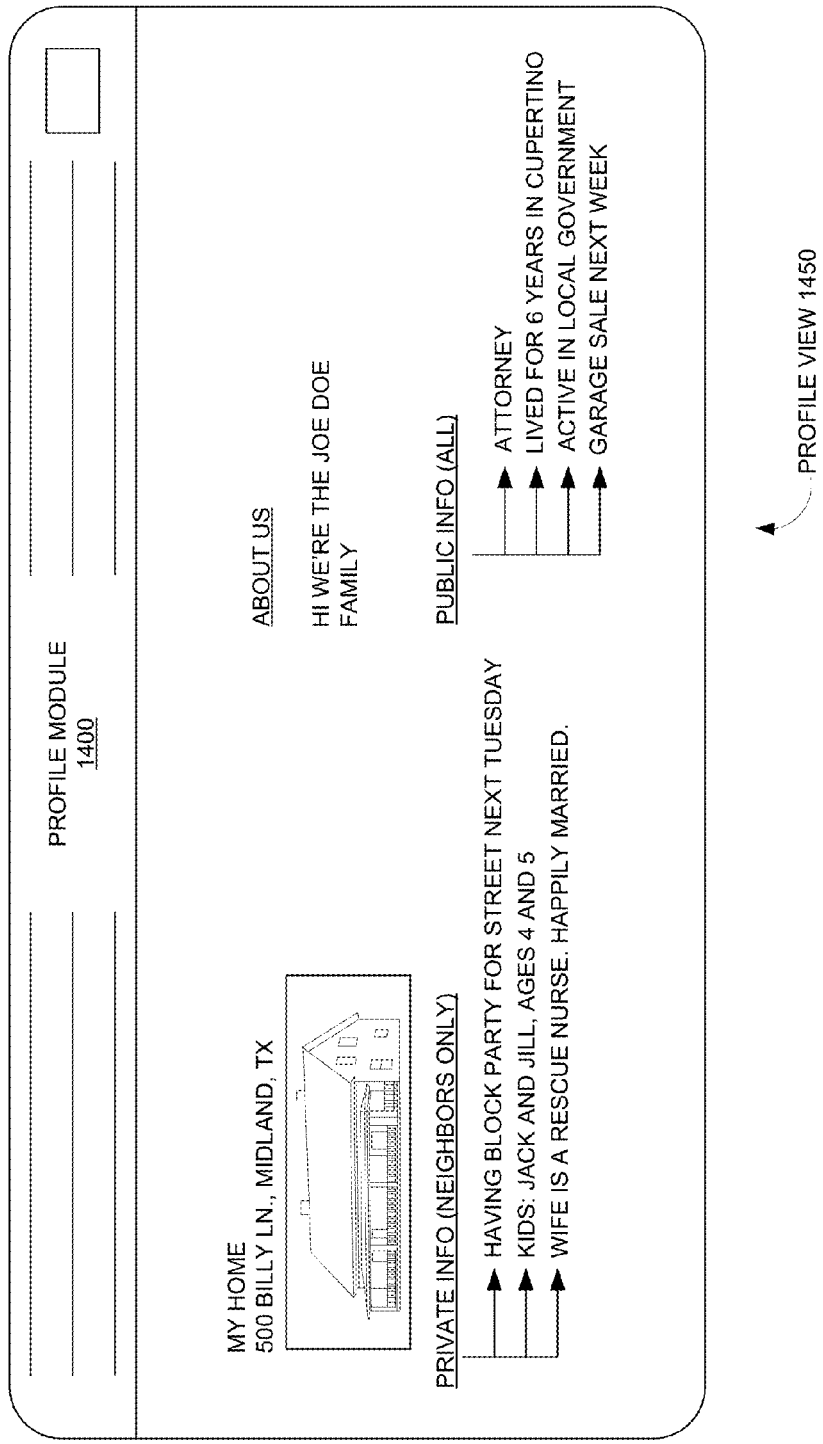
FIG. 14 is a profile view of a profile module, according to one embodiment.

FIG. 14 is a profile view 1450 of a profile module 1400, according to one embodiment. The profile view 1450 of profile module 1400 may offer the registered user to access the profile about the neighbors (e.g., the other addresses associated with user profiles 402 of FIG. 4). The profile view 1450 of profile module 1400 may indicate the information associated with the profile of the registered user of the global neighborhood environment (e.g., the geospatially constrained social network 142 of FIG. 1). The profile view 1450 may display the address of the registered user. The profile view 1450 may also display events organized by the neighbors (e.g., the other addresses associated with user profiles 402 of FIG. 4), history of the neighbors (e.g., the other addresses associated with user profiles 402 of FIG. 4), and/or may also offer the information (e.g., public, private, etc) associated with the family of the neighbors (e.g., the other addresses associated with user profiles 402 of FIG. 4) located in the locality of the user (e.g., the user(s) 106 of FIG. 1) of the global neighborhood environment (e.g., the geospatially constrained social network 142 of FIG. 1).

Figure 15:
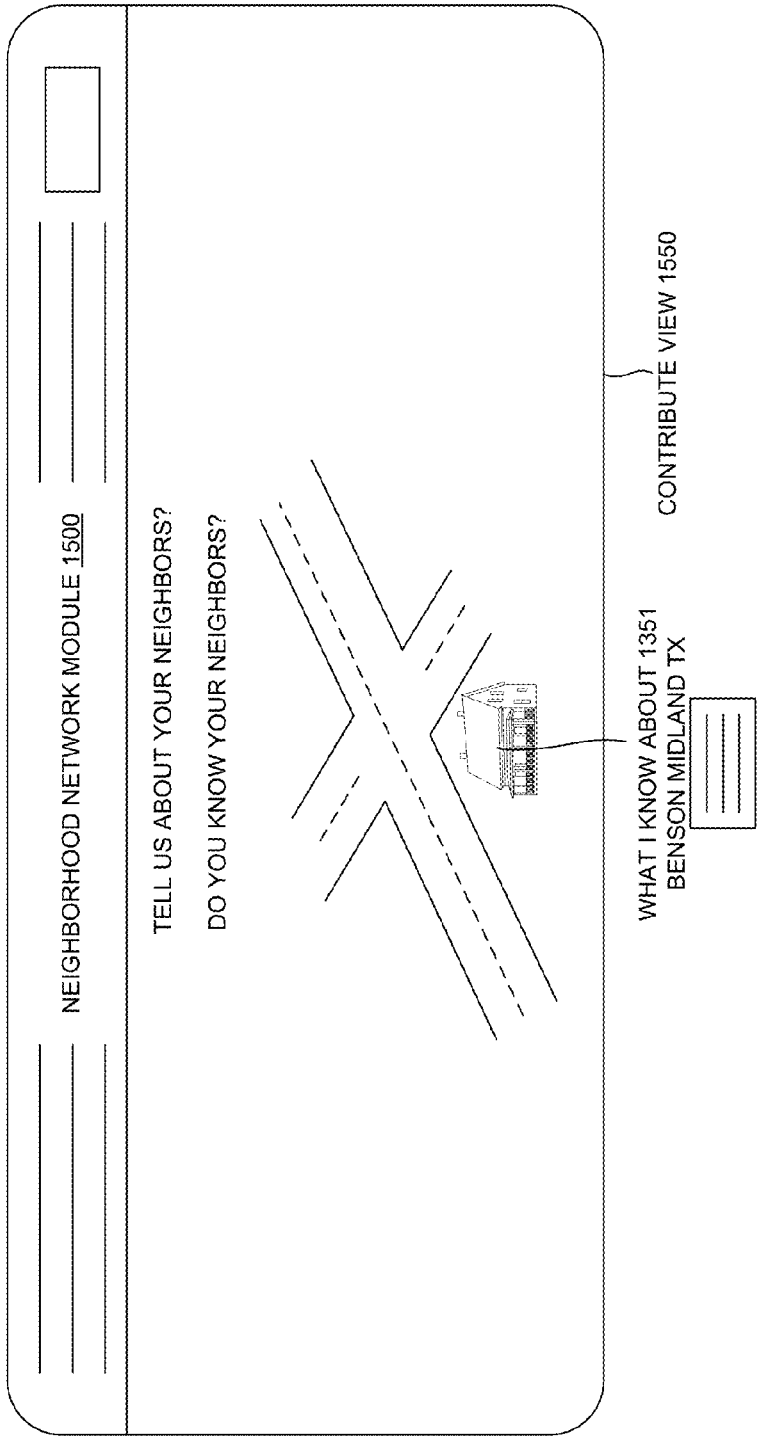
FIG. 15 is a contribute view of a neighborhood network module, according to one embodiment.

FIG. 15 is a contribute view 1550 of a neighborhood network module 1500, according to one embodiment. The contribute view 1550 of the neighborhood network module 1500 may enable the registered user of the global neighborhood environment (e.g., the geospatially constrained social network 142 of FIG. 1) to add information about their neighbors in the neighborhood network. The contribute view 1550 of the neighborhood network module 1500 may offer registered user of the global neighborhood environment (e.g., the geospatially constrained social network 142 of FIG. 1) to add valuable notes associated with the family, events, private information, etc.

Figure 16:
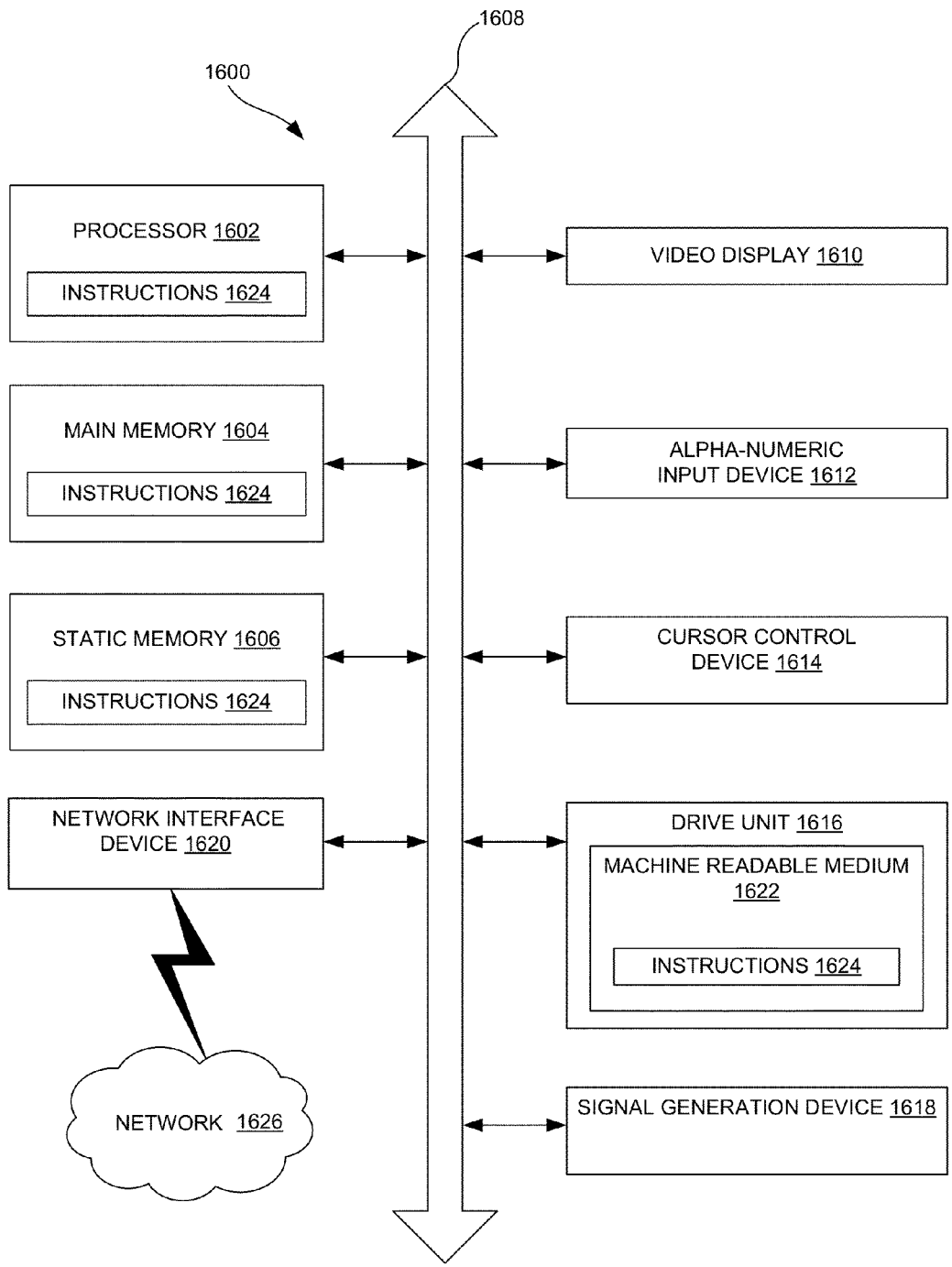
FIG. 16 is a diagrammatic system view of a data processing system in which any of the embodiments disclosed herein may be performed, according to one embodiment.

FIG. 16 is a diagrammatic system view, according to one embodiment. FIG. 16 is a diagrammatic system view 1600 of a data processing system in which any of the embodiments disclosed herein may be performed, according to one embodiment. Particularly, the diagrammatic system view 1600 of FIG. 16 illustrates a processor 1602, a main memory 1604, a static memory 1606, a bus 1608, a video display 1610, an alpha-numeric input device 1612, a cursor control device 1614, a drive unit 1116, a signal generation device 1618, a machine readable medium 1622, instructions 1624, and a network 1626, according to one embodiment.

The diagrammatic system view 1600 may indicate a personal computer and/or a data processing system in which one or more operations disclosed herein are performed. The processor 1602 may be microprocessor, a state machine, an application specific integrated circuit, a field programmable gate array, etc. (e.g., Intel® Pentium® processor). The main memory 1604 may be a dynamic random access memory and/or a primary memory of a computer system.

The static memory 1606 may be a hard drive, a flash drive, and/or other memory information associated with the data processing system. The bus 1608 may be an interconnection between various circuits and/or structures of the data processing system. The video display 1610 may provide graphical representation of information on the data processing system. The alpha-numeric input device 1612 may be a keypad, keyboard and/or any other input device of text (e.g., a special device to aid the physically handicapped). The cursor control device 1614 may be a pointing device such as a mouse.

The drive unit 1616 may be a hard drive, a storage system, and/or other longer term storage subsystem. The signal generation device 1618 may be a bios and/or a functional operating system of the data processing system. The machine readable medium 1622 may provide instructions on which any of the methods disclosed herein may be performed. The instructions 1624 may provide source code and/or data code to the processor 1602 to enable any one/or more operations disclosed herein.

Figure 17A:
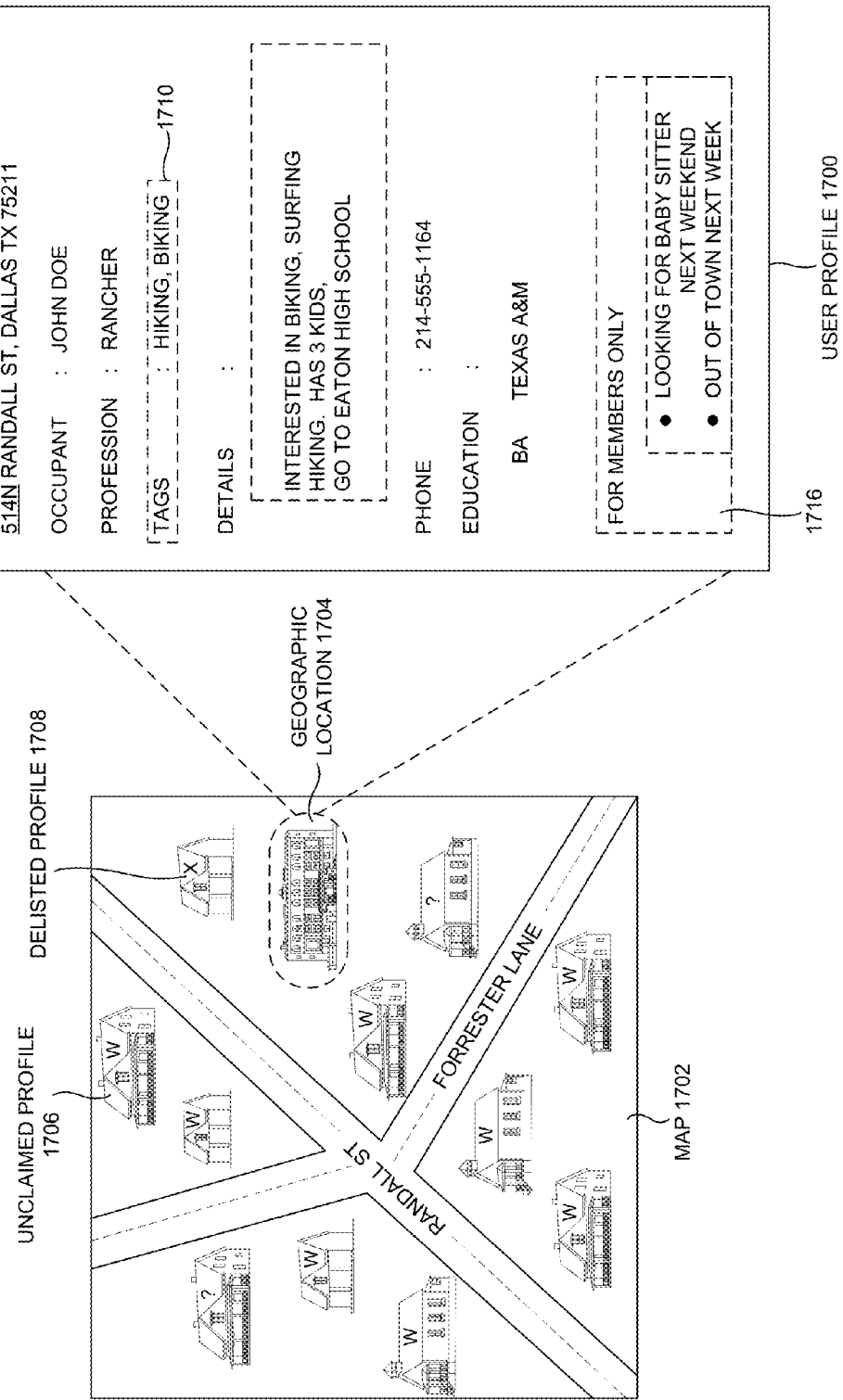
FIG. 17A is a user interface view of mapping user profile of the geographical location, according to one embodiment.

FIG. 17A is a user interface view of mapping a user profile 1700 of the geographic location 1704, according to one embodiment. In the example embodiment illustrated in FIG. 17A, the user profile 1700 may contain the information associated with the geographic location 1704. The user profile 1700 may contain the information associated with the registered user. The user profile 1700 may contain information such as address user of the specific geographic location, name of the occupant, profession of the occupant, details, phone number, educational qualification, etc.

The map 1702 may indicate the global neighborhood environment (e.g., the geospatially constrained social network 142 of FIG. 1) of the geographical location 1704, a unclaimed profile 1706 (e.g., the unclaimed profile 1802 of FIG. 18A, the unclaimed profile 2204 of FIG. 22), and a delisted profile 1708. The geographical location 1704 may be associated with the user profile 1700. The unclaimed profile 1706 may be the unclaimed profile 1706 associated with the neighboring property surrounding the geographic location 1704. The delisted profile 1708 illustrated in example embodiment of FIG. 17A, may be the unclaimed profile 1706 that may be delisted when the registered user claims the physical property. The block 1710 illustrated in the example embodiment of FIG. 17A may be associated with hobbies, personal likes, etc. The block 1716 may be associated with events, requirements, etc. that may be displayed by the members of the global neighborhood environment (e.g., the geospatially constrained social network 142 of FIG. 1).

For example, a verified registered user (e.g., a verified registered user 1810 of FIG. 18A-B, a verified registered user 1810 of FIG. 21) may be associated with a user profile 1700. The user profile 1700 may be associated with a specific geographic location. A map concurrently displaying the user profile 1700 and the specific geographic location 1704 may be generated. Also, the unclaimed profiles 1706 associated with different geographic locations surrounding the specific geographic location associated with the user profile 1700 may be simultaneously generated in the map. In addition, a query of the user profile 1700 and/or the specific geographic location may be processed.

Similarly, a tag data (e.g., the tags 1710 of FIG. 17A) associated with the specific geographic locations, a particular geographic location, and the delisted geographic location may be processed. A frequent one of the tag data (e.g., the tags 1710 of FIG. 17A) may be displayed when the specific geographic location and/or the particular geographic location is made active, but not when a geographic location is delisted.

Figure 17B:
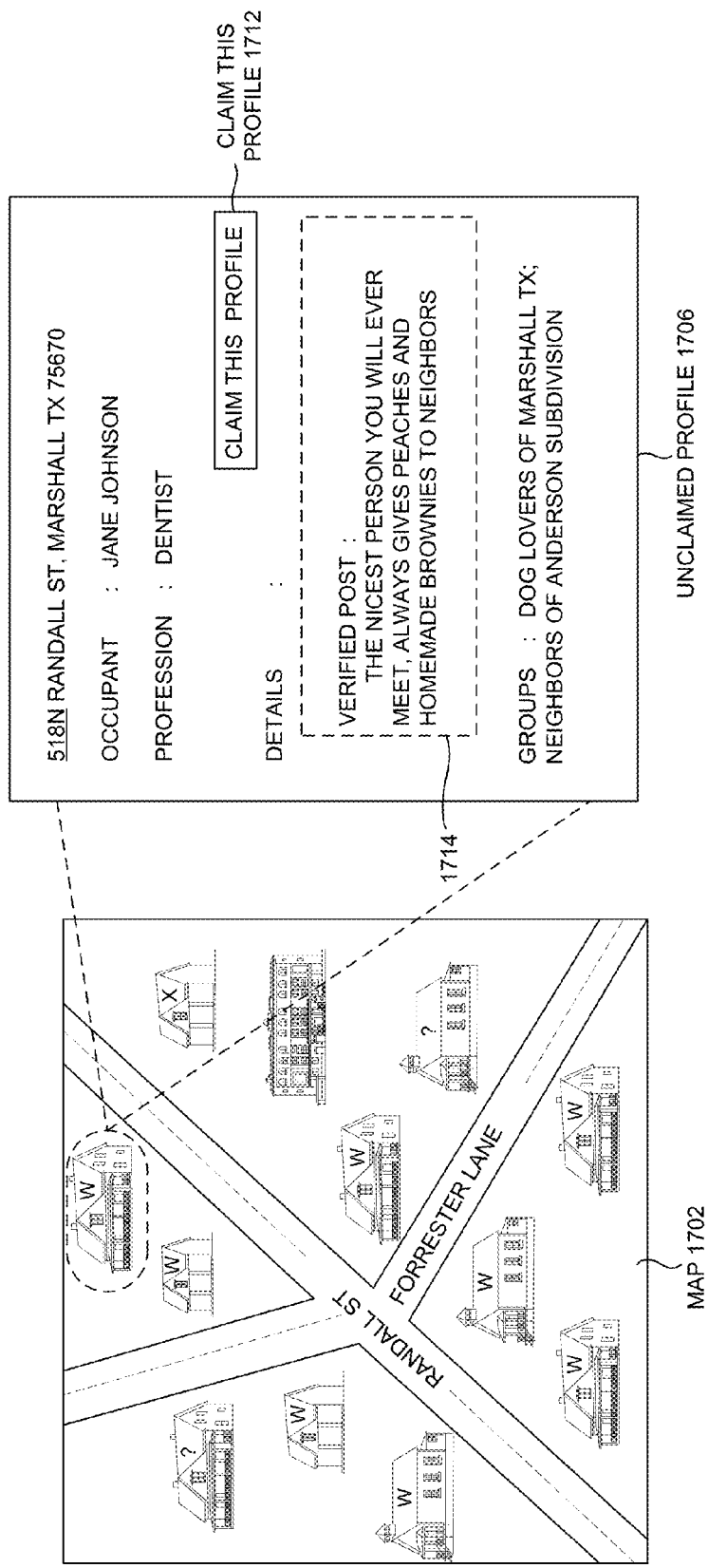
FIG. 17B is a user interface view of mapping of the unclaimed profile, according to one embodiment.

FIG. 17B is a user interface view of mapping of the unclaimed profile 1706, according to one embodiment. In the example embodiment illustrated in FIG. 17B, the map 1702 may indicate the geographic locations in the global neighborhood environment (e.g., the geospatially constrained social network 142 of FIG. 1) and/or may also indicate the geographic location of the unclaimed profile 1706. The unclaimed profile 1706 may display the information associated with the registered user of the global neighborhood environment (e.g., the geospatially constrained social network 142 of FIG. 1). The link claim this profile 1712 may enable the registered user to claim the unclaimed profile 1706 and/or may also allow the verified registered user (e.g., the verified registered user 1810 of FIG. 18A-B) to edit any information in the unclaimed profiles 1706. The block 1714 may display the information posted by any of the verified registered users (e.g., the verified registered user 1810 of FIG. 18A-B, the verified registered user 1810 of FIG. 21) of the global neighborhood environment (e.g., the geospatially constrained social network 142 of FIG. 1).

For example, a particular unclaimed profile (e.g., the particular unclaimed profile may be associated with a neighboring property to the specific property in the neighborhood) of the unclaimed profiles (e.g., the unclaimed profile 1802 of FIG. 18A, the unclaimed profile 2204 of FIG. 22) may be converted to another user profile (e.g., the user profile may be tied to a specific property in a neighborhood) when a different registered user (e.g., the user 106 of FIG. 1) claims a particular geographic location to the specific geographic location associated with the particular unclaimed profile.

In addition, a certain unclaimed profile of the unclaimed profiles may be de-listed when a private registered user claims a certain geographic location (e.g., the geographical location 1704 of FIG. 17A) adjacent to the specific geographic location and/or the particular geographic location. Also, the certain unclaimed profile in the map 1702 may be masked when the certain unclaimed profile is de-listed through the request of the private registered user.

Furthermore, a tag data (e.g., the tags 1710 of FIG. 17A) associated with the specific geographic location, the particular geographic location, and the de-listed geographic location may be processed. A frequent one of the tag data may be displayed when the specific geographic location and/or the particular geographic location are made active, but not when a geographic location is de-listed.

Moreover, the verified registered user (e.g., the verified registered user 1810 of FIG. 18A-B, the verified registered user 1810 of FIG. 21) may be permitted to edit any information in the unclaimed profiles 1706 including the particular unclaimed profile 1706 and/or the certain unclaimed profile until the certain unclaimed profile may be claimed by the different registered user and/or the private registered user. In addition, a claimant of any unclaimed profile 1706 may be enabled to control what information is displayed on their user profile. Also, the claimant may be allowed to segregate certain information on their user profile 1700 such that only other registered users directly connected to the claimant are able to view data on their user profile 1700.

Figure 18A:
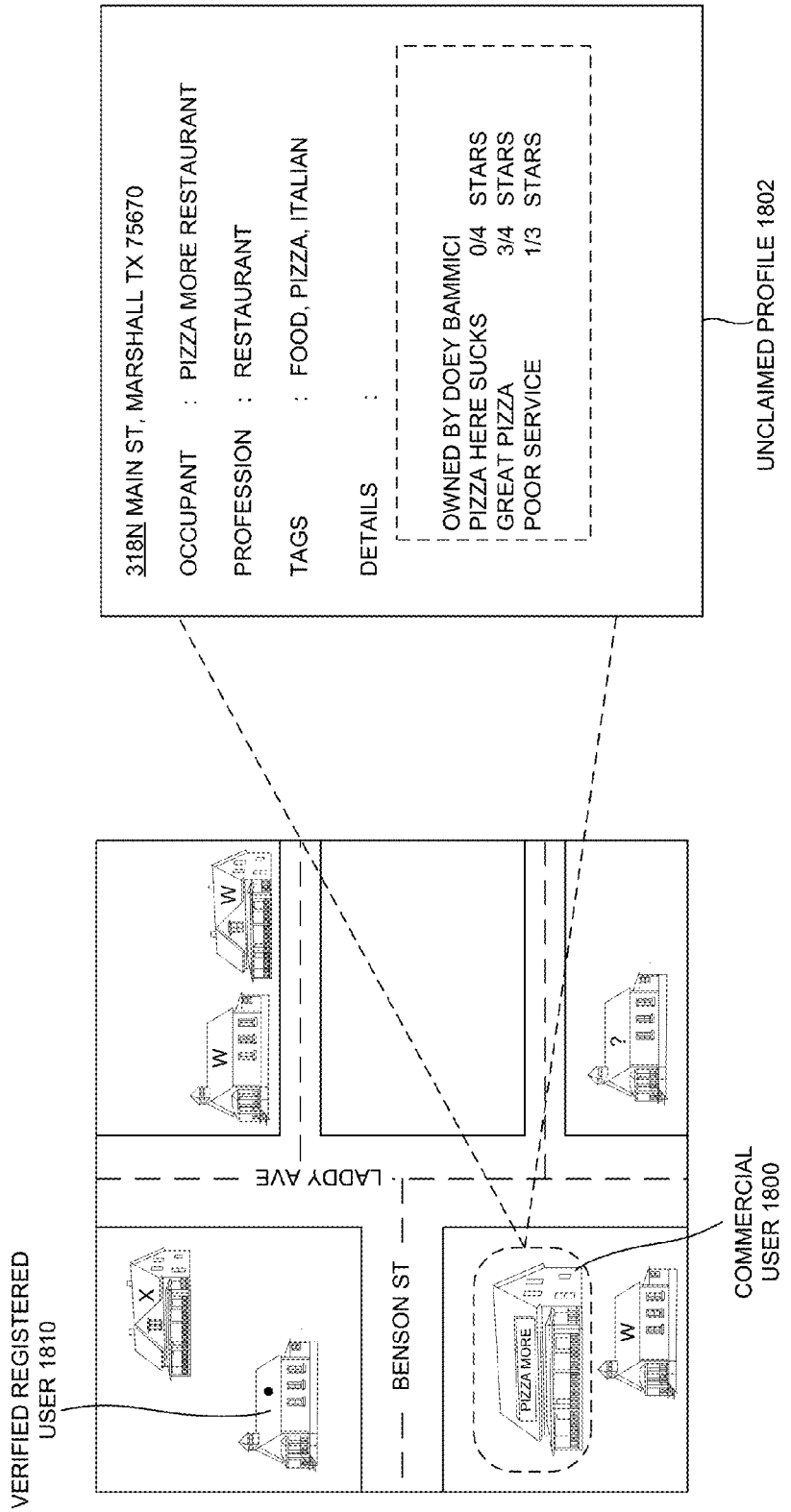
FIG. 18A is a user interface view of mapping of the unclaimed profile of the commercial user, according to one embodiment.

FIG. 18A is a user interface view of mapping of a unclaimed profile 1802 of the commercial user 1800, according to one embodiment. In the example embodiment illustrated in FIG. 18A, the commercial user 1800 may be associated with the customizable business profile 1804 located in the commercial geographical location. The unclaimed profile 1802 may contain the information associated with the commercial user 1800. The unclaimed profile 1802 may contain the information such as address, name, profession, tag, details (e.g., ratings), and educational qualification etc. of the commercial user 1800. The verified registered user 1810 may be user associated with the global neighborhood environment (e.g., the geospatially constrained social network 142 of FIG. 1) and may communicate a message to the neighborhood commercial user 1800. For example, a payment of the commercial user 1800 and the verified registered user 1810 may be processed.

Figure 18B:
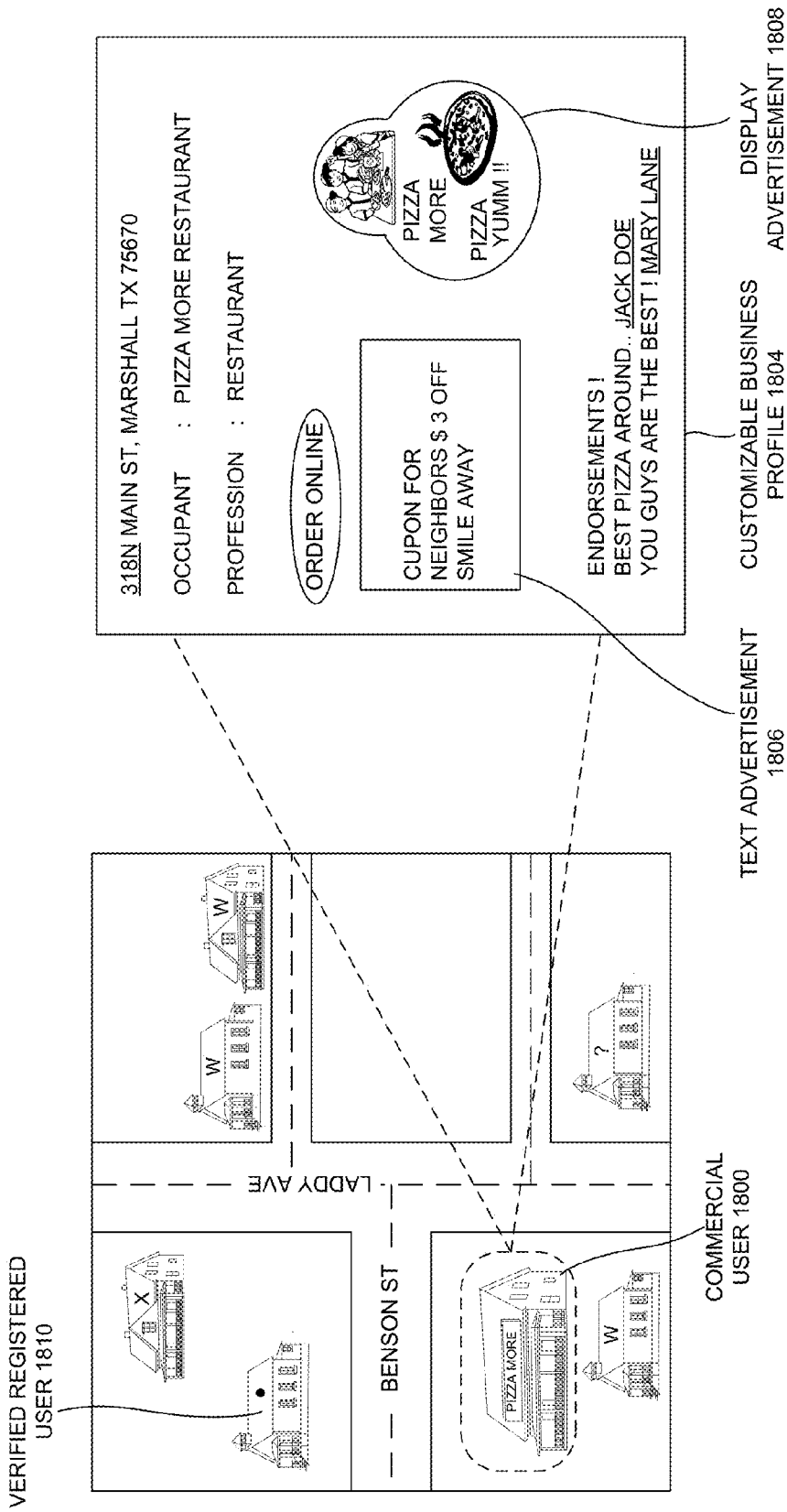
FIG. 18B is a user interface view of mapping of customizable business profile of the commercial user, according to one embodiment.

FIG. 18B is a user interface view of mapping of customizable business profile 1804 of the commercial user 1800, according to one embodiment. In the example embodiment illustrated in FIG. 18B, the commercial user 1800 may be associated with the customizable business profile 1804. The customizable business profile 1804 may be profile of any business firm (e.g., restaurant, hotels, supermarket, etc.) that may contain information such as address, occupant name, profession of the customizable business. The customizable business profile 1804 may also enable the verified registered user 1810 to place online order for the products.

For example, the commercial user 1800 may be permitted to purchase a customizable business profile 1804 associated with a commercial geographic location. Also, the verified registered user 1810 may be enabled to communicate a message to the global neighborhood environment (e.g., the geospatially constrained social network 142 of FIG. 1) based on a selectable distance range away from the specific geographic location. In addition, a payment of the commercial user 1800 and/or the verified registered user 1810 may be processed.

A text advertisement 1806 may display the information associated with the offers and/or events of the customizable business. The display advertisement 1808 may display ads of the products of the customizable business that may be displayed to urge the verified registered user 1810 to buy the products of the customizable business. The verified registered user 1810 may be user associated with the global neighborhood environment (e.g., the geospatially constrained social network 142 of FIG. 1) that may communicate a message to the commercial user 1800 and/or may be interested in buying the products of the customizable business.

Figure 19:
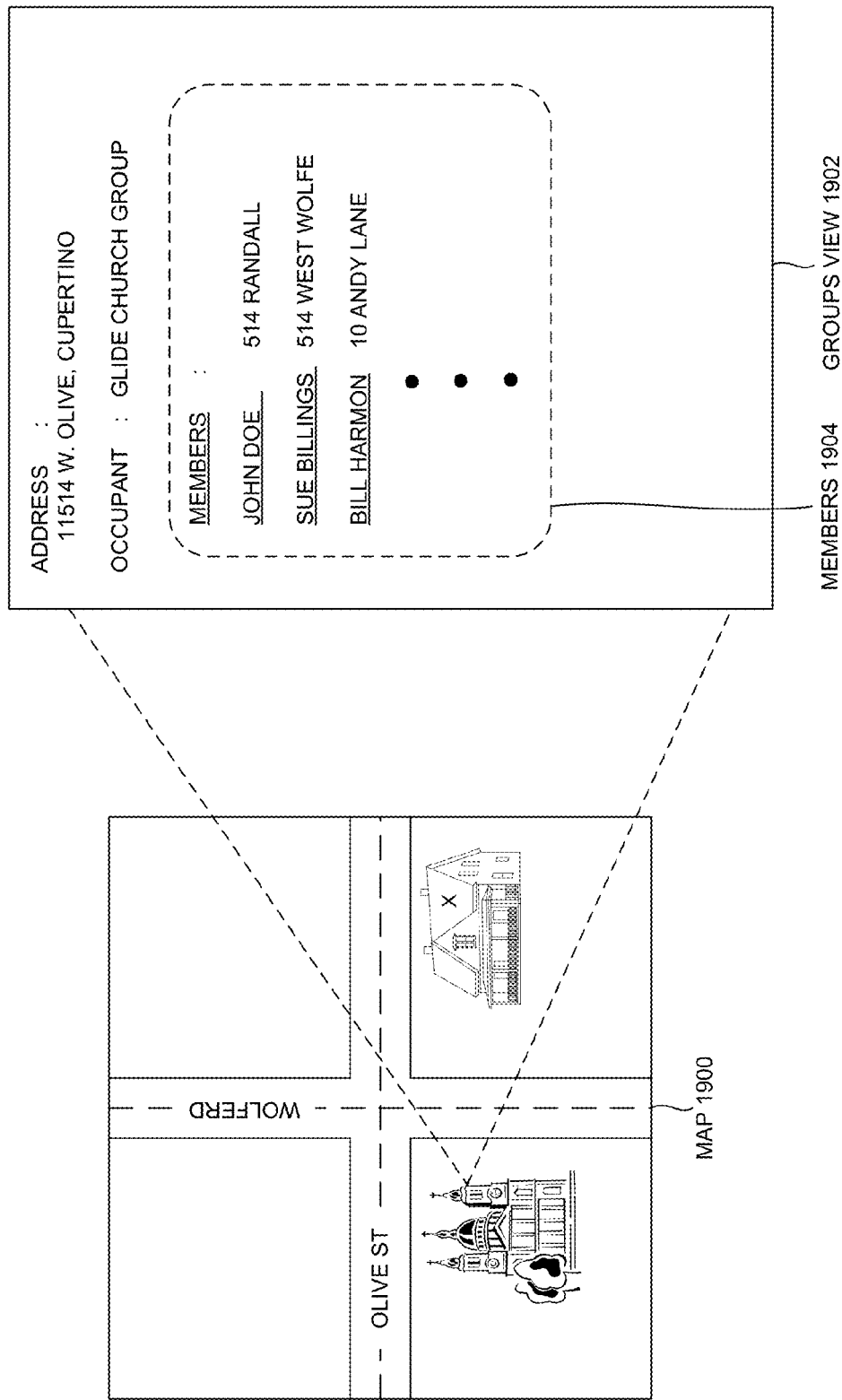
FIG. 19 is a user interface view of a group view associated with particular geographical location, according to one embodiment.

FIG. 19 is a user interface view of a groups view 1902 associated with particular geographical location, according to one embodiment. Particularly FIG. 19 illustrates, a map 1900, a groups view 1902, according to one embodiment. In the example embodiment illustrated in FIG. 19, the map view 1900 may display map view of the geographical location of the specific group of the global neighborhood environment (e.g., the geospatially constrained social network 142 of FIG. 1). The groups view 1902 may contain the information (e.g., address, occupant, etc.) associated with the particular group of the specific geographical location (e.g., the geographical location displayed in the map 1900) of the global neighborhood environment (e.g., the geospatially constrained social network 142 of FIG. 1). The members 1904 may contain the information about the members associated with the group (e.g., the group associated with geographical location displayed in the map) of the global neighborhood environment (e.g., the geospatially constrained social network 142 of FIG. 1).

FIG. 20 is a user interface view of claim view 2050, according to one embodiment. The claim view 2050 may enable the user to claim the geographical location of the registered user. Also, the claim view 2050 may facilitate the user of the global neighborhood environment (e.g., the geospatially constrained social network 142 of FIG. 1) to claim the geographical location of property under dispute.

In the example embodiment illustrated in FIG. 20, the operation 2002 may allow the registered user of the global neighborhood environment (e.g., the geospatially constrained social network 142 of FIG. 1) to claim the address of the geographic location claimed by the registered user. The operation 2004 illustrated in example embodiment of FIG. 20, may enable the user to access adjacent neighborhoods. The operation 2006 may offer information associated with the document to be submitted by the registered users of the global neighborhood environment (e.g., the geospatially constrained social network 142 of FIG. 1) to claim the geographical location.

Figure 21:
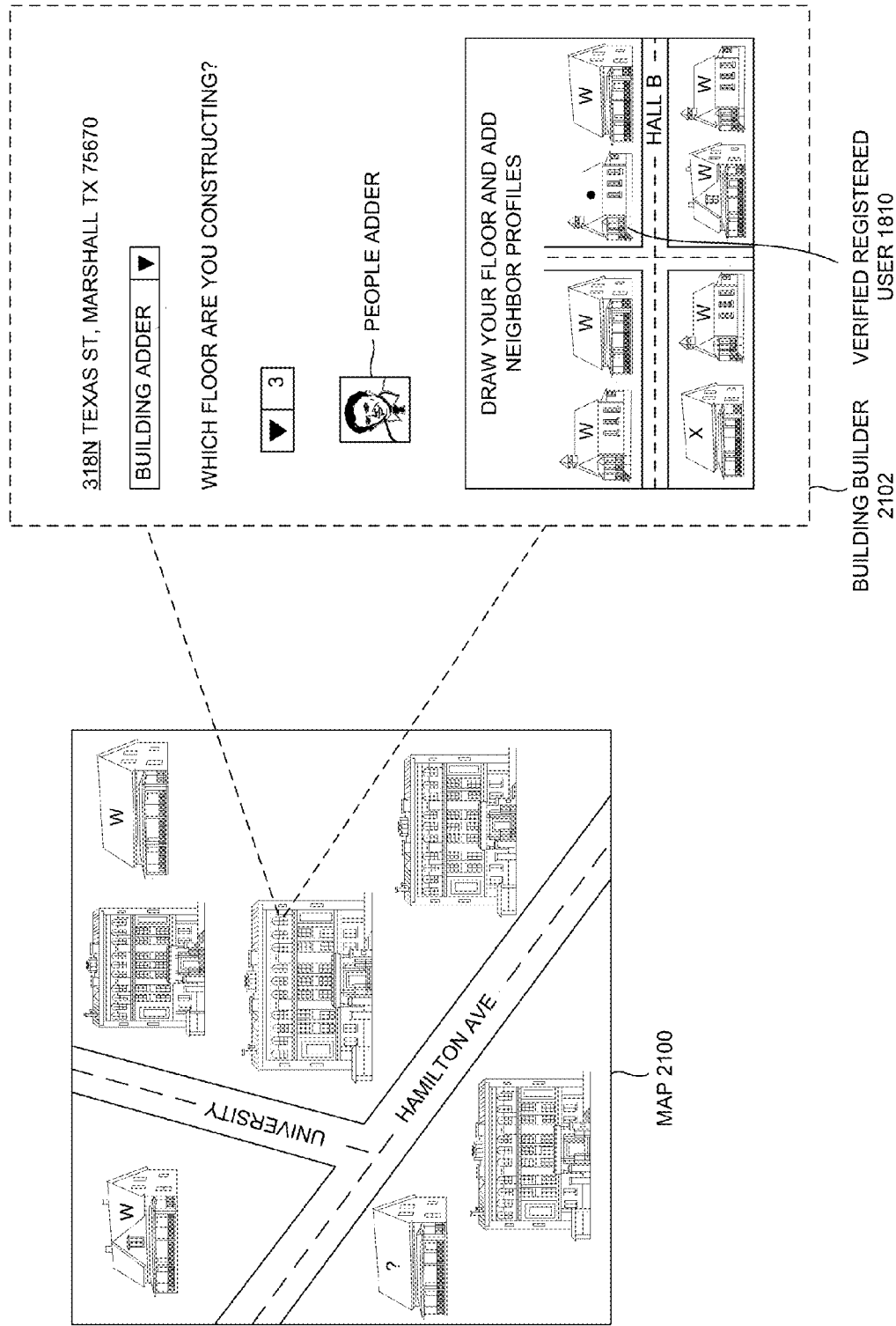
FIG. 21 is a user interface view of a building builder, according to one embodiment.

FIG. 21 is a user interface view of a building builder 2102, according to one embodiment. Particularly the FIG. 21 illustrates, a map 2100, a building builder 2102, according to one embodiment. The map 2100 may display the geographical location in which the verified registered user (e.g., the verified registered user 1810 of FIG. 18A-B) may create and/or modify empty unclaimed profiles (e.g., the unclaimed profile 1706 of FIG. 17A-17B, the unclaimed profile 1802 of FIG. 18A, the unclaimed profile 2204 of FIG. 22), building layouts, social network pages, and floor levels structures housing residents and businesses in the neighborhood (e.g., the claimed neighborhood 400 of FIG. 4, the unclaimed neighborhood 404 of FIG. 4). The building builder 2102 may enable the verified registered users (e.g., the verified registered user 1810 of FIG. 18A-B) of the global neighborhood environment (e.g., the geospatially constrained social network 142 of FIG. 1) to draw floor level structures, add neighbor's profiles and/or may also enable to select the floor number, type, etc. as illustrated in example embodiment of FIG. 21.

The verified registered user 1810 may be verified registered user of the global neighborhood environment (e.g., the geospatially constrained social network 142 of FIG. 1) interested in creating and/or modifying unclaimed profiles (e.g., the unclaimed profile 1706 of FIG. 17A-17B, the unclaimed profile 1802 of FIG. 18A, the unclaimed profile 2204 of FIG. 22), building layouts, social network pages, and floor level structure housing residents and businesses in the neighborhood (e.g., the claimed neighborhood 400 of FIG. 4, the unclaimed neighborhood 404 of FIG. 4) in the building builder 2102.

For example, a social community module (e.g., a social community module 220 of FIG. 2) of the global neighborhood environment (e.g., the geospatially constrained social network 142 of FIG. 1) may generate a building creator (e.g., the building builder 2102 of FIG. 21) in which the registered users may create and/or modify empty unclaimed profiles (e.g., the unclaimed profile 1706 of FIG. 17A-17B, the unclaimed profile 1802 of FIG. 18A, the unclaimed profile 2204 of FIG. 22), building layouts, social network pages, and floor levels structures housing residents and/or businesses in the neighborhood (e.g., the claimed neighborhood 400 of FIG. 4, the unclaimed neighborhood 404 of FIG. 4).

Figure 22:
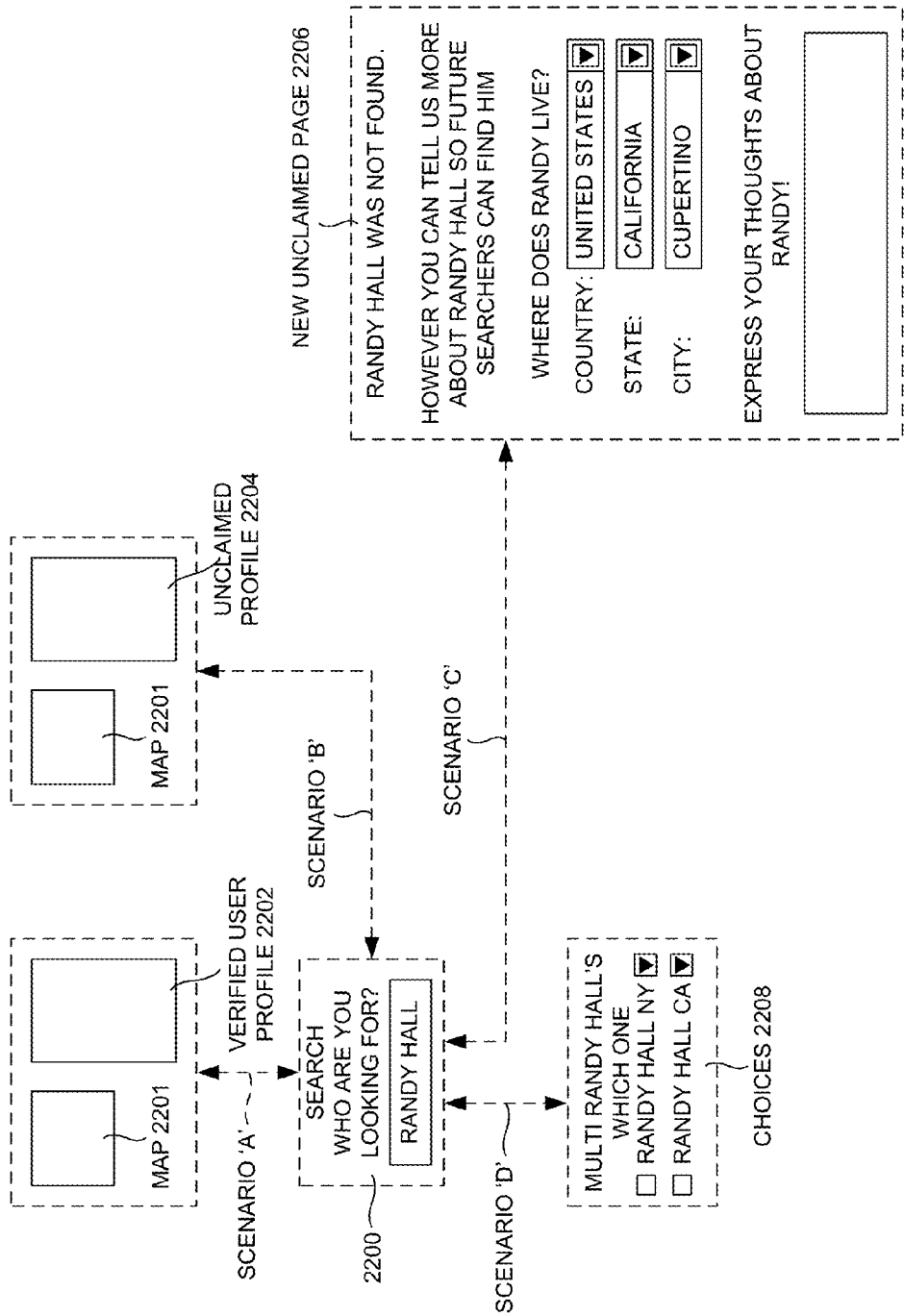
FIG. 22 is a systematic view of communication of wiki data, according to one embodiment.

FIG. 22 is a systematic view of communication of data, according to one embodiment. Particularly FIG. 22 illustrates a map 2201, verified user profile 2202, choices 2208 and a new unclaimed page 2206, according to one embodiment. The map 2201 may locate the details of the address of the registered user of the global neighborhood environment (e.g., the geospatially constrained social network 142 of FIG. 1). The verified user profile 2202 may store the profiles of the verified user of the global neighborhood environment (e.g., the geospatially constrained social network 142 of FIG. 1. The unclaimed profile 2204 may be the profiles of the registered user who may claim them in the global neighborhood environment (e.g., the geospatially constrained social network 142 of FIG. 1).

In operation 2200 the search for the user profile (e.g., the user profile 1700 of FIG. 17A) may be carried out by the registered user. The new unclaimed page 2206 (i.e., a new wiki page) may solicit for the details of a user whom the registered user is searching for in the global neighborhood environment (e.g., the geospatially constrained social network 142 of FIG. 1). The choices 2208 may ask whether the requested search is any among the displayed names. The new unclaimed page 2206 may request for the details of location such as country, state and/or city. The operation 2200 may communicate with the choices 2208, and the new unclaimed page 2206.

For example, a no-match module (e.g., a no-match module) of the search module (e.g., the search module) to request additional information from the verified registered user about a person, place, and business having no listing in the global neighborhood environment (e.g., the geospatially constrained social network 142 of FIG. 1) when no matches are found in a search query of the verified registered user (e.g., the verified registered user 1810 of FIG. 18A-B), and to create a new unclaimed page 2206 based on a response of the verified registered user 2202 about the at least one person, place, and business not previously indexed in the global neighborhood environment (e.g., the geospatially constrained social network 142 of FIG. 1).

Figure 23:
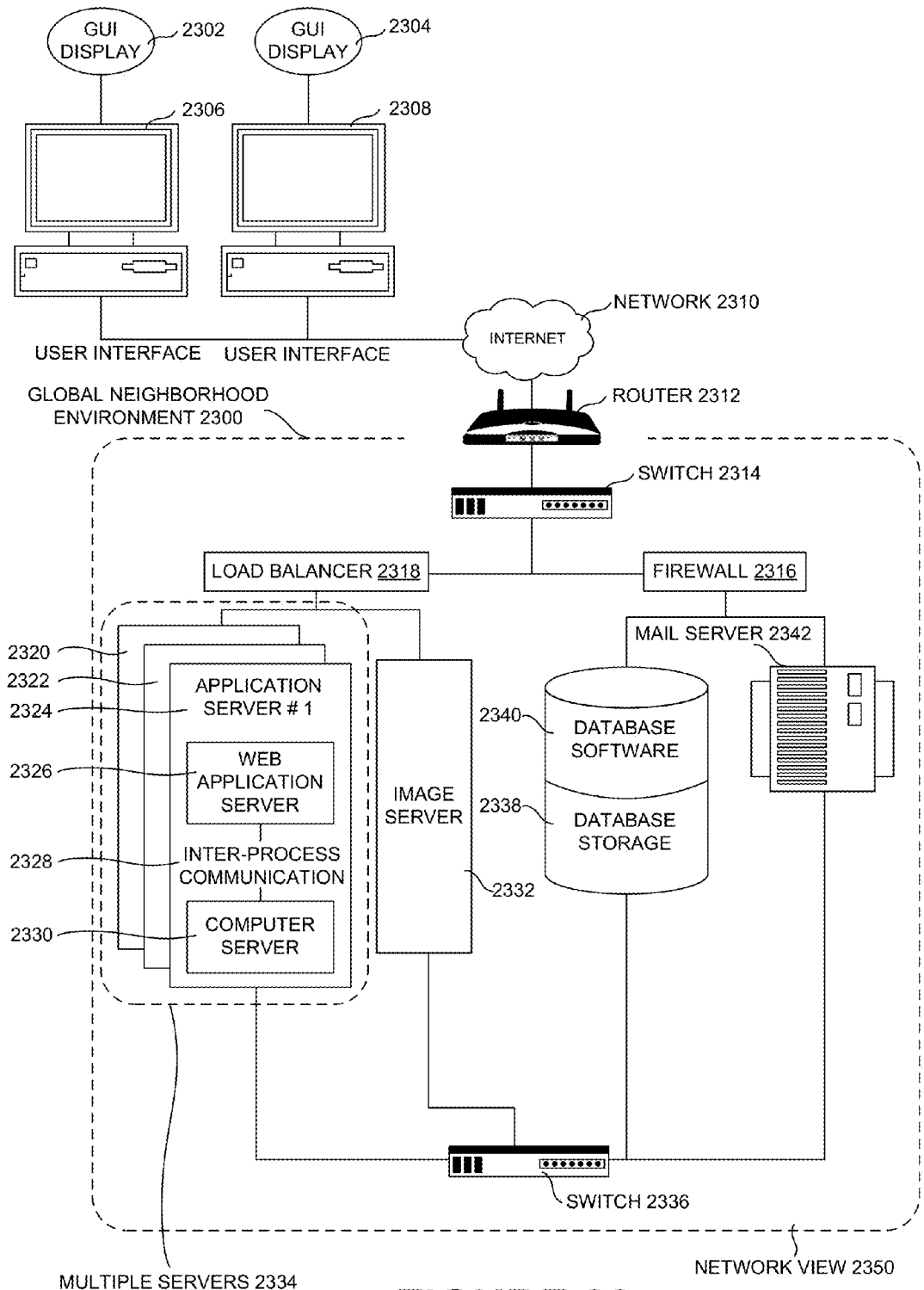
FIG. 23 is a systematic view of a network view, according to one embodiment.

FIG. 23 is a systematic view of a network view 2350, according to one embodiment. Particularly it may include a GUI display 2302, a GUI display 2304, user interface 2306, a user interface 2308, a network 2310, a router 2312, a switch 2314, a firewall 2316, a load balancer 2318, an application server#1 2324, a web application server 2326, an inter-process communication 2328, a computer server 2330, an image server 2332, a multiple servers 2334, a switch 2336, a database storage 2338, database software 2340 and a mail server 2342, according to one embodiment.

The GUI display 2302 and GUI display 2304 may display particular case of user interface for interacting with a device capable of representing data (e.g., computer, cellular telephones, television sets etc) which employs graphical images and widgets in addition to text to represent the information and actions available to the user (e.g., the user 106 of FIG. 1).

The user interface 2306 and user interface 2308 may be any device capable of presenting data (e.g., computer, cellular telephones, television sets etc). The network 2310 may be any collection of networks (e.g., internet, private networks, university social system, private network of a company etc) that may transfer any data to the user (e.g., the user 106 of FIG. 1) and the global neighborhood environment (e.g., the geospatially constrained social network 142 of FIG. 1).

The router 2312 may forward packets between networks and/or information packets between the global neighborhood environment (e.g., the geospatially constrained social network 142 of FIG. 1) and registered user over the network (e.g., internet). The switch 2314 may act as a gatekeeper to and from the network (e.g., internet) and the device. The firewall 2316 may provides protection (e.g., permit, deny or proxydata connections) from unauthorized access to the global neighborhood environment (e.g., the geospatially constrained social network 142 of FIG. 1. The load balancer 2318 may balance the traffic load across multiple mirrored servers in the global neighborhood environment (e.g., the geospatially constrained social network 142 of FIG. 1) and may be used to increase the capacity of a server farm beyond that of a single server and/or may allow the service to continue even in the face of server down time due to server failure and/or server maintenance.

The application server 2322 may be server computer on a computer network dedicated to running certain software applications of the global neighborhood environment (e.g., the geospatially constrained social network 142 of FIG. 1). The web application server 2326 may be server holding all the web pages associated with the global neighborhood environment (e.g., the geospatially constrained social network 142 of FIG. 1). The inter-process communication 2328 may be set of rules for organizing and un-organizing factors and results regarding the global neighborhood environment (e.g., the geospatially constrained social network 142 of FIG. 1). The computer server 2330 may serve as the application layer in the multiple servers of the global neighborhood environment (e.g., the geospatially constrained social network 142 of FIG. 1) and/or may include a central processing unit (CPU), a random access memory (RAM) temporary storage of information, and/or a read only memory (ROM) for permanent storage of information regarding the global neighborhood environment (e.g., the geospatially constrained social network 142 of FIG. 1).

The image server 2332 may store and provide digital images of the registered user of the global neighborhood environment (e.g., the geospatially constrained social network 142 of FIG. 1). The multiple servers 2334 may be multiple computers or devices on a network that may manage network resources connecting the registered user and the global neighborhood environment (e.g., the geospatially constrained social network 142 of FIG. 1). The database storage 2338 may store software, descriptive data, digital images, system data and any other data item that may be related to the user (e.g., the user 106 of FIG. 1) of the global neighborhood environment (e.g., the geospatially constrained social network 142 of FIG. 1). The database software 2340 may be provided a database management system that may support the global neighborhood environment (e.g., the geospatially constrained social network 142 of FIG. 1). The mail server 2342 may be provided for sending, receiving and storing mails. The user interface 2306 and 2308 may communicate with the GUI display(s) 2302 and 2304, the router 2312 through the network 2310 and the global neighborhood environment (e.g., the geospatially constrained social network 142 of FIG. 1).

Figure 24:
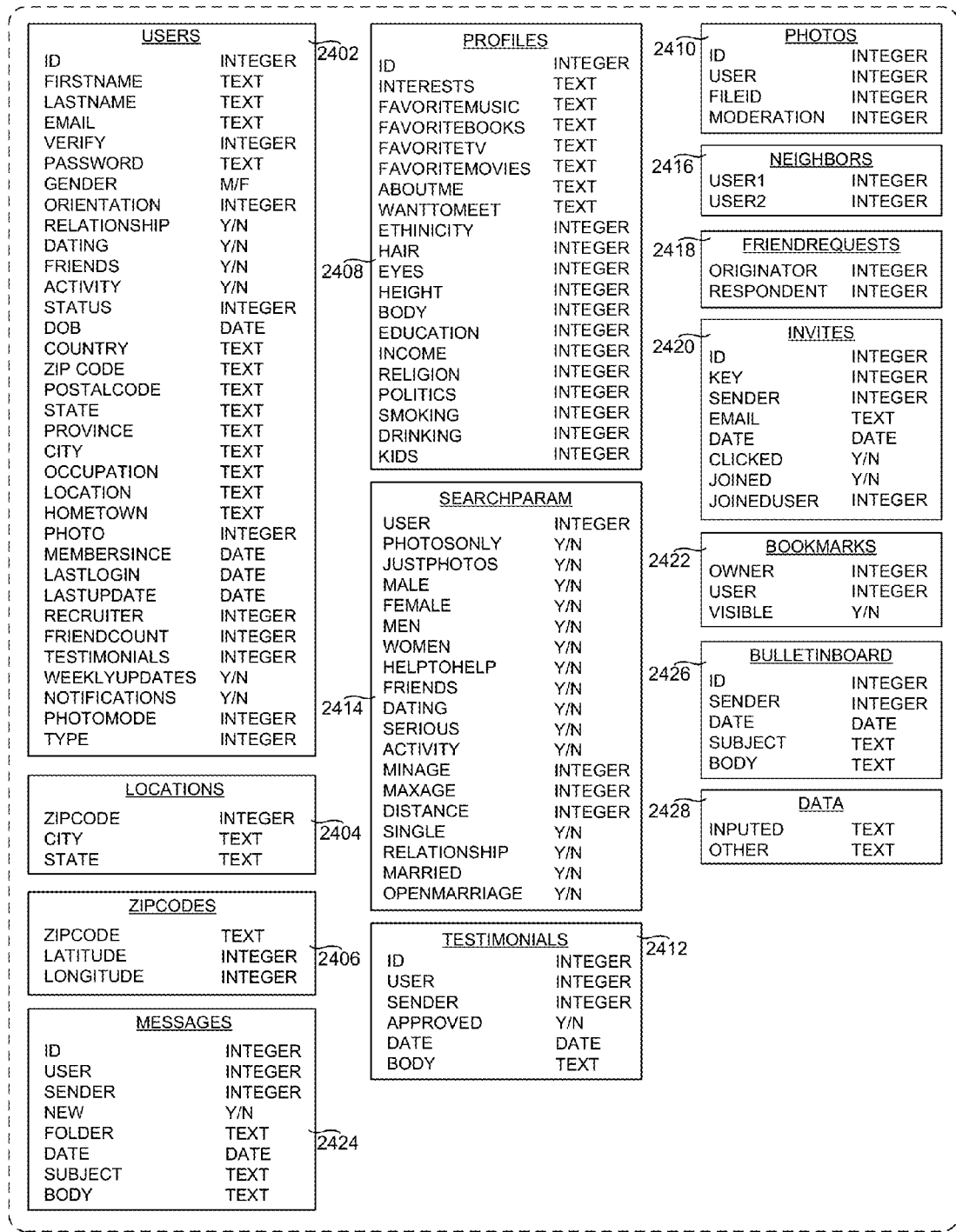
FIG. 24 is a block diagram of a database, according to one embodiment.

FIG. 24 is a block diagram of a database, according to one embodiment. Particularly the block diagram of the database 2400 of FIG. 24 illustrates a user data 2402, a location data, a zip codes data 2406, a profiles data 2408, a photos data 2410, a testimonials data 2412, a search parameters data 2414, a neighbor's data 2416, a friends requests data 2418, a invites data 2420, a bookmarks data 2422, a message data 2424 and a bulletin board data 2426, and a data 2428, according to one embodiment.

The database 2400 be may include descriptive data, preference data, relationship data, and/or other data items regarding the registered user of the global neighborhood environment (e.g., the geospatially constrained social network 142 of FIG. 1.

The user data 2402 may be a descriptive data referring to information that may describe a user (e.g., the user 106 of FIG. 1). It may include elements in a certain format for example Id may be formatted as integer, Firstname may be in text, Lastname may be in text, Email may be in text, Verify may be in integer, Password may be in text, Gender may be in m/f, Orientation may be in integer, Relationship may be in y/n, Dating may be in y/n, Friends may be in y/n, Activity may be in y/n, Status may be in integer, Dob may be in date, Country may be in text, Zipcode may be in text, Postalcode may be in text, State may be in text, Province may be in text, City may be in text, Occupation may be in text, Location may be in text, Hometown may be in text, Photo may be in integer, Membersince may be in date, Lastlogin may be in date, Lastupdate may be in date, Recruiter may be in integer, Friendcount may be in integer, Testimonials may be in integer, Weeklypdates may be in y/n, Notifications may be in y/n, Photomode may be in integer and/or Type may be in integer.

The locations data 2404 may clarify the location details in formatted approach. For example Zip code may be formatted as integer, City may be in text and/or State may be in text. The zip codes data 2406 may provide information of a user location in formatted manner. For example Zip code may be formatted as text, Latitude may be in integer and/or Longitude may be in integer. The profile data 2408 may clutch personnel descriptive data that may be formatted.

For examples ID may be formatted as integer, Interests may be in text, Favoritemusic may be in text, Favaoritebooks may be in text, Favoritetv may be in text, Favoritemovies may be in text, Aboutme may be in text, Wanttomeet may be in text, Ethnicity may be in integer, Hair may be in integer, Eyes may be in integer, Height may be in integer, Body may be in integer, Education may be in integer, Income may be in integer, Religion may be in integer, Politics may be in integer Smoking may be in integer, Drinking may be in integer and/or Kids may be in integer.

The photos data 2410 may represent a digital image and/or a photograph of the user formatted in certain approach. For example Id may be formatted as integer, User may be in integer, Fileid may be in integer and/or Moderation may be in integer. The testimonials data 2412 may allow users to write "testimonials" 2412, or comments, about each other and in these testimonials, users may describe their relationship to an individual and their comments about that individual. For example the user might write a testimonial that states "Rohan has been a friend of mine since graduation days. He is smart, intelligent, and a talented person." The elements of testimonials data 2412 may be formatted as Id may be in integer, User may be in integer, Sender may be integer, Approved may be in y/n, Date may be in date and/or Body may be formatted in text.

The search parameters data 2414 may be preference data referring to the data that may describe preferences one user has with respect to another (For example, the user may indicate that he is looking for a female who is seeking a male for a serious relationship). The elements of the search parameters data 2414 may be formatted as User 2402 may be in integer, Photosonly may be in y/n, Justphotos may be in y/n, Male may be in y/n, Female may be in y/n, Men may be in y/n, Women may be in y/n, Helptohelp may be in y/n, Friends may be in y/n, Dating may be in y/n, Serious may be in y/n, Activity may be in y/n, Minage may be in integer, Maxage may be in integer, Distance may be in integer, Single may be in y/n, Relationship may be in y/n, Married may be in y/n and/or Openmarriage may be in y/n.

The neighbor's data 2416 may generally refer to relationships among registered users of the global neighborhood environment (e.g., the geospatially constrained social network 142 of FIG. 1) that have been verified and the user has requested another individual to join the system as neighbor's data 2416, and the request may be accepted. The elements of the neighbors data 2416 may formatted as user1 may be in integer and/or user2 may be in integer. The friend requests data 2418 may tracks requests by users within the neighborhood (e.g., the claimed neighborhood 400 of FIG. 4, the unclaimed neighborhood 404 of FIG. 4) to other individuals, which requests have not yet been accepted and may contain elements originator and/or respondent formatted in integer. The invites data 2420 may describe the status of a request by the user to invite an individual outside the neighborhood (e.g., the claimed neighborhood 400 of FIG. 4, the unclaimed neighborhood 404 of FIG. 4) to join the neighborhood (e.g., the claimed neighborhood 400 of FIG. 4, the unclaimed neighborhood 404 of FIG. 4) and clarify either the request has been accepted, ignored and/or pending.

The elements of the invites data 2420 may be formatted as Id may be in integer, Key may be in integer, Sender may be in integer, Email may be in text, Date may be in date format, Clicked may be in y/n, Joined may be in y/n and/or Joineduser may be in integer. The bookmarks data 2422 may provide the data for a process allowed wherein a registered user of the global neighborhood environment (e.g., the geospatially constrained social network 142 of FIG. 1) may indicate an interest in the profile of another registered user. The bookmark data 2422 elements may be formatted as Owner may be in integer, User may be in integer and/or Visible may be in y/n. The message data 2424 may allow the users to send one another private messages.

The message data 2424 may be formatted as Id may be in integer, (e.g., User may be in integer, Sender may be in integer, New may be in y/n, Folder may be in text, Date may be in date format, Subject may be in text and/or Body may be in text format) The bulletin board data 2426 may support the function of a bulletin board that users may use to conduct online discussions, conversation and/or debate. The data 2428 may share the user profiles (e.g., the user profile 1700 of FIG. 17A) in the neighborhood (e.g., the claimed neighborhood 400 of FIG. 4, the unclaimed neighborhood 404 of FIG. 4) and its elements may be formatted as wikis inputted and/or others may be in text format.

FIG. 25 is an exemplary graphical user interface view for data collection, according to one embodiment. Particularly FIG. 25 illustrates exemplary screens 2502, 2504 that may be provided to the user (e.g., the user 106 of FIG. 1) through an interface may be through the network (e.g., Internet), to obtain user descriptive data. The screen 2502 may collect data allowing the user (e.g., the user 106 of FIG. 1) to login securely and be identified by the neighborhood (e.g., the neighborhood 602A-N of FIG. 1). This screen 2502 may allow the user to identify the reason he/she is joining the neighborhood. For example, a user may be joining the neighborhood for "neighborhood watch". The screen 2504 may show example of how further groups may be joined. For example, the user (e.g., the user 106 of FIG. 1) may be willing to join a group "Raj for city council". It may also enclose the data concerning Dob, country, zip/postal code, hometown, occupation and/or interest.

Figure 26:
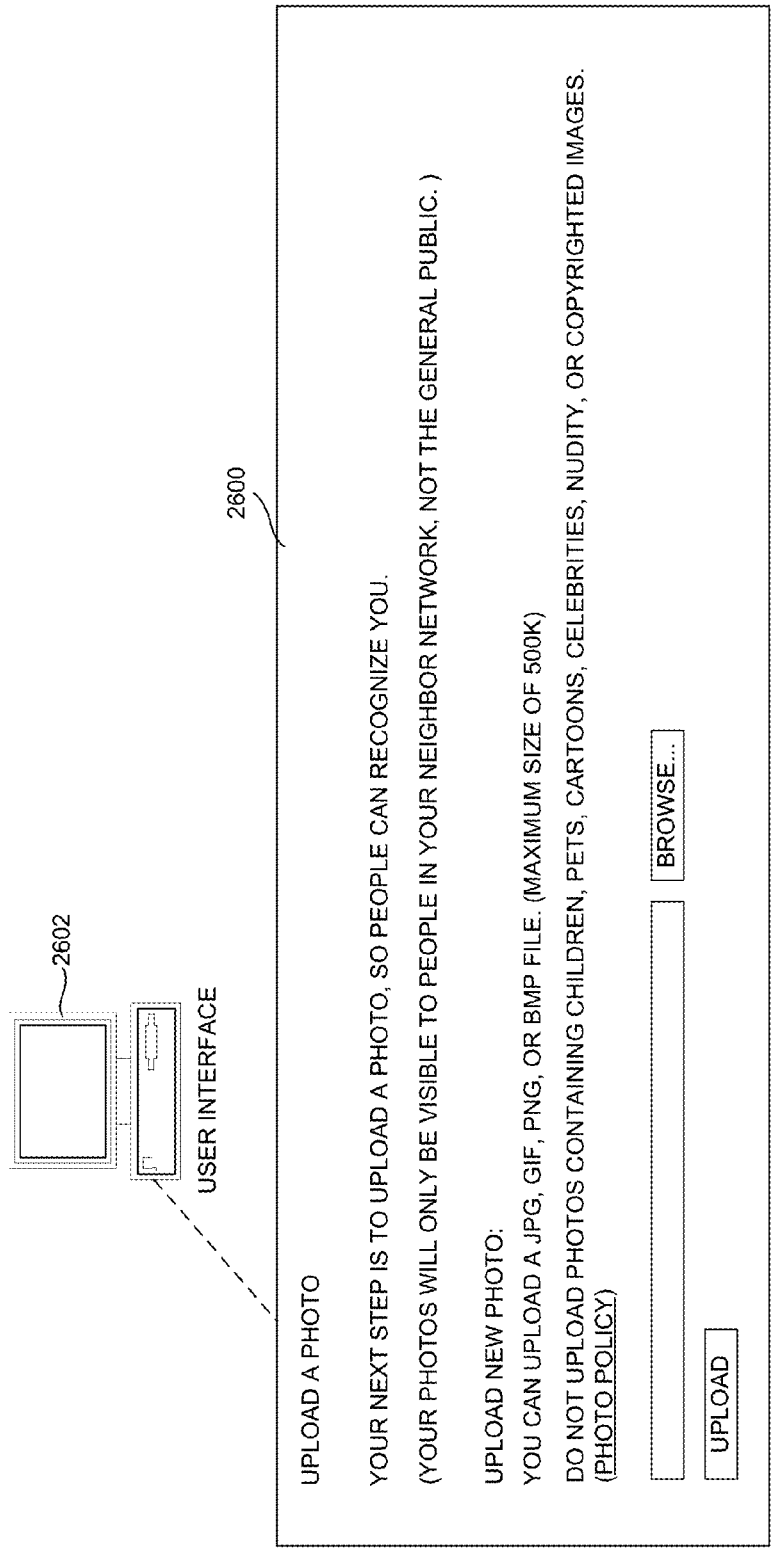
FIG. 26 is an exemplary graphical user interface view of image collection, according to one embodiment.

FIG. 26 is an exemplary graphical user interface view of image collection, according to one embodiment. A screen 2600 may be interface provided to the user (e.g., the user 106 of FIG. 1) over the network (e.g., internet) may be to obtain digital images from system user. The interface 2602 may allow the user (e.g., the user 106 of FIG. 1) to browse files on his/her computer, select them, and then upload them to the neighborhood (e.g., the claimed neighborhood 400 of FIG. 4, the unclaimed neighborhood 404 of FIG. 4). The user (e.g., the user 106 of FIG. 1) may upload the digital images and/or photo that may be visible to people in the neighbor (e.g., the other addresses associated with user profiles 402 of FIG. 4) network and not the general public. The user may be able to upload a JPG, GIF, PNG and/or BMP file in the screen 2600.

FIG. 27 is an exemplary graphical user interface view of an invitation, according to one embodiment. An exemplary screen 2700 may be provided to a user through a user interface 2702 may be over the network (e.g., internet) to allow users to invite neighbor or acquaintances to join the neighborhood (e.g., the claimed neighborhood 400 of FIG. 4, the unclaimed neighborhood 404 of FIG. 4). The user interface 2702 may allow the user (e.g., the user 106 of FIG. 1) to enter one or a plurality of e-mail addresses for friends they may like to invite to the neighborhood (e.g., the claimed neighborhood 400 of FIG. 4, the unclaimed neighborhood 404 of FIG. 4). The exemplary screen 2700 may include the "subject", "From", "To", "Optional personnel message", and/or "Message body" sections. In the "Subject" section a standard language text may be included for joining the neighborhood (e.g., Invitation to join Fatdoor from John Doe, a neighborhood.).

The "From" section may include the senders email id (e.g., user@domain.com). The "To" section may be provided to add the email id of the person whom the sender may want to join the neighborhood (e.g., the claimed neighborhood 400 of FIG. 4, the unclaimed neighborhood 404 of FIG. 4). The message that may be sent to the friends and/or acquaintances may include standard language describing the present neighborhood, the benefits of joining and the steps required to join the neighborhood (e.g., the claimed neighborhood 400 of FIG. 4, the unclaimed neighborhood 404 of FIG. 4). The user (e.g., the user 106 of FIG. 1) may choose to include a personal message, along with the standard invitation in the "Optional personal message" section. In the "Message body" section the invited friend or acquaintance may initiate the process to join the system by clicking directly on an HTML link included in the e-mail message (e.g., http://www.fatdoor.com/join.jsp-?Invite=140807). In one embodiment, the user (e.g., the user 106 of FIG. 1) may import e-mail addresses from a standard computerized address book. The system may further notify the inviting user when her invitee accepts or declines the invitation to join the neighborhood (e.g., the claimed neighborhood 400 of FIG. 4, the unclaimed neighborhood 404 of FIG. 4).

Figure 28:
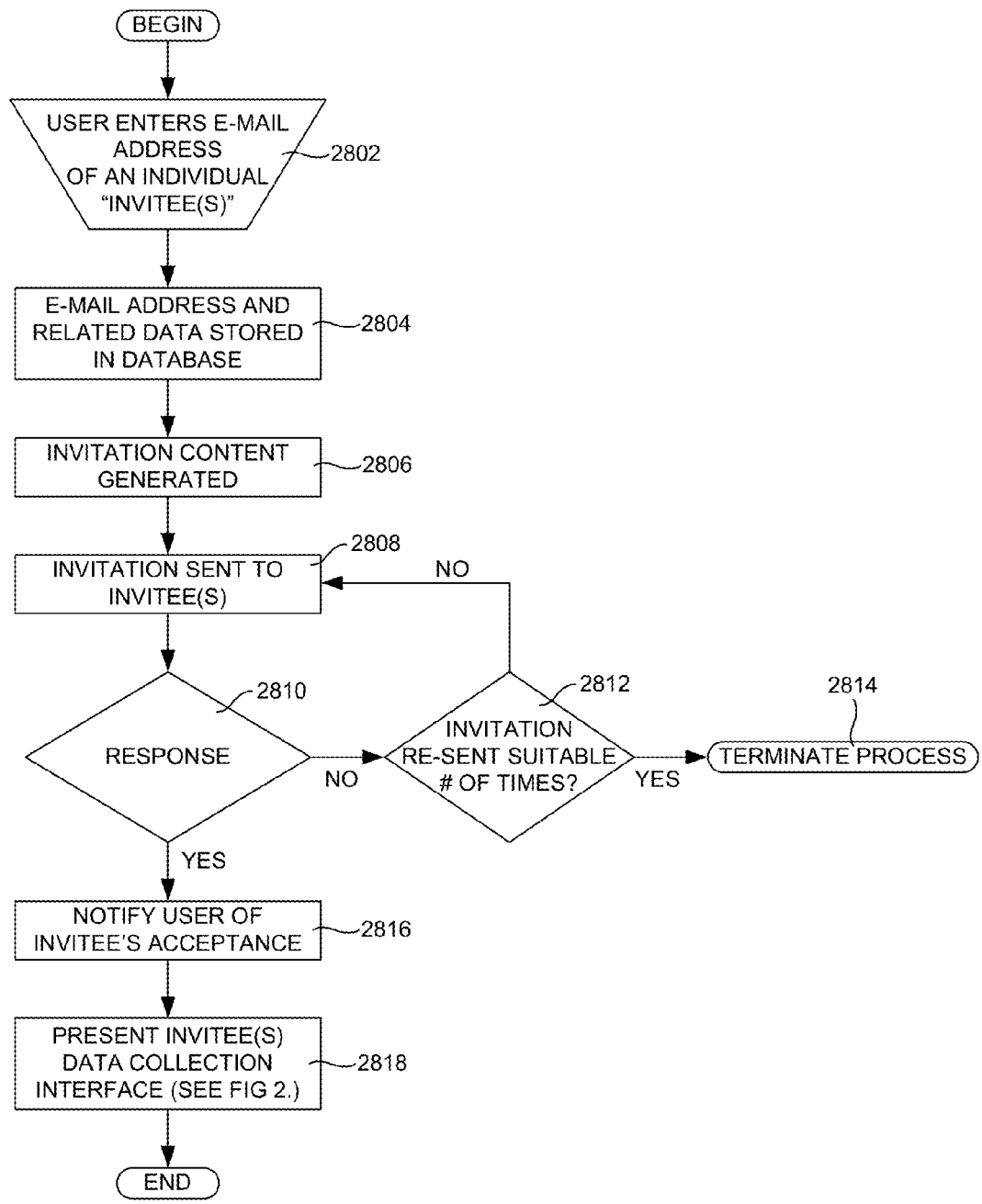
FIG. 28 is a flowchart of inviting the invitee(s) by the registered user, notifying the registered user upon the acceptance of the invitation by the invitee(s) and, processing and storing the input data associated with the user in the database, according to one embodiment.

FIG. 28 is a flowchart of inviting the invitee(s) by the registered user, notifying the registered user upon the acceptance of the invitation by the invitee(s) and, processing and storing the input data associated with the user (e.g., the user 106 of FIG. 1) in the database, according to one embodiment. In operation 2802, the verified registered user (e.g., the verified registered user 1810 of FIG. 18A-B, the verified registered user 1810 of FIG. 21) willing to invite the individual enters the email addresses of an individual "invitee". In operation 2804, the email address and the related data of the invitee may be stored in the database. In operation 2806, the invitation content for inviting the invitee may be generated from the data stored in the database. In operation 2808, the registered user sends invitation to the invitee(s).

In operation 2810, response from the user (e.g., the user 106 of FIG. 1) may be determined. In operation 2812, if the invitee doesn't respond to invitation sent by the registered user then registered user may resend the invitation for a predefined number of times. In operation 2814, if the registered user resends the invitation to the same invitee for predefined number of times and if the invitee still doesn't respond to the invitation the process may be terminated automatically.

In operation 2816, if the invitee accepts the invitation sent by the registered user then system may notify the registered user that the invitee has accepted the invitation. In operation 2818, the input from the present invitee(s) that may contain the descriptive data about the friend (e.g., registered user) may be processed and stored in the database.

For example, each registered user associated e-mail addresses of individuals who are not registered users may be stored and identified by each registered user as neighbors. An invitation to become a new user (e.g., the user 106 of FIG. 1) may be communicated out to neighbor (e.g., other addresses associated with a verified user profile 402) of the particular user. An acceptance of the neighbor (e.g., the other addresses associated with user profiles 402 of FIG. 4) to whom the invitation was sent may be processed.

The neighbor (e.g., the other addresses associated with user profiles 402 of FIG. 4) may be added to a database and/or storing of the neighbor (e.g., the other addresses associated with user profiles 402 of FIG. 4), a user ID and a set of user IDs of registered users who are directly connected to the neighbor (e.g., the other addresses associated with user profiles 402 of FIG. 4), the set of user IDs stored of the neighbor (e.g., the other addresses associated with user profiles 402 of FIG. 4) including at least the user ID of the verified registered user (e.g., the verified registered user 1810 of FIG. 18A-B, the verified registered user 1810 of FIG. 21). Furthermore, the verified registered user may be notified that the invitation to the neighbor (e.g., the other addresses associated with user profiles 402 of FIG. 4) has been accepted when an acceptance is processed. Also, inputs from the neighbor (e.g., the other addresses associated with user profiles 402 of FIG. 4) having descriptive data about the friend may be processed and the inputs in the database may be stored.

Figure 29:
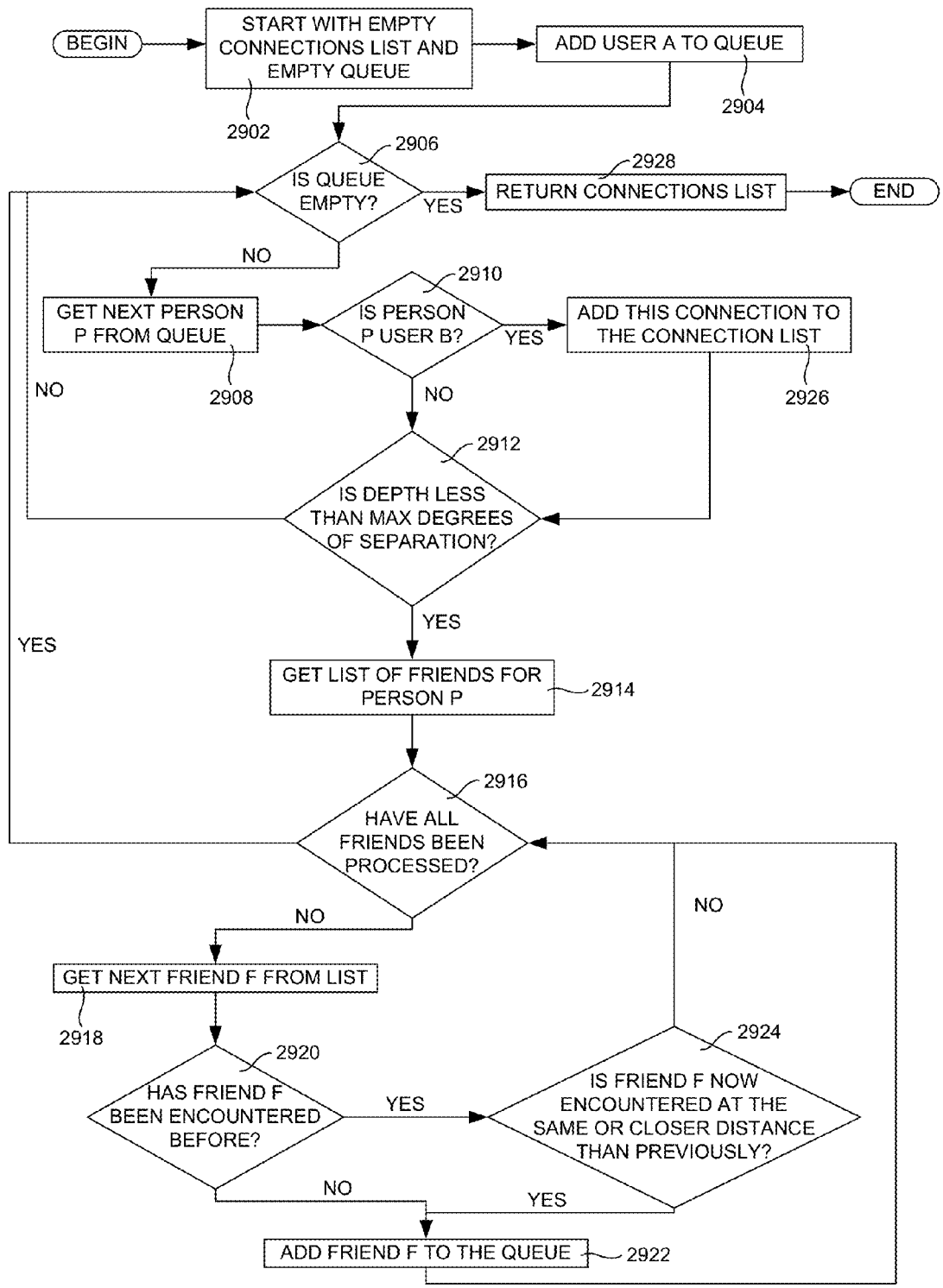
FIG. 29 is a flowchart of adding the neighbor to the queue, according to one embodiment.

FIG. 29 is a flowchart of adding the neighbor (e.g., the other addresses associated with user profiles 402 of FIG. 4) to the queue, according to one embodiment. In operation 2902, the system may start with the empty connection list and empty queue. In operation 2904, the user may be added to the queue. In operation 2906, it is determined whether the queue is empty. In operation 2908, if it is determined that the queue is not empty then the next person P may be taken from the queue. In operation 2910, it may be determined whether the person P from the queue is user B or not. In operation 2912, if the person P is not user B then it may be determined whether the depth of the geographical location is less than maximum degrees of separation.

If it is determined that depth is more than maximum allowable degrees of separation then it may repeat the operation 2908. In operation 2914, it may be determined that the depth of the geographical location (e.g., the geographical location 1704) is less than maximum degrees of separation then the neighbors (e.g., the other addresses associated with user profiles 402 of FIG. 4) list for person P may be processed. In operation 2916, it may be determined whether all the neighbors (e.g., the other addresses associated with user profiles 402 of FIG. 4) in the neighborhood (e.g., the claimed neighborhood 400 of FIG. 4, the unclaimed neighborhood 404 of FIG. 4) have been processed or not. If all the friends are processed it may be determined the queue is empty.

In operation 2918, if all the neighbors (e.g., the other addresses associated with user profiles 402 of FIG. 4) for person P are not processed then next neighbor N may be taken from the list. In operation 2920, it may be determined whether the neighbor (e.g., the other addresses associated with user profiles 402 of FIG. 4) N has encountered before or not. In operation 2922, if the neighbor (e.g., the other addresses associated with user profiles 402 of FIG. 4) has not been encountered before then the neighbor may be added to the queue. In operation 2924, if the neighbor N has been encountered before it may be further determined whether the geographical location (e.g., the geographical location 1704 of FIG. 17A) from where the neighbor (e.g., the other addresses associated with user profiles 402 of FIG. 4) has encountered previously is the same place or closer to that place.

If it is determined that the neighbor (e.g., the other addresses associated with user profiles 402 of FIG. 4) has encountered at the same or closer place then the friend may be added to the queue. If it may be determined that friend is not encountered at the same place or closer to that place then it may be again checked that all the friends have processed. In operation 2926, if it is determined that the person P is user B than the connection may be added to the connection list and after adding the connection to connection list it follows the operation 2912. In operation 2928, if it may be determined that queue is empty then the operation may return the connections list.

For example, a first user ID with the verified registered user (e.g., the verified registered user 1810 of FIG. 18A-B, the verified registered user 1810 of FIG. 21) and a second user ID may be applied to the different registered user. The verified registered user (e.g., the verified registered user 1810 of FIG. 18A-B, the verified registered user 1810 of FIG. 21) with the different registered user may be connected with each other through at least one of a geo-positioning data associated with the first user ID and the second user ID. In addition, a maximum degree of separation (Nmax) of at least two that is allowed for connecting any two registered users, (e.g., the two registered users who may be directly connected may be deemed to be separated by one degree of separation and two registered users who may be connected through no less than one other registered user may be deemed to be separated by two degrees of separation and two registered users who may be connected through not less than N other registered users may be deemed to be separated by N+1 degrees of separation).

Furthermore, the user ID of the different registered user may be searched (e.g., the method limits the searching of the different registered user in the sets of user IDs that may be stored as registered users who are less than Nmax degrees of separation away from the verified registered user (e.g., the verified registered user 1810 of FIG. 18A-B, the verified registered user 1810 of FIG. 21), such that the verified registered user (e.g., the verified registered user 1810 of FIG. 18A-B, the verified registered user 1810 of FIG. 21) and the different registered user who may be separated by more than Nmax degrees of separation are not found and connected.) in a set of user IDs that may be stored of registered users who are less than Nmax degrees of separation away from the verified registered user (e.g., the verified registered user 1810 of FIG. 18A-B, the verified registered user 1810 of FIG. 21), and not in the sets of user IDs that may be stored for registered users who are greater than or equal to Nmax degrees of separation away from the verified registered user (e.g., the verified registered user 1810 of FIG. 18A-B, the verified registered user 1810 of FIG. 21), until the user ID of the different registered user may be found in one of the searched sets. Also, the verified registered user (e.g., the verified registered user 1810 of FIG. 18A-B, the verified registered user 1810 of FIG. 21) may be connected to the different registered user if the user ID of the different registered user may be found in one of the searched sets.

Moreover, the sets of user IDs that may be stored of registered users may be searched initially who are directly connected to the verified registered user (e.g., the verified registered user 1810 of FIG. 18A-B, the verified registered user 1810 of FIG. 21). A profile of the different registered user may be communicated to the verified registered user (e.g., the verified registered user 1810 of FIG. 18A-B, the verified registered user 1810 of FIG. 21) to display through a marker associating the verified registered user (e.g., the verified registered user 1810 of FIG. 18A-B, the verified registered user 1810 of FIG. 21) with the different registered user. A connection path between the verified registered user (e.g., the verified registered user 1810 of FIG. 18A-B, the verified registered user 1810 of FIG. 21) and the different registered user, the connection path indicating at least one other registered user may be stored through whom the connection path between the verified registered user (e.g., the verified registered user 1810 of FIG. 18A-B, the verified registered user 1810 of FIG. 21) and the different registered user is made.

In addition, the connection path between the verified registered user (e.g., the verified registered user 1810 of FIG. 18A-B, the verified registered user 1810 of FIG. 21) and the different registered user may be communicated to the verified registered user to display. A hyperlink in the connection path of each of the at least one registered users may be embedded through whom the connection path between the verified registered user (e.g., the verified registered user 1810 of FIG. 18A-B, the verified registered user 1810 of FIG. 21) and the different registered user is made.

Figure 30:
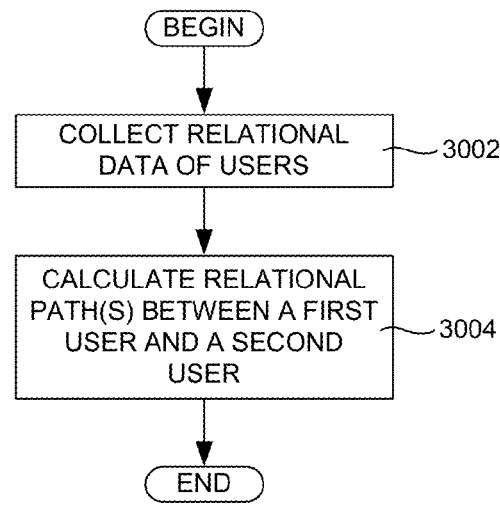
FIG. 30 is a flowchart of communicating brief profiles of the registered users, processing a hyperlink selection from the verified registered user and calculating and ensuring the Nmax degree of separation of the registered users away from verified registered users, according to one embodiment.

FIG. 30 is a flowchart of communicating brief profiles of the registered users, processing a hyperlink selection from the verified registered user (e.g., the verified registered user 1810 of FIG. 18A-B, the verified registered user 1810 of FIG. 21) and calculating and ensuring the Nmax degree of separation of the registered users away from verified registered users (e.g., the verified registered user 1810 of FIG. 18A-B, the verified registered user 1810 of FIG. 21), according to one embodiment. In operation 3002, the data of the registered users may be collected from the database. In operation 3004, the relational path between the first user and the second user may be calculated (e.g., the Nmax degree of separation between verified registered user (e.g., the verified registered user 1810 of FIG. 18A-B, the verified registered user 1810 of FIG. 21) and the registered user).

For example, the brief profiles of registered users, including a brief profile of the different registered user, to the verified registered user (e.g., the verified registered user 1810 of FIG. 18A-B, the verified registered user 1810 of FIG. 21) for display, each of the brief profiles including a hyperlink to a corresponding full profile may be communicated.

Furthermore, the hyperlink selection from the verified registered user (e.g., the verified registered user 1810 of FIG. 18A-B, the verified registered user 1810 of FIG. 21) may be processed (e.g., upon processing the hyperlink selection of the full profile of the different registered user, the full profile of the different registered user may be communicated to the verified registered user (e.g., the verified registered user 1810 of FIG. 18A-B, the verified registered user 1810 of FIG. 21) for display). In addition, the brief profiles of those registered users may be ensured who are more than Nmax degrees of separation away from the verified registered user (e.g., the verified registered user 1810 of FIG. 18A-B, the verified registered user 1810 of FIG. 21) are not communicated to the verified registered user (e.g., the verified registered user 1810 of FIG. 18A-B, the verified registered user 1810 of FIG. 21) for display.

Figure 31:
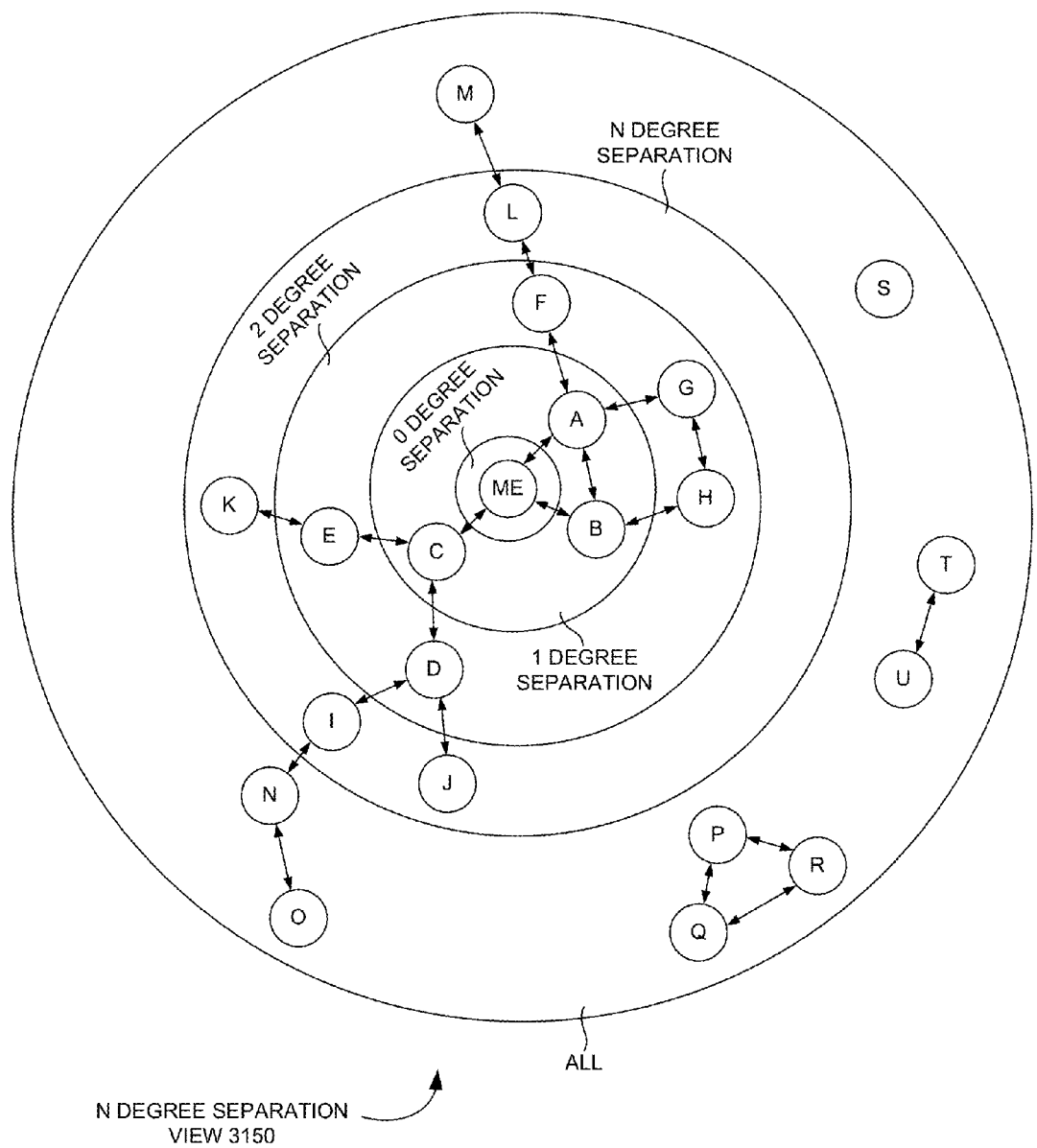
FIG. 31 is an N degree separation view, according to one embodiment.

FIG. 31 is an N degree separation view, according to one embodiment. ME may be a verified registered user (e.g., the verified registered user 1810 of FIG. 18A-B, the verified registered user 1810 of FIG. 21) of the global neighborhood environment (e.g., the geospatially constrained social network 142 of FIG. 1) centered in the neighborhood network. A, B, C, D, E, F, G, H, I, J, K, L, M, N, O, P, Q, R, S, T, and/or U may be the other registered user of the neighborhood network. The member of the neighborhood network may be separated from the centered verified registered user (e.g., the verified registered user 1810 of FIG. 18A-B, the verified registered user 1810 of FIG. 21) ME of the neighborhood network by certain degree of separation. The registered user A, B and C may be directly connected and may be deemed to be separated by one degree of separation from verified registered user (e.g., the verified registered user 1810 of FIG. 18A-B, the verified registered user 1810 of FIG. 21) ME. The registered user D, E, F, G, and H may be connected through no less than one other registered user may be deemed to be separated by two degree of separation from verified registered user (e.g., the verified registered user 1810 of FIG. 18A-B, the verified registered user 1810 of FIG. 21) ME. The registered user I, J, K, and L may be connected through no less than N−1 other registered user and may be deemed to be separated by N degree of separation from verified registered user (e.g., the verified registered user 1810 of FIG. 18A-B, the verified registered user 1810 of FIG. 21) ME. The registered user M, N, O, P, Q, R S, T and U may be all registered user.

Figure 32:
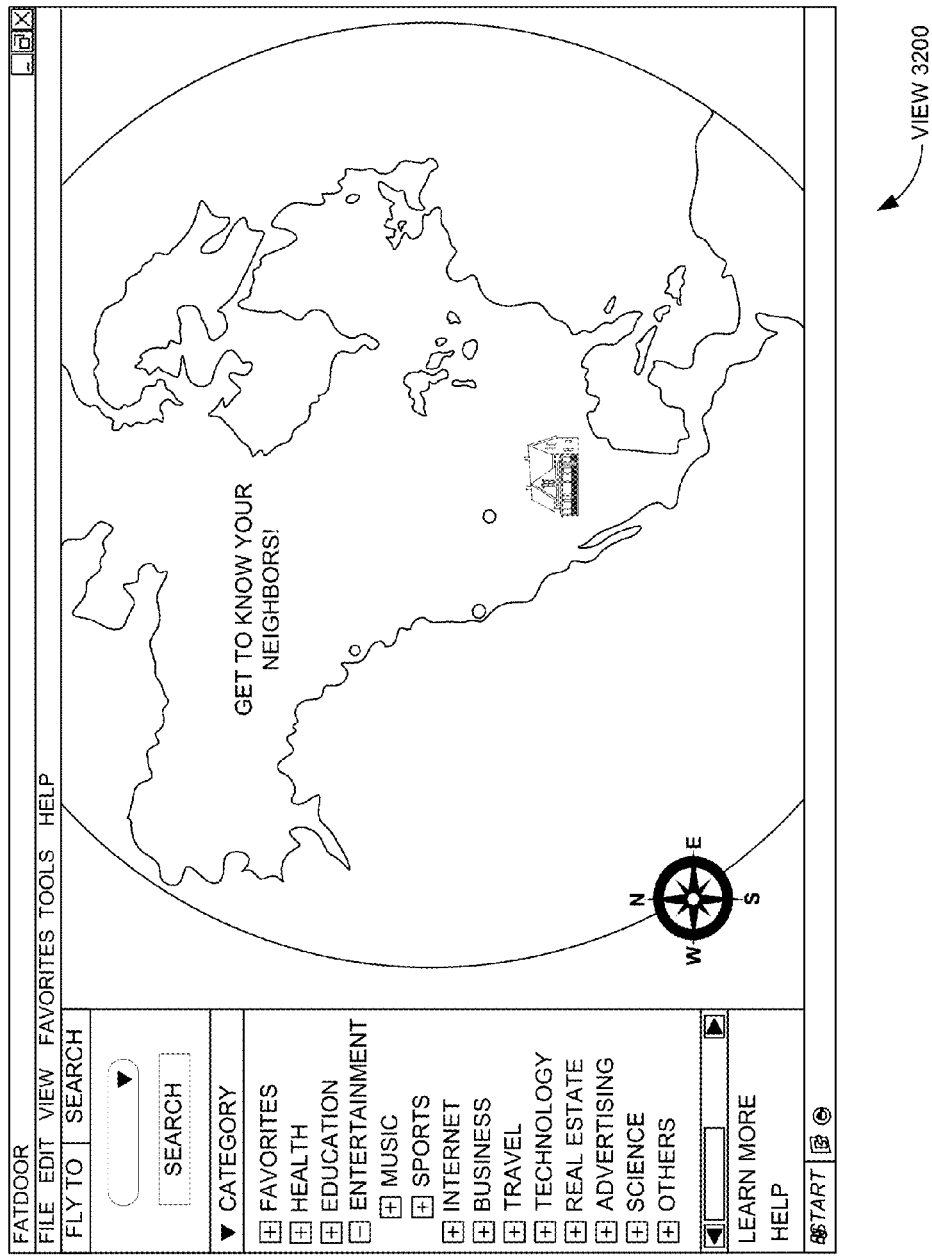
FIG. 32 is a user interface view showing a map, according to one embodiment.

FIG. 32 is a user interface view showing a map, according to one embodiment. Particularly FIG. 32 illustrates a satellite photo of a physical world. The registered user of the global neighborhood environment (e.g., the geospatially constrained social network 142 of FIG. 1) may use this for exploring the geographical location (e.g., the geographical location 1704 of FIG. 17A) of the neighbors (e.g., the other addresses associated with user profiles 402 of FIG. 4). The registered user (e.g., the verified registered user 1810 of FIG. 18A-B, the verified registered user 1810 of FIG. 21) may navigate, zoom, explore and quickly find particular desired geographical locations of the desired neighbors (e.g., the other addresses associated with user profiles 402 of FIG. 4). This may help the registered user to read the map an/or plot the route of the neighbors (e.g., the other addresses associated with user profiles 402 of FIG. 4) on the world map.

Figure 33A:
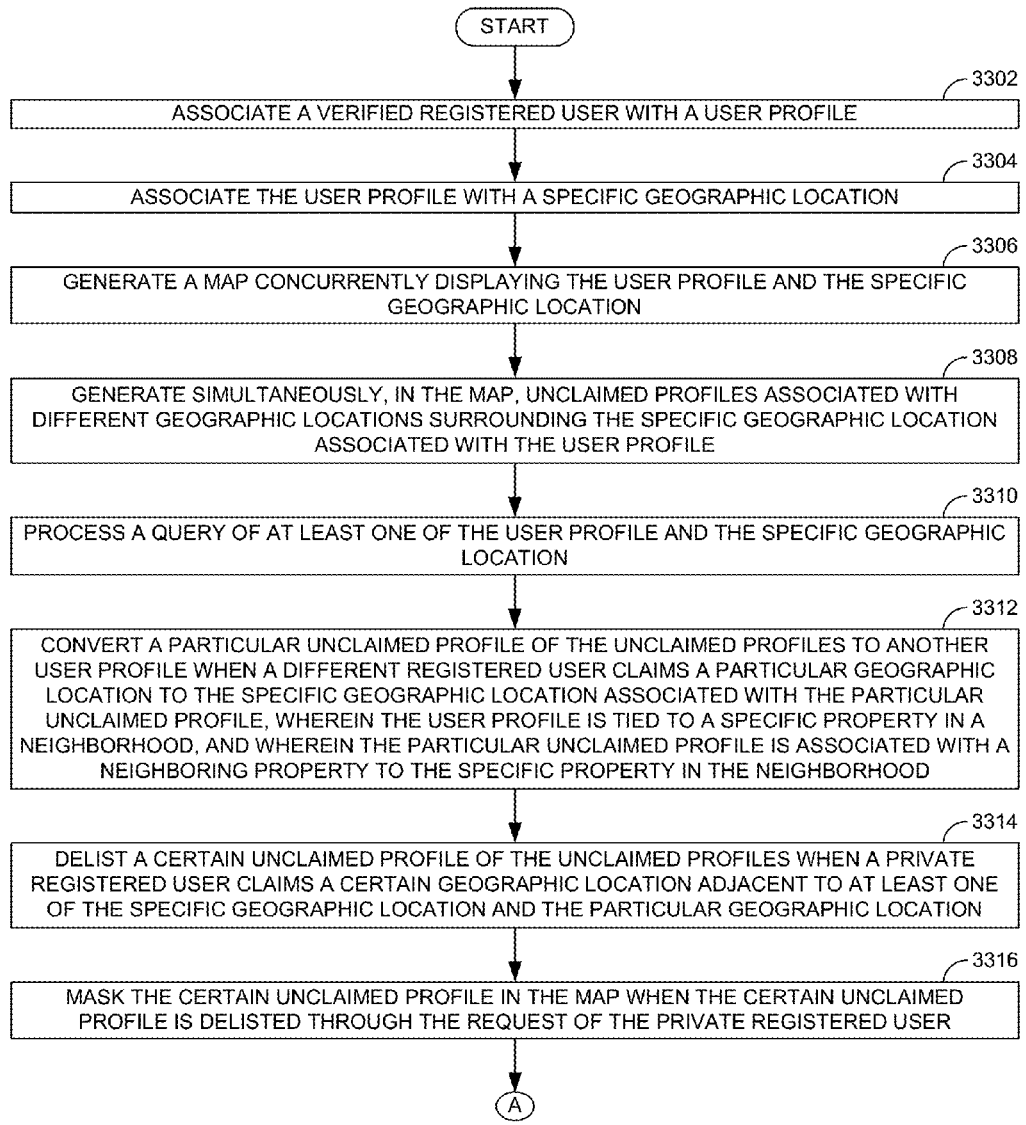
FIG. 33A is a process flow of searching a map based community and neighborhood contribution, according to one embodiment.

FIG. 33A is a process flow of searching map based community and neighborhood contribution, according to one embodiment. In operation 3302, a verified registered user (e.g., a verified registered user 1810 of FIG. 18A-18B, a verified registered user 1810 of FIG. 21) may be associated with a user profile (e.g., a user profile 1700 of FIG. 17A). In operation 3304, the user profile (e.g., the user profile 1700 of FIG. 17A) may be associated with a specific geographic location (e.g., a geographic location 1704 of FIG. 17A).

In operation 3306, a map (e.g., a map 1702 of FIG. 17A-17B, a map 1900 of FIG. 19, a map 2100 of FIG. 21, a map 2201 of FIG. 22) may be generated concurrently displaying the user profile (e.g., the user profile 1700 of FIG. 17A) and the specific geographic location (e.g., the geographic location 1704 of FIG. 17A). In operation, 3308, in the map, unclaimed profiles (e.g., a unclaimed profile 1706 of FIG. 17A-B, a unclaimed profile 1802 of FIG. 18A, a unclaimed profile 2204 of FIG. 22) associated with different geographic locations may be simultaneously generated surrounding the specific geographic location (e.g., the geographic location 1704 of FIG. 17A) associated with the user profile (e.g., the user profile 1700 of FIG. 17A).

In operation 3310, a query of at least one of the user profile (e.g., the user profile 1700 of FIG. 17A) and the specific geographic location (e.g., the geographic location 1704 of FIG. 17A) may be processed. In operation 3312, a particular unclaimed profile of the unclaimed profiles (e.g., the unclaimed profile 1706 of FIG. 17A-B, the unclaimed profile 1802 of FIG. 18A, the unclaimed profile 2204 of FIG. 22) may be converted to another user profile (e.g., the user profile 1700 of FIG. 17A) when a different registered user claims a particular geographic location to the specific geographic location (e.g., the geographic location 1704 of FIG. 17A) associated with the particular unclaimed profile (e.g., the unclaimed profile 1706 of FIG. 17A-B, the unclaimed profile 1802 of FIG. 18A, the unclaimed profile 2204 of FIG. 22), wherein the user profile (e.g., the user profile 1700 of FIG. 17A) may be tied to a specific property in a neighborhood (e.g., a claimed neighborhood 400 of FIG. 4, the unclaimed neighborhood 404 of FIG. 4), and wherein the particular unclaimed profile (e.g., the unclaimed profile 1706 of FIG. 17A-17B, the unclaimed profile 1802 of FIG. 18A, the unclaimed profile 2204 of FIG. 22) may be associated with a neighboring property to the specific property in the neighborhood (e.g., the claimed neighborhood 400 of FIG. 4, the unclaimed neighborhood 404 of FIG. 4).

In operation 3314, a certain unclaimed profile (e.g., the unclaimed profile 1706 of FIG. 17A-17B, the unclaimed profile 1802 of FIG. 18A, the unclaimed profile 2204 of FIG. 22) of the unclaimed profiles (e.g., the unclaimed profile 1706 of FIG. 17A-B, the unclaimed profile 1802 of FIG. 18A, the unclaimed profile 2204 of FIG. 22) may be delisted when a private registered user claims a certain geographic location (e.g., the geographic location 1704 of FIG. 17A) adjacent to at least one of the specific geographic location and the particular geographic location (e.g., the geographic location 1704 of FIG. 17A).

In operation 3316, the certain unclaimed profile (e.g., the unclaimed profile 1706 of FIG. 17A-B, the unclaimed profile 1802 of FIG. 18A, the unclaimed profile 2204 of FIG. 22) in the map (e.g., the map 1702 of FIG. 17A-B, the map 1900 of FIG. 19, the map 2100 of FIG. 21, the map 2201 of FIG. 22) when the certain unclaimed profile may be delisted and/or be masked through the request of the private registered user.

Figure 33B:
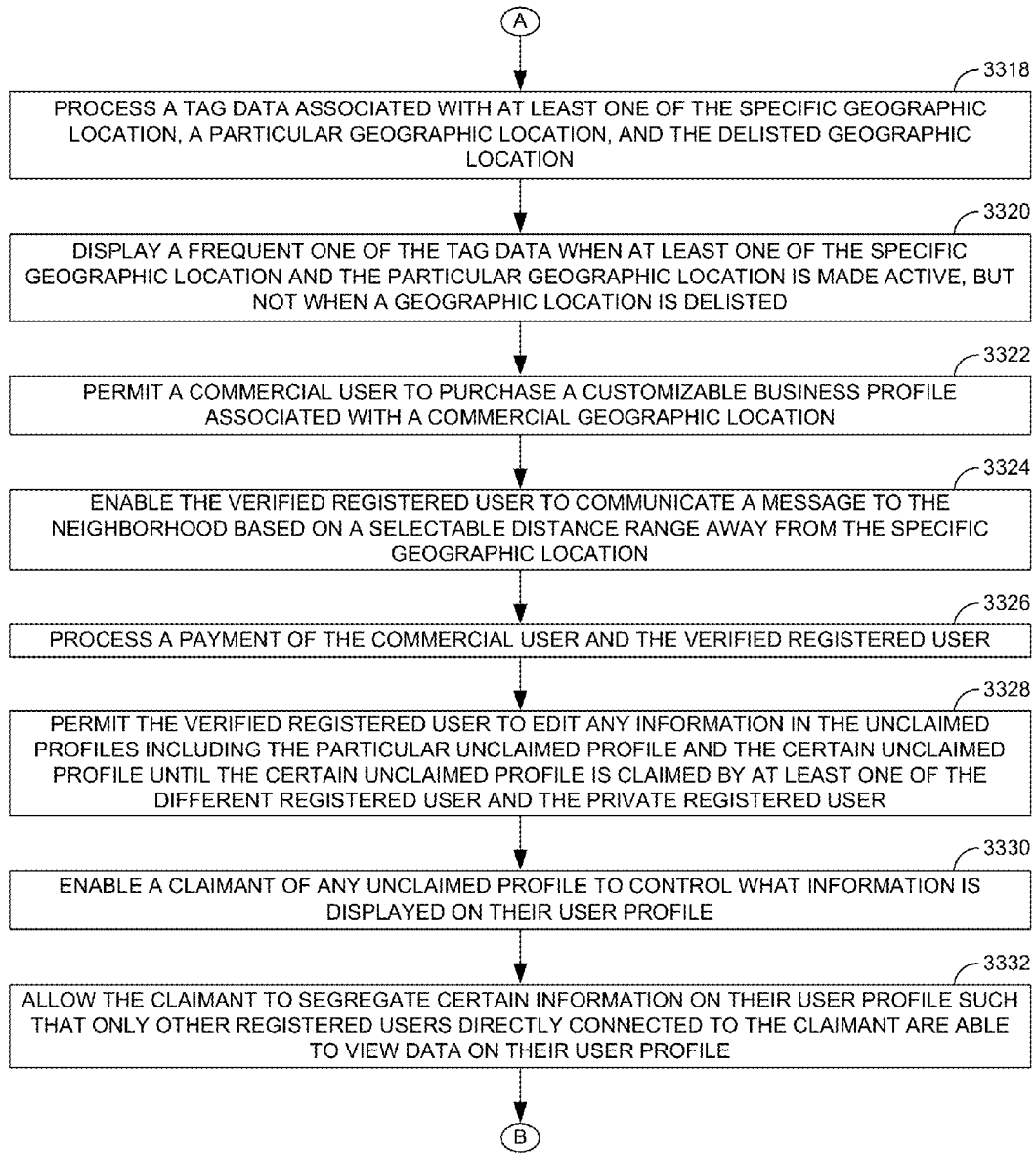
FIG. 33B is a continuation of process flow of FIG. 33A showing additional processes, according to one embodiment.

FIG. 33B is a continuation of process flow of FIG. 33A showing additional processes, according to one embodiment. In operation 3318, a tag data associated with at least one of the specific geographic location, the particular geographic location (e.g., the geographic location 1704 of FIG. 17A), and the delisted geographic location may be processed. In operation 3320, a frequent one of the tag data may be displayed when at least one of the specific geographic location and the particular geographic location (e.g., the geographic location 1704 of FIG. 17A) may be made active, but not when the geographic location (e.g., the geographic location 1704 of FIG. 17A) may be delisted.

In operation 3322, a commercial user (e.g., a commercial user 1800 of FIG. 18A-B) may be permitted to purchase a customizable business profile (e.g., a customizable business profile 1804 of FIG. 18B) associated with a commercial geographic location. In operation 3324, the verified registered user (e.g., the verified registered user 1810 of FIG. 18A-B, the verified registered user 1810 of FIG. 21) to communicate a message to the neighborhood (e.g., the claimed neighborhood 400 of FIG. 4, the unclaimed neighborhood 404 of FIG. 4) may be enabled based on a selectable distance range away from the specific geographic location.

In operation 3326, a payment of the commercial user (e.g., the commercial user 1800 of FIG. 18A-B) and the verified registered user (e.g., the verified registered user 1810 of FIG. 18A-B, the verified registered user 1810 of FIG. 21) may be processed. In operation 3328, the verified registered user (e.g., the verified registered user 1810 of FIG. 18A-B, the verified registered user 1810 of FIG. 21) may be permitted to edit any information in the unclaimed profiles (e.g., the unclaimed profile 1706 of FIG. 17A-B, the unclaimed profile 1802 of FIG. 18A, the unclaimed profile 2204 of FIG. 22) including the particular unclaimed profile and the certain unclaimed profile until the certain unclaimed profile may be claimed by at least one of the different registered user and the private registered user.

In operation 3330, a claimant of any unclaimed profile (e.g., the unclaimed profile 1706 of FIG. 17A-B, the unclaimed profile 1802 of FIG. 18A, the unclaimed profile 2204 of FIG. 22) may be enabled to control what information is displayed on their user profile (e.g., the user profile 1700 of FIG. 17A). In operation 3332, the claimant to segregate certain information on their user profile (e.g., the user profile 1700 of FIG. 17A) may be allowed such that only other registered users directly connected to the claimant are able to view data on their user profile (e.g., the user profile 1700 of FIG. 17A).

Figure 33C:
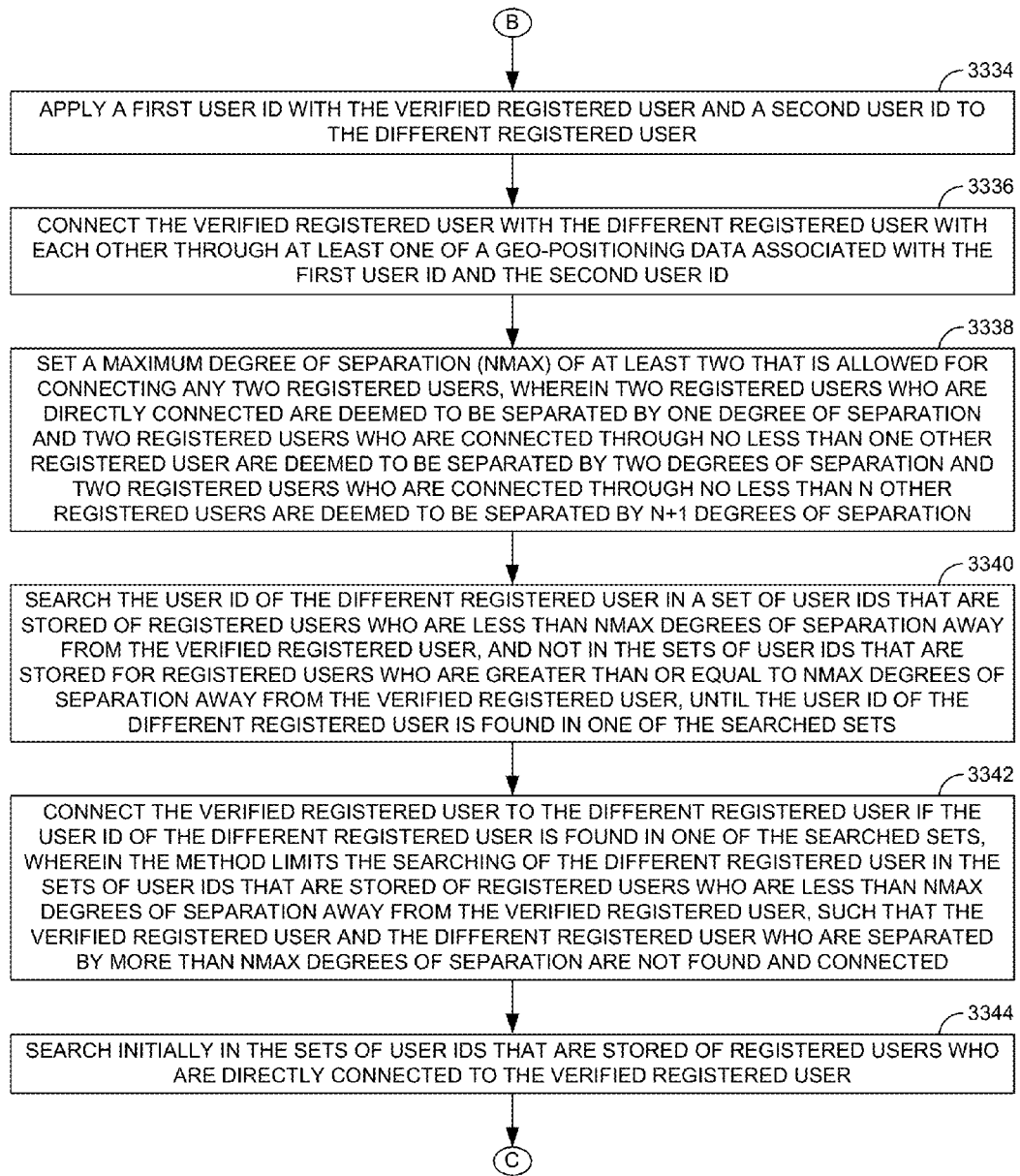
FIG. 33C is a continuation of process flow of FIG. 33B showing additional processes, according to one embodiment.

FIG. 33C is a continuation of process flow of FIG. 33B showing additional processes, according to one embodiment. In operation 3334, a first user ID with the verified registered user (e.g., the verified registered user 1810 of FIG. 18A-B, the verified registered user 1810 of FIG. 21) and a second user ID to the different registered user may be applied. In operation 3336, the verified registered user (e.g., the verified registered user 1810 of FIG. 18A-B, the verified registered user 1810 of FIG. 21) with the different registered user with each other may be connected through at least one of associated with the first user ID and the second user ID.

In operation 3338, a maximum degree of separation (Nmax) of at least two may be set that is allowed for connecting any two registered users, wherein two registered users who are directly connected may be deemed to be separated by one degree of separation and two registered users who are connected through no less than one other registered user may be deemed to be separated by two degrees of separation and two registered users who may be connected through no less than N other registered users are deemed to be separated by N+1 degrees of separation. In operation 3340, the user ID of the different registered user may be searched in a set of user IDs that are stored of registered users who are less than Nmax degrees of separation away from the verified registered user (e.g., the verified registered user 1810 of FIG. 18A-B, the verified registered user 1810 of FIG. 21), and not in the sets of user IDs that are stored for registered users who may be greater than or equal to Nmax degrees of separation away from the verified registered user (e.g., the verified registered user 1810 of FIG. 18A-B, the verified registered user 1810 of FIG. 21), until the user ID of the different registered user may be found in one of the searched sets.

In operation 3342, the verified registered user (e.g., the verified registered user 1810 of FIG. 18A-B, the verified registered user 1810 of FIG. 21) may be connected to the different registered user if the user ID of the different registered user may be found in one of the searched sets, wherein the method limits the searching of the different registered user in the sets of user IDs that may be stored of registered users who may be less than Nmax degrees of separation away from the verified registered user (e.g., the verified registered user 1810 of FIG. 18A-B, the verified registered user 1810 of FIG. 21), such that the verified registered user (e.g., the verified registered user 1810 of FIG. 18A-B, the verified registered user 1810 of FIG. 21) and the different registered user who may be separated by more than Nmax degrees of separation are not found and connected. In operation 3344, initially in the sets of user IDs that are stored of registered users who may be directly connected to the verified registered user (e.g., the verified registered user 1810 of FIG. 18A-B, the verified registered user 1810 of FIG. 21) may be initially searched.

Figure 33D:
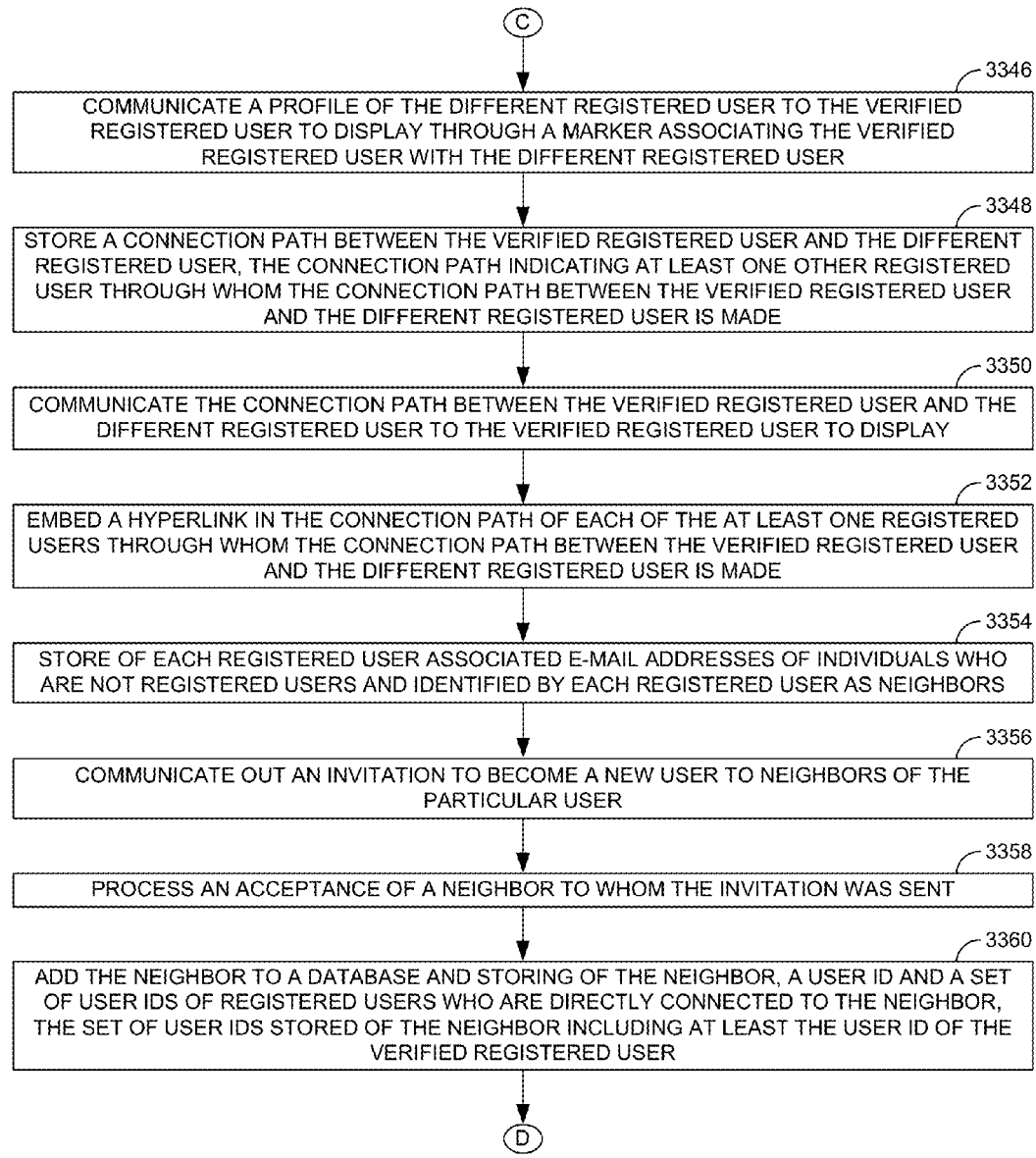
FIG. 33D is a continuation of process flow of FIG. 33C showing additional processes, according to one embodiment.

FIG. 33D is a continuation of process flow of FIG. 33C showing additional processes, according to one embodiment. In operation 3346, a profile of the different registered user to the verified registered user (e.g., the verified registered user 1810 of FIG. 18A-B, the verified registered user 1810 of FIG. 21) to display may be communicated through a marker associating the verified registered user (e.g., the verified registered user 1810 of FIG. 18A-B, the verified registered user 1810 of FIG. 21) with the different registered user.

In operation 3348, a connection path between the verified registered user (e.g., the verified registered user 1810 of FIG. 18A-B, the verified registered user 1810 of FIG. 21) and the different registered user, the connection path indicating at least one other registered user may be stored through whom the connection path between the verified registered user (e.g., the verified registered user 1810 of FIG. 18A-B, the verified registered user 1810 of FIG. 21) and the different registered user may be made.

In operation 3350, the connection path between the verified registered user (e.g., the verified registered user 1810 of FIG. 18A-B, the verified registered user 1810 of FIG. 21) and the different registered user to the verified registered user (e.g., the verified registered user 1810 of FIG. 18A-B, the verified registered user 1810 of FIG. 21) may be communicated to display.

In operation 3352, a hyperlink in the connection path of each of the at least one registered users may be embedded through whom the connection path between the verified registered user (e.g., the verified registered user 1810 of FIG. 18A-B, the verified registered user 1810 of FIG. 21) and the different registered user may be made. In operation 3354, each registered user associated e-mail addresses of individuals who are not registered users may be stored and identified by each registered user as neighbors (e.g., a other addresses associated with user profiles 402 of FIG. 4).

In operation 3356, an invitation may be communicated to become a new user (e.g., a user 106 of FIG. 1) to neighbors (e.g., the other addresses associated with user profiles 402 of FIG. 4) of the particular user. In operation 3358, an acceptance of the neighbor (e.g., the other addresses associated with user profiles 402 of FIG. 4) to whom the invitation was sent may be processed. In operation 3360, the neighbor (e.g., the other addresses associated with user profiles 402 of FIG. 4) to a database and storing of the neighbor (e.g., the other addresses associated with user profiles 402 of FIG. 4), a user ID and the set of user IDs of registered users may be added who are directly connected to the neighbor (e.g., the other addresses associated with user profiles 402 of FIG. 4), the set of user IDs stored of the neighbor (e.g., the other addresses associated with user profiles 402 of FIG. 4) including at least the user ID of the verified registered user (e.g., the verified registered user 1810 of FIG. 18A-B, the verified registered user 1810 of FIG. 21).

Figure 33E:
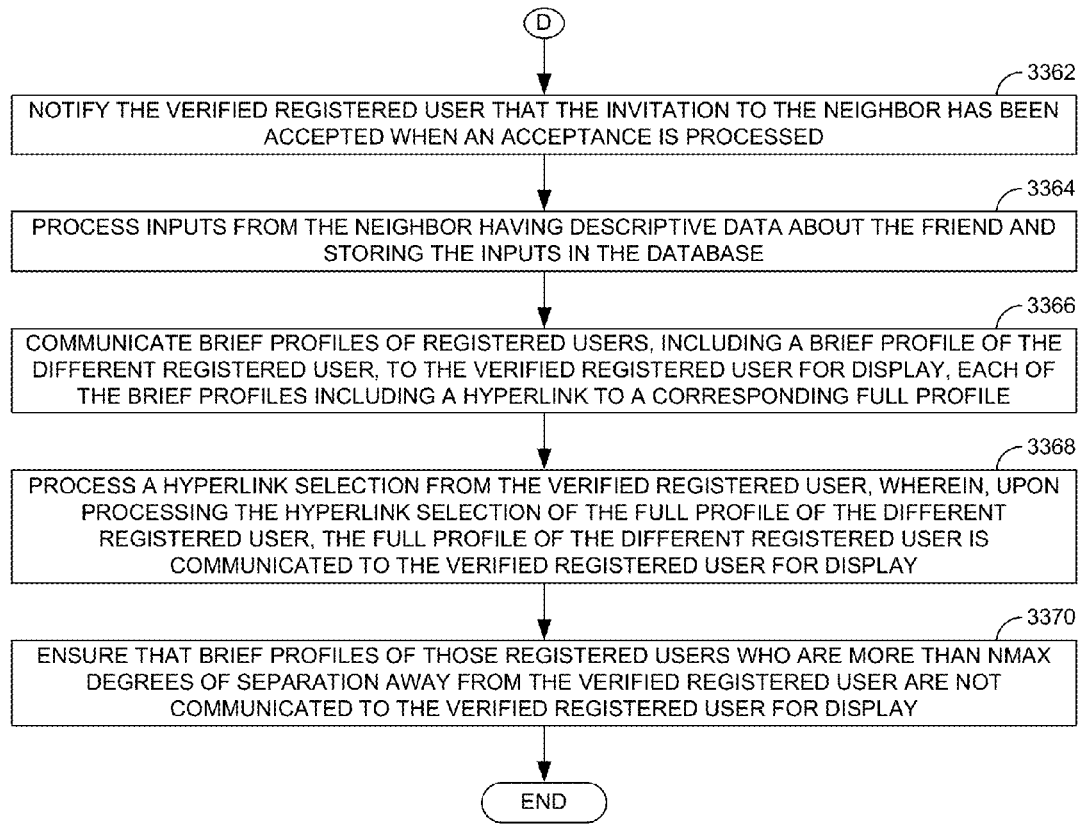
FIG. 33E is a continuation of process flow of FIG. 33D showing additional processes, according to one embodiment.

FIG. 33E is a continuation of process flow of FIG. 33D showing additional processes, according to one embodiment. In operation 3362, the verified registered user (e.g., the verified registered user 1810 of FIG. 18A-B, the verified registered user 1810 of FIG. 21) that the invitation to the neighbor (e.g., the other addresses associated with user profiles 402 of FIG. 4) has been accepted may be notified when the acceptance is processed.

In operation 3364, inputs from the neighbor (e.g., the other addresses associated with user profiles 402 of FIG. 4) having descriptive data about the friend and storing the inputs in the database may be processed. In operation 3366, brief profiles of registered users, including a brief profile of the different registered user may be communicated, to the verified registered user (e.g., the verified registered user 1810 of FIG. 18A-B, the verified registered user 1810 of FIG. 21) for display, each of the brief profiles including the hyperlink to a corresponding full profile.

In operation 3368, the hyperlink selection from the verified registered user (e.g., the verified registered user 1810 of FIG. 18A-B, the verified registered user 1810 of FIG. 21) may be processed, wherein, upon processing the hyperlink selection of the full profile of the different registered user, the full profile of the different registered user is communicated to the verified registered user (e.g., the verified registered user 1810 of FIG. 18A-B, the verified registered user 1810 of FIG. 21) for display.

In operation 3370, brief profiles of those registered users who may be more than Nmax degrees of separation away from the verified registered user (e.g., the verified registered user 1810 of FIG. 18A-B, the verified registered user 1810 of FIG. 21) may not communicated to the verified registered user (e.g., the verified registered user 1810 of FIG. 18A-B, the verified registered user 1810 of FIG. 21) may be ensured for display.

It should be noted that there are a number of different 'user' roles described in the various embodiments described herein. The user roles include a 'user', a 'claimed user', and a 'verified user'. The user is someone that has signed up for and/or accessed the emergency response server 100 through the geospatially constrained social network 142. The user can 'claim' an existing profile (e.g., prepopulated and/or created by another user through a wiki like creation process), and/or 'claim' an address with a new location, thereby transforming the user to the 'claimed user'. The claimed user can verify that they actually live at a particular home address and/or work at a particular business address (e.g., thereby showing their affiliation with a non-transitory location) by submitting a response to a verification code on a postcard, submitting a utility bill, and/or being invited by and/or getting vouched for by an existing verified user. This can transform the claimed user to a 'verified user', in one embodiment. It will be understood by those with skill in the art that the user 106 may refer to either a user that has not yet claimed, the claimed user, and/or the verified user.

In one embodiment, a method of an emergency response server 100 includes validating that an broadcast data (e.g., the emergency broadcast data 102) generated through a mobile device 504 is associated with a verified user (e.g., the user 106 of FIG. 1 as described as the verified user in FIG. 7) of the emergency response server 100 using a processor 120 and a memory 124. The method verifies that a set of geospatial coordinates 103 associated with the broadcast data (e.g., the emergency broadcast data 102) generated through the mobile device 504 are trusted based on a claimed geospatial location of the verified user (e.g., the user 106 of FIG. 1 as described as the verified user in FIG. 7) of the emergency response server 100. In addition, the method determines that a time stamp 510 associated with a creation date 508 and a creation time 507 of the broadcast data (e.g., the emergency broadcast data 102) generated through the mobile device 504 is trusted based on the claimed geospatial location of the verified user (e.g., the user 106 of FIG. 1 as described as the verified user in FIG. 7) of the emergency response server 100.

Furthermore, the emergency response server 100 automatically publishes the broadcast data (e.g., the emergency broadcast data 102) generated through the mobile device 504 on a set of user profiles having associated verified addresses in a threshold radial distance 119 from the set of geospatial coordinates 103 associated with the broadcast data (e.g., the emergency broadcast data 102) generated through the mobile device 504 of the verified user (e.g., the user 106 of FIG. 1 as described as the verified user in FIG. 7) of the emergency response server 100 using a radial algorithm 240. The method may determine that the broadcast data is generated by the verified user (e.g., the user 106 of FIG. 1 as described as the verified user in FIG. 7) of a neighborhood broadcast system when validating that the broadcast data is associated with the mobile device 504.

The method may also determine that an application on the mobile device 504 is communicating the broadcast data (e.g., the emergency broadcast data 102) to the emergency response network 150 when the broadcast data is processed. The verified user (e.g., the user 106 of FIG. 1 as described as the verified user in FIG. 7) may be associated with a verified user profile in the emergency response network 150 through the application on the mobile device 504. The broadcast data (e.g., the emergency broadcast data 102) generated through the mobile device 504 may be presented as an emergency alert pushpin of the emergency broadcast in a geospatial map surrounding pre-populated residential and/or business listings in a surrounding vicinity (such that the emergency alert pushpin of the emergency broadcast is automatically presented on the geospatial map in addition to being presented on the set of user profiles having associated verified addresses in the threshold radial distance 119 from the set of geospatial coordinates 103 associated with the broadcast data (e.g., the emergency broadcast data 102) generated through the mobile device 504 of the verified user (e.g., the user 106 of FIG. 1 as described as the verified user in FIG. 7) of the emergency response server 100).

The broadcast data (e.g., the emergency broadcast data 102) generated through the mobile device 504 may be radially distributed through an on-page posting, an electronic communication, and/or a push notification (delivered to desktop and/or mobile devices 504). The broadcast data (e.g., the emergency broadcast data 102) may be associated with users and/or their user profiles around an epicenter 144 defined at the set of geospatial coordinates 103 associated with the broadcast data (e.g., the emergency broadcast data 102).

The broadcast data (e.g., the emergency broadcast data 102) may be generated through the mobile device 504 to all subscribed user profiles in a circular geo-fenced area defined by the threshold distance from the set of geospatial coordinates 103 associated with the broadcast data (e.g., the emergency broadcast data 102). Furthermore, the broadcast data (e.g., the emergency broadcast data 102) may be generated through the mobile device 504 through the radial algorithm 240 of a emergency response network 150 that measures a distance away of each address associated with each user profile 402 from the current geospatial location at the epicenter 144.

The verified user (e.g., the user 106 of FIG. 1 as described as the verified user in FIG. 7) may be permitted to drag and drop the emergency alert pushpin on any location on the geospatial map and/or automatically determine a latitude and/or a longitude associated with a placed location. A police department 309B, a fire department 309C, and/or a hospital 309D in a surrounding geospatial area to the set of geospatial coordinates 103 associated with the broadcast data (e.g., the emergency broadcast data 102) generated through the mobile device 504 may be notified.

Furthermore, the method may monitor whenever the mobile device 504 associated with the verified user (e.g., the user 106 of FIG. 1 as described as the verified user in FIG. 7) is used to generate an emergency telephone call 1200. An audio data 1202 associated with the emergency telephone call 1200 through the mobile device 504 may be captured through an emergency capture module 226 of the emergency response server 100. Also, a transcript 1204 of the audio data 1202 through a transcription module 260 of the emergency response server 100 may be generated. A notification of the emergency telephone call 1200, the audio data 1202 associated with the emergency telephone call 1200, and/or the transcript 1204 of the emergency telephone call 1200 may be automatically broadcast through the on-page posting, the electronic communication, and/or the push notification (delivered to desktop and/or mobile devices 504 associated with users and/or their user profiles around the epicenter 144 defined at the set of geospatial coordinates 103 associated with the broadcast data (e.g., the emergency broadcast data 102) generated through the mobile device 504 using the radial algorithm 240). The geospatial coordinates 103 may be extracted from a metadata associated with the broadcast data (e.g., the emergency broadcast data 102) generated through the mobile device 504.

The geospatial coordinated may be extracted when verifying that the set of geospatial coordinates 103 associated with the broadcast data (e.g., the emergency broadcast data 102) generated through the mobile device 504 are trusted based on the claimed geospatial location of the verified user (e.g., the user 106 of FIG. 1 as described as the verified user in FIG. 7) of the emergency response server 100. A relative match between a persistent clock associated with the emergency response server 100 and/or a digital clock of the mobile device 504 may determine that the time stamp 510 associated with the creation date 508 and/or time of the broadcast data (e.g., the emergency broadcast data 102) generated through the mobile device 504 is accurate and/or therefore trusted. The broadcast data (e.g., the emergency broadcast data 102) generated through the mobile device 504 may be automatically deleted on a set of user profiles having associated verified addresses in the threshold radial distance 119 from the set of geospatial coordinates 103 associated with the broadcast data (e.g., the emergency broadcast data 102) generated through the mobile device 504 of the verified user (e.g., the user 106 of FIG. 1 as described as the verified user in FIG. 7) of the emergency response server 100 based on an emergency alert expiration time.

A set of residential addresses each associated with a resident name in a neighborhood surrounding the mobile device 504 may be geocoded. The set of residential addresses each associated with the resident name as the set of user profiles in the threshold radial distance 119 from the claimed geospatial location of the verified user (e.g., the user 106 of FIG. 1 as described as the verified user in FIG. 7) of the emergency response server 100 may be populated in a neighborhood curation system (e.g., part of the geospatially constrained social network 142) communicatively coupled with the emergency response server 100.

The verified user (e.g., the user 106 of FIG. 1 as described as the verified user in FIG. 7) may be permitted to modify content in each of the set of user profiles. The modified content may be tracked through the neighborhood curation system (e.g., part of the geospatially constrained social network 142). A reversible history journal associated with each of the set of user profiles may be generated such that a modification of the verified user (e.g., the user 106 of FIG. 1 as described as the verified user in FIG. 7) can be undone on a modified user profile page. An editing credibility of the verified user (e.g., the user 106 of FIG. 1 as described as the verified user in FIG. 7) may be determined based on an edit history of the verified user (e.g., the user 106 of FIG. 1 as described as the verified user in FIG. 7) and/or a community contribution validation of the verified user (e.g., the user 106 of FIG. 1 as described as the verified user in FIG. 7) by other users of the neighborhood curation system (e.g., part of the geospatially constrained social network 142).

The broadcast data (e.g., the emergency broadcast data 102) generated through the mobile device 504 may be automatically published to the set of user profiles having associated verified addresses in the threshold radial distance 119 from the claimed geospatial location of the verified user (e.g., the user 106 of FIG. 1 as described as the verified user in FIG. 7) of the emergency response server 100 using the radial algorithm 240. A claim request of the verified user (e.g., the user 106 of FIG. 1 as described as the verified user in FIG. 7) generating the broadcast data (e.g., the emergency broadcast data 102) generated through the mobile device 504 through the mobile device 504 may be processed to be associated with an address of the neighborhood curation system (e.g., part of the geospatially constrained social network 142).

It may be determined if the claimable neighborhood in the neighborhood curation system (e.g., part of the geospatially constrained social network 142) is associated with a private neighborhood community in the claimable neighborhood of the neighborhood curation system (e.g., part of the geospatially constrained social network 142). The verified user (e.g., the user 106 of FIG. 1 as described as the verified user in FIG. 7) may be associated with the private neighborhood community in the claimable neighborhood of the neighborhood curation system (e.g., part of the geospatially constrained social network 142) if the private neighborhood community has been activated by the verified user (e.g., the user 106 of FIG. 1 as described as the verified user in FIG. 7) and/or a different verified user (e.g., the user 106 of FIG. 1 as described as the verified user in FIG. 7). The verified user (e.g., the user 106 of FIG. 1 as described as the verified user in FIG. 7) may be permitted to draw a set of boundary lines in a form of a geospatial polygon such that the claimable neighborhood in a geospatial region surrounding the claim request creates the private neighborhood community in the neighborhood curation system (e.g., part of the geospatially constrained social network 142) if the private neighborhood community is inactive.

The method may verify the claim request of the verified user (e.g., the user 106 of FIG. 1 as described as the verified user in FIG. 7) generating the broadcast data (e.g., the emergency broadcast data 102) generated through the mobile device 504 through the mobile device 504 to be associated with a neighborhood address of the neighborhood curation system (e.g., part of the geospatially constrained social network 142) when the address is determined to be associated with a work address and/or a residential address of the verified user (e.g., the user 106 of FIG. 1 as described as the verified user in FIG. 7).

The broadcast data (e.g., the emergency broadcast data 102) generated through the mobile device 504 may be simultaneously published on the private neighborhood community associated with the verified user (e.g., the user 106 of FIG. 1 as described as the verified user in FIG. 7) generating the broadcast data (e.g., the emergency broadcast data 102) generated through the mobile device 504 through the mobile device 504 in the threshold radial distance 119 from the address associated with the claim request of the verified user (e.g., the user 106 of FIG. 1 as described as the verified user in FIG. 7) of the neighborhood curation system (e.g., part of the geospatially constrained social network 142) (when automatically publishing the broadcast data (e.g., the emergency broadcast data 102) generated through the mobile device 504 on a set of user profiles (e.g., preseeded user profiles 302 and/or claimed user profiles 304 as described in FIG. 3 having associated verified addresses) having associated verified addresses) in the threshold radial distance 119 from the claimed geospatial location of the verified user (e.g., the user 106 of FIG. 1 as described as the verified user in FIG. 7) of the emergency response server 100 based on a set of preferences of the verified user (e.g., the user 106 of FIG. 1 as described as the verified user in FIG. 7) using the radial algorithm 240.

A summary data 626 may be provided to the verified user (e.g., the user 106 of FIG. 1 as described as the verified user in FIG. 7) generating the broadcast data (e.g., the emergency broadcast data 102) generated through the mobile device 504 through the mobile device 504 of how many user profile pages were updated with an alert of the broadcast data (e.g., the emergency broadcast data 102) generated through the mobile device 504 when publishing the broadcast data (e.g., the emergency broadcast data 102) generated through the mobile device 504 (in the private neighborhood community and/or the set of user profiles having associated verified addresses in the threshold radial distance 119 from the claimed geospatial location of the verified user (e.g., the user 106 of FIG. 1 as described as the verified user in FIG. 7) of the emergency response server 100) based on the set of preferences of the verified user (e.g., the user 106 of FIG. 1 as described as the verified user in FIG. 7).

The broadcast data (e.g., the emergency broadcast data 102) generated through the mobile device 504 may be live broadcast to the different verified user (e.g., the user 106 of FIG. 1 as described as the verified user in FIG. 7) and/or other verified users in the private neighborhood community and/or currently within the threshold radial distance 119 from the current geospatial location through a multicast algorithm 276 of the emergency response server 100 such that a live broadcast multicasts to a plurality of data processing systems associated with each of the different user and/or the other verified users simultaneously when the mobile device 504 of the verified user (e.g., the user 106 of FIG. 1 as described as the verified user in FIG. 7) generating the live-broadcast enables broadcasting of the broadcast data (e.g., the emergency broadcast data 102) generated through the mobile device 504 to any one of a geospatial vicinity around the mobile device 504 of the verified user (e.g., the user 106 of FIG. 1 as described as the verified user in FIG. 7) generating the broadcast and/or in any private neighborhood community in which the verified user (e.g., the user 106 of FIG. 1 as described as the verified user in FIG. 7) has a non-transitory connection.

In one embodiment, the emergency broadcast data 102 is generated based only upon special conditions and is sparingly used by users of the geo-spatially constrained social network 142 only in the most important and real emergency scenarios. In this model, the emergency broadcast data 102 is reserved only for true emergencies, similar to a 911 call. A user that abuses the use of the emergency broadcast data 102 may be banned from making future emergency broadcasts (e.g., the boy that cried wolf analogy). In one embodiment, a municipality and/or government agency may even make emergency broadcast data 102 created as a prank and for non-emergency purposes into a crime that is separately prosecutable. In one embodiment, transcripts of emergency broadcast data 102 may be automatically generated and be usable in a court proceeding to prove exigent circumstances and/or present sense impressions of an emergency event. In this way, a time stamp and archiving of the emergency broadcast data 102 may be extremely important, in one or more embodiments.

In one embodiment, the emergency broadcast data 102 generated in the geo-spatially constrained social network is limited in its use to emergency situations that require immediate assistance from the police, fire department, or an ambulance. For example, a scenario of a fire, a crime in progress, a car crash (e.g., especially when someone is injured), a medical emergency (e.g., such as when someone is unconscious, gasping for air or not breathing, experiencing an allergic reaction, having chest pain, having uncontrollable bleeding, and/or any symptoms that require immediate medical attention). In one embodiment, immediately after generating the emergency broadcast data 102, an official in the geo-spatially constrained social network 142 (e.g., may immediately establish a chat, video, and/or voice session and ask a series of question including the nature of the emergency, location of the emergency including the street address, the phone number the user is generating the emergency broadcast data 102 from, and details of the emergency such as a physical description of a person who may have committed a crime, a description of any fire that may be burning, or a description of injuries or symptoms being experienced by a person having a medical emergency. The call taker (e.g., perhaps an administrator of the geospatial social network) may append additional details to the emergency broadcast data 102 prior to it being sent out as the notification data 104 based on access privileges defined by the radial distribution module 140 using the radial algorithm 240.

In one embodiment, the mobile device 504 may generate the emergency broadcast data 102 by the depression of a button or combination of buttons without use of the user interface. For example, the mobile device 504 may include a "panic button" that begins recording audio and broadcasting it as an emergency broadcast data 102. In another example, the mobile device 504 may include several buttons used for ordinary functions (e.g., increase volume, decrease volume, power-off, etc.), that, when depressed in a certain combination or held down all at once generate the emergency broadcast data 102.

The different verified user (e.g., the user 106 of FIG. 1 as described as the verified user in FIG. 7) and/or other verified users in the private neighborhood community may be permitted to bi-directionally communicate with the verified user (e.g., the user 106 of FIG. 1 as described as the verified user in FIG. 7) generating the broadcast through the emergency response server 100. Any private neighborhood community in which the verified user (e.g., the user 106 of FIG. 1 as described as the verified user in FIG. 7) has the non-transitory connection may be the residential address of the verified user (e.g., the user 106 of FIG. 1 as described as the verified user in FIG. 7) and/or a work address of the verified user (e.g., the user 106 of FIG. 1 as described as the verified user in FIG. 7) that has been confirmed by the emergency response server 100 as being associated with the verified user (e.g., the user 106 of FIG. 1 as described as the verified user in FIG. 7). The threshold distance may be between 0.2 and/or 0.4 miles from the set of geospatial coordinates 103 associated with the broadcast data (e.g., the emergency broadcast data 102) generated through the mobile device 504 to optimize a relevancy of the live-broadcast.

The emergency response server 100 may include a crowd-sourced moderation algorithm 204 in which multiple neighbors to a geospatial area determine what content contributed to the emergency response server 100 persists and which is deleted. Additionally, the emergency response server 100 may permit users to mute messages of specific verified users to prevent misuse of the emergency response server 100.

In another aspect, the method of an emergency response server 100 includes determining that a time stamp 510 associated with a creation date 508 and a creation time 507 of an broadcast data (e.g., the emergency broadcast data 102) generated through the mobile device 504 is trusted based on the claimed geospatial location of the user of the emergency response server 100 using a processor 120 and a memory 124. The method includes automatically publishing the broadcast data (e.g., the emergency broadcast data 102) generated through the mobile device 504 on a set of user profiles having associated verified addresses in a threshold radial distance 119 from the set of geospatial coordinates 103 associated with the broadcast data (e.g., the emergency broadcast data 102) generated through the mobile device 504 of the user of the emergency response server 100 using a radial algorithm 240.

In addition, the method includes radially distributing the broadcast data (e.g., the emergency broadcast data 102) as a notification data through an on-page posting, an electronic communication, and/or a push notification delivered to either (1) a set of recipients through an internet protocol (IP) based network 101 associated with users and their user profiles around an epicenter 144 defined at the set of geospatial coordinates 103 associated with the broadcast data (e.g., the emergency broadcast data 102) generated through the computing device, or (2) a set of emergency services accessible by the emergency response server 100 through a cellular network using the radial algorithm 240 in addition to the set of recipients through the IP based network 101 associated with users and their user profiles.

In yet another aspect, a system includes an emergency response server 100 to automatically publish the broadcast data (e.g., the emergency broadcast data 102) on a set of user profiles having associated verified addresses in a threshold radial distance 119 from the set of geospatial coordinates 103 associated with the broadcast data (e.g., the emergency broadcast data 102) of a verified user (e.g., the user 106 of FIG. 1 as described as the verified user in FIG. 7) of the emergency response server 100 using a radial algorithm 240. The system also includes a network 101 and a mobile device 504 communicatively coupled with the emergency response server 100 through the network 101 to generate the broadcast data (e.g., the emergency broadcast data 102) using a camera, a microphone, and a sensory capability of the mobile device 504 and/or to generate a captured data that is appended with a present geospatial location and a time stamp 510 associated with a creation date 508 and a creation time 507 of captured data to create the broadcast data (e.g., the emergency broadcast data 102).

A validation module 200 may determine that an broadcast data (e.g., the emergency broadcast data 102) generated through a mobile device 504 is associated with a verified user (e.g., the user 106 of FIG. 1 as described as the verified user in FIG. 7) of the emergency response server 100 using a processor 120 and/or a memory 124 and/or to determine that the broadcast data (e.g., the emergency broadcast data 102) is generated by the verified user (e.g., the user 106 of FIG. 1 as described as the verified user in FIG. 7) of the neighborhood broadcast system when validating that the broadcast data is associated with the mobile device 504. A validation module 200 may ensure that a set of geospatial coordinates 103 associated with the broadcast data (e.g., the emergency broadcast data 102) generated through the mobile device 504 are trusted based on a claimed geospatial location of the verified user (e.g., the user 106 of FIG. 1 as described as the verified user in FIG. 7) of the emergency response server 100.

A time stamp module 202 may ensure that a time stamp 510 associated with a creation date 508 and/or a creation time 507 of the broadcast data (e.g., the emergency broadcast data 102) generated through the mobile device 504 is trusted based on the claimed geospatial location of the verified user (e.g., the user 106 of FIG. 1 as described as the verified user in FIG. 7) of the emergency response server 100. A listing module 272 may automatically publish the broadcast data (e.g., the emergency broadcast data 102) generated through the mobile device 504 on a set of user profiles having associated verified addresses in a threshold radial distance 119 from the set of geospatial coordinates 103 associated with the broadcast data (e.g., the emergency broadcast data 102) generated through the mobile device 504 of the verified user (e.g., the user 106 of FIG. 1 as described as the verified user in FIG. 7) of the emergency response server 100 using a radial algorithm 240.

An application module 274 may determine that an application on the mobile device 504 is communicating the broadcast data to the emergency response network 150 when the broadcast data is processed, and/or to associate the verified user (e.g., the user 106 of FIG. 1 as described as the verified user in FIG. 7) with a verified user profile in the emergency response network 150 through the application on the mobile device 504.

A pushpin module 206 may present the broadcast data (e.g., the emergency broadcast data 102) generated through the mobile device 504 as an emergency alert pushpin of the emergency broadcast in a geospatial map surrounding pre-populated residential and/or business listings in a surrounding vicinity, such that the emergency alert pushpin of the emergency broadcast is automatically presented on the geospatial map in addition to being presented on the set of user profiles having associated verified addresses in the threshold radial distance 119 from the set of geospatial coordinates 103 associated with the broadcast data (e.g., the emergency broadcast data 102) generated through the mobile device 504 of the verified user (e.g., the user 106 of FIG. 1 as described as the verified user in FIG. 7) of the emergency response server 100, A radial distribution module 140 may radially distribute the broadcast data (e.g., the emergency broadcast data 102) generated through the mobile device 504 through an on-page posting, an electronic communication, and/or a push notification delivered to desktop and/or mobile devices 504 associated with users and/or their user profiles around an epicenter 144 defined at the set of geospatial coordinates 103 associated with the broadcast data (e.g., the emergency broadcast data 102) generated through the mobile device 504 to all subscribed user profiles in a circular geo-fenced area defined by the threshold distance from the set of geospatial coordinates 103 associated with the broadcast data (e.g., the emergency broadcast data 102) generated through the mobile device 504 through the radial algorithm 240 of a emergency response network 150 that measures a distance away of each address associated with each user profile 402 from the current geospatial location at the epicenter 144. A placement module 232 may enable the verified user (e.g., the user 106 of FIG. 1 as described as the verified user in FIG. 7) to drag and/or drop the emergency alert pushpin on any location on the geospatial map, and/or automatically determining a latitude and/or a longitude associated a placed location.

A notification module 208 automatically notify a police department 309B, a fire department 309C, and/or a hospital 309D in a surrounding geospatial area to the set of geospatial coordinates 103 associated with the broadcast data (e.g., the emergency broadcast data 102) generated through the mobile device 504.

An emergency surveillance module 224 may monitor whenever the mobile device 504 associated with the verified user (e.g., the user 106 of FIG. 1 as described as the verified user in FIG. 7) is used to generate an emergency telephone call 1200. An emergency capture module 226 may capture an audio data 1202 associated with the emergency telephone call 1200 made through the mobile device 504. A transcript may be generated from a transcript 1204 of the audio data 1202 through a transcription module 260 of the emergency response server 100.

An auto-notification module 218 may automatically broadcast a notification of the emergency telephone call 1200, the audio data 1202 associated with the emergency telephone call 1200, and/or the transcript 1204 of the emergency telephone call 1200 through the on-page posting, the electronic communication, and/or the push notification delivered to desktop and/or mobile devices 504 associated with users and/or their user profiles around the epicenter 144 defined at the set of geospatial coordinates 103 associated with the broadcast data (e.g., the emergency broadcast data 102) generated through the mobile device 504 using the radial algorithm 240.

An extraction module 234 may separate the geospatial coordinates 103 from a metadata associated with the broadcast data (e.g., the emergency broadcast data 102) generated through the mobile device 504 when verifying that the set of geospatial coordinates 103 associated with the broadcast data (e.g., the emergency broadcast data 102) generated through the mobile device 504 are trusted based on the claimed geospatial location of the verified user (e.g., the user 106 of FIG. 1 as described as the verified user in FIG. 7) of the emergency response server 100.

A matching module 210 may determine a relative match between a persistent clock associated with the emergency response server 100 and/or a digital clock of the mobile device 504 to determine that the time stamp 510 associated with the creation date 508 and/or time of the broadcast data (e.g., the emergency broadcast data 102) generated through the mobile device 504 is accurate and/or therefore trusted. A deletion module 236 may automatically remove the broadcast data (e.g., the emergency broadcast data 102) generated through the mobile device 504 on a set of user profiles having associated verified addresses in the threshold radial distance 119 from the set of geospatial coordinates 103 associated with the broadcast data (e.g., the emergency broadcast data 102) generated through the mobile device 504 of the verified user (e.g., the user 106 of FIG. 1 as described as the verified user in FIG. 7) of the emergency response server 100 based on an emergency alert expiration time. A plotting module 238 may geocode a set of residential addresses each associated with a resident name in a neighborhood surrounding the mobile device 504.

A data-seeding module 241 may prepopulate the set of residential addresses each associated with the resident name as the set of user profiles in the threshold radial distance 119 from the claimed geospatial location of the verified user (e.g., the user 106 of FIG. 1 as described as the verified user in FIG. 7) of the emergency response server 100 in a neighborhood curation system (e.g., part of the geospatially constrained social network 142) communicatively coupled with the emergency response server 100. A modification module 242 may alter content in each of the set of user profiles. A discovery module 244 may track the modified content through the neighborhood curation system (e.g., part of the geospatially constrained social network 142).

An undo module 246 may generate a reversible history journal associated with each of the set of user profiles such that a modification of the verified user (e.g., the user 106 of FIG. 1 as described as the verified user in FIG. 7) can be undone on a modified user profile page. A reputation module 248 may determine an editing credibility of the verified user (e.g., the user 106 of FIG. 1 as described as the verified user in FIG. 7) based on an edit history of the verified user (e.g., the user 106 of FIG. 1 as described as the verified user in FIG. 7) and/or a community contribution validation of the verified user (e.g., the user 106 of FIG. 1 as described as the verified user in FIG. 7) by other users of the neighborhood curation system (e.g., part of the geospatially constrained social network 142).

A publishing module 214 may automatically publish the broadcast data (e.g., the emergency broadcast data 102) generated through the mobile device 504 to the set of user profiles having associated verified addresses in a threshold radial distance 119 from the claimed geospatial location of the verified user (e.g., the user 106 of FIG. 1 as described as the verified user in FIG. 7) of the emergency response server 100 using the radial algorithm 240. A claiming module 250 may process a claim request of the verified user (e.g., the user 106 of FIG. 1 as described as the verified user in FIG. 7) generating the broadcast data (e.g., the emergency broadcast data 102) generated through the mobile device 504 through the mobile device 504 to be associated with an address of the neighborhood curation system (e.g., part of the geospatially constrained social network 142). A private-neighborhood module 252 may determine if the claimable neighborhood in the neighborhood curation system (e.g., part of the geospatially constrained social network 142) is associated with a private neighborhood community in the claimable neighborhood of the neighborhood curation system (e.g., part of the geospatially constrained social network 142).

An association module 216 may associate the verified user (e.g., the user 106 of FIG. 1 as described as the verified user in FIG. 7) with the private neighborhood community in the claimable neighborhood of the neighborhood curation system (e.g., part of the geospatially constrained social network 142) if the private neighborhood community has been activated by the verified user (e.g., the user 106 of FIG. 1 as described as the verified user in FIG. 7) and/or a different verified user (e.g., the user 106 of FIG. 1 as described as the verified user in FIG. 7). A boundary module 254 may permit the verified user (e.g., the user 106 of FIG. 1 as described as the verified user in FIG. 7) to draw a set of boundary lines in a form of a geospatial polygon such that the claimable neighborhood in a geospatial region surrounding the claim request creates the private neighborhood community in the neighborhood curation system (e.g., part of the geospatially constrained social network 142) if the private neighborhood community is inactive. An address type module 256 may verify the claim request of the verified user (e.g., the user 106 of FIG. 1 as described as the verified user in FIG. 7) generating the broadcast data (e.g., the emergency broadcast data 102) generated through the mobile device 504 through the mobile device 504 to be associated with a neighborhood address of the neighborhood curation system (e.g., part of the geospatially constrained social network 142) when the address is determined to be associated with a work address and/or a residential address of the verified user (e.g., the user 106 of FIG. 1 as described as the verified user in FIG. 7).

A concurrency module 258 may simultaneously publish the broadcast data (e.g., the emergency broadcast data 102) generated through the mobile device 504 on the private neighborhood community associated with the verified user (e.g., the user 106 of FIG. 1 as described as the verified user in FIG. 7) generating the broadcast data (e.g., the emergency broadcast data 102) generated through the mobile device 504 through the mobile device 504 in the threshold radial distance 119 from the address associated with the claim request of the verified user (e.g., the user 106 of FIG. 1 as described as the verified user in FIG. 7) of the neighborhood curation system (e.g., part of the geospatially constrained social network 142) when automatically publishing the broadcast data (e.g., the emergency broadcast data 102) generated through the mobile device 504 on a set of user profiles having associated verified addresses in a threshold radial distance 119 from the claimed geospatial location of the verified user (e.g., the user 106 of FIG. 1 as described as the verified user in FIG. 7) of the emergency response server 100 based on a set of preferences of the verified user (e.g., the user 106 of FIG. 1 as described as the verified user in FIG. 7) using the radial algorithm 240.

A summary module 262 may generate a summary data 626 to the verified user (e.g., the user 106 of FIG. 1 as described as the verified user in FIG. 7) generating the broadcast data (e.g., the emergency broadcast data 102) generated through the mobile device 504 through the mobile device 504 of how many user profile pages were updated with an alert of the broadcast data (e.g., the emergency broadcast data 102) generated through the mobile device 504 when publishing the broadcast data (e.g., the emergency broadcast data 102) generated through the mobile device 504 in the private neighborhood community and/or the set of user profiles having associated verified addresses in the threshold radial distance 119 from the claimed geospatial location of the verified user (e.g., the user 106 of FIG. 1 as described as the verified user 706 in FIG. 7) of the emergency response server 100 based on the set of preferences of the verified user (e.g., the user 106 of FIG. 1 as described as the verified user 706 in FIG. 7).

A live broadcast module 228 may live broadcast the broadcast data (e.g., the emergency broadcast data 102) generated through the mobile device 504 to the different verified user (e.g., the user 106 of FIG. 1 as described as the verified user 706 in FIG. 7) and/or other verified users 706 the private neighborhood community and/or currently within the threshold radial distance 119 from the current geospatial location through a multicast algorithm 276 of the emergency response server 100 such that a live broadcast multicasts to a plurality of data processing systems associated with each of the different user and/or the other verified users 706 simultaneously when the mobile device 504 of the verified user (e.g., the user 106 of FIG. 1 as described as the verified user 706 in FIG. 7) generating the live-broadcast enables broadcasting of the broadcast data (e.g., the emergency broadcast data 102) generated through the mobile device 504 to any one of a geospatial vicinity around the mobile device 504 of the verified user (e.g., the user 106 of FIG. 1 as described as the verified user 706 in FIG. 7) generating the broadcast and/or in any private neighborhood community in which the verified user (e.g., the user 106 of FIG. 1 as described as the verified user 706 in FIG. 7) has a non-transitory connection.

A bi-directional communication module 230 may permit the different verified user (e.g., the user 106 of FIG. 1 as described as the verified user 706 in FIG. 7) and/or other verified users 706 in the private neighborhood community to bi-directionally communicate with the verified user (e.g., the user 106 of FIG. 1 as described as the verified user 706 in FIG. 7) generating the broadcast through the emergency response server 100. A non-transitory module 270 may determine any private neighborhood community in which the verified user (e.g., the user 106 of FIG. 1 as described as the verified user 706 in FIG. 7) has a non-transitory connection is a residential address of the verified user (e.g., the user 106 of FIG. 1 as described as the verified user 706 in FIG. 7) and/or a work address of the verified user (e.g., the user 106 of FIG. 1 as described as the verified user 706 in FIG. 7) that has been confirmed by the emergency response server 100 as being associated with the verified user (e.g., the user 106 of FIG. 1 as described as the verified user 706 in FIG. 7). A threshold module 268 may automatically set the threshold distance between 0.2 and/or 0.4 miles from the set of geospatial coordinates 103 associated with the broadcast data (e.g., the emergency broadcast data 102) generated through the mobile device 504 to optimize a relevancy of the live-broadcast.

A moderation module 264 may apply a crowdsourced moderation algorithm 204 in which multiple neighbors to a geospatial area determine what content contributed to the emergency response server 100 persists and/or which is deleted. A muting module 266 may permit users to mute messages of specific verified users 706 to prevent misuse of the emergency response server 100.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

Embodiments described herein in FIGS. 1-11 govern a new kind of social network for neighborhoods, according to one embodiment (e.g., may be private and/or wild-editable search engine based). It should be noted that in some embodiments, the address of an user may be masked from the public search (but still may be used for privacy considerations), according to one embodiment. Some embodiments have no preseeded data, whereas others might. Embodiments described herein may present rich, location specific information on individual residents and businesses.

A user can "Claim" one or more Business Pages and/or a Residential Pages, according to one embodiment. In order to secure their Claim, the user may verify their location associated with the Business Page and/or Residential page within 30 days, or the page becomes released to the community, according to one embodiment. A user can only have a maximum of 3 unverified Claims out at any given time, according to one embodiment. When a user clicks on "Claim this Page" on Business Profile page and/or a Residential Profile page, they can indicate the manner in which they intend to verify their claim, according to one embodiment. Benefits of Claiming a Business Page and/or Residential page may enable the user to mark their page 'Self-Editable only' from the default 'Fully Editable' status, and see "Private" listings in a claimed neighborhood around the verified location, according to one embodiment. Each edit by a user on a Residential Profile page and/or a Business Profile page may be made visible on the profile page, along with a date stamp, according to one embodiment.

Browse function: Based on the user's current location, the browse function may display a local map populated with pushpins for location-specific information, and a news feed, made up of business page edits, public people page edits, any recent broadcasts, etc., according to one embodiment. The news feed may show up on each Business Page and each Residential Page, based on activity in the surrounding area, according to one embodiment. Secure a Neighborhood function: May allow the user to identify and "secure" a neighborhood, restricting certain types of access to verified residents, according to one embodiment. Add a Pushpin function: May allow any registered or verified user to add any type of Pushpin (as described in FIG. 8), to one embodiment.

In addition to the map, the search results page may display a news feed, made up of business page edits, public people page edits, any recent broadcasts, and autogenerated alerts who has moved into the neighborhood, who has moved out of the neighborhood, any recent reviews in the neighborhood, any pushpins placed in the immediate area, etc., according to one embodiment. The news feed may prioritize entries relating to the search results, and will take into account privacy policies and preferences, according to one embodiment.

Example Newsfeeds may include:

Joe Smith moved into the neighborhood in September 2013. Welcome Joe! Like Share; 43 neighbors (hyperlink) moved in to the Cupertino library neighborhood in July 2013. Like Share; 12 neighbors (hyperlink) verified in to the Cupertino library neighborhood in July 2013. Like Share; Raj Abhyanker, invited Paul Smith, a guest to the Cupertino neighborhood. Raj indicates Paul is a friend from college looking to move into the neighborhood. Welcome Paul!: Raj Abhyanker posted a Nissan Leaf for rent $35 a day, in mountain view Rent now. Like Share This content may feed each Profile Page and helps to increase Search Engine value for content on the site, according to one embodiment. Alerts may be created and curated (prioritized, filtered) automatically and/or through crowdsourcing, to keep each page vibrant and actively updating on a regular basis (ideally once a day or more), according to one embodiment.

A Multi-Family Residence page will display a list of residents in the entire building, according to one embodiment. Clicking on any resident will display a Single Family Residence page corresponding to the individual living unit where that person resides, according to one embodiment.

For example, suppose that John Smith and Jane Smith live in apartment 12 of a large building. Their names are included in the list of residents. When a user clicks on either John Smith or Jane Smith, we will display a "Single Family Residence" page showing both John and Jane, just as if apartment 12 was a separate structure, according to one embodiment.

The broadcast feature (e.g., associated with the emergency broadcast data 102 and generated by the radial algorithm 240 of the radial distribution module 140) may be a "Radio" like function that uses the mobile device's current geospatial location to send out information to neighbors around the present geospatial location of the user, according to one embodiment. Broadcasts may be posted to neighbor pages in the geospatial vicinity (e.g., in the same neighborhood) on public and private pages in the geospatial social network, according to one embodiment. These broadcasts may enable any user, whether they live in a neighborhood or not to communicate their thoughts to those that live or work (or have claimed) a profile in the neighborhood around where the broadcaster is physically at, regardless of where the broadcaster lives, according to one embodiment. Broadcasts can be audio, video, pictures, and or text, according to one embodiment. For accountability, the broadcaster may be a verified user and their identity made public to all users who receive the broadcast in one embodiment.

This means that the broadcast feature may be restricted to be used only by devices (e.g., mobile phones) that have a GPS chip (or other geolocation device) that an identify a present location of where the broadcast is originating from, according to one embodiment. The broadcast may be sent to all users who have claimed a profile in the geo spatial vicinity where the broadcast originates, according to one embodiment. This can either be broadcast live to whoever is "tuned" in to a broadcast of video, audio, picture, and text in their neighborhood, or can be posted on each users profile if they do not hear the broadcast to the neighborhood in a live mode in one embodiment.

When a broadcast is made neighbors, around where the broadcast is made, they may receive a message that says something like:

Raj Abhyanker, a user in Menlo Park just broadcast "Japanese cultural program" video from the Cupertino Union church just now. Watch, Listen, View This broadcast may be shared with neighbors around Menlo park, and or in Cupertino. This way, Raj's neighbors and those in Cupertino can know what is happening in their neighborhoods, according to one embodiment. In one embodiment, the broadcast only goes to one area (Cupertino or Menlo park in the example above).

Broadcasts could be constrained to devices that have geospatial accuracy of present location and a current only (mobile devices for example). Otherwise, broadcasts won't mean much, according to one embodiment (would otherwise be just like thoughts/video upload without this). Broadcasts shouldn't be confused with 'upload videos', according to one embodiment. Different concepts. Why? Broadcasts have an accuracy of time and location that cannot be altered by a user, according to one embodiment, Hence, mobile is the most likely medium for this not desktop computer, according to one embodiment. We should not let the user set their own location for broadcasts (like other pushpin types), according to one embodiment. Also time is fixed, according to one embodiment. Fixing and not making these two variables editable give users confidence that the broadcast was associated with a particular time and place, and creates a very unique feature, according to one embodiment. For example, it would be not useful if the broadcast is untrusted as to location of origination, according to one embodiment. E.g., I broadcast when I am somewhere only about the location I am at, according to one embodiment.

Broadcasts are different that other pushpins because location of where a broadcast, and time of broadcast is

*current location* and *current time*, according to one embodiment. They are initiated wherever a broadcaster is presently at, and added to the news feed in the broadcasters neighborhood and in the area wherever a broadcaster is presently at, according to one embodiment.

Broadcast rules may include:

1. If I post a Broadcast in my secured neighborhood, only my neighbors can see it, according to one embodiment.

2. If I post a Broadcast in different secured neighborhood then my own, my neighbors can see it (e.g., unless I turn this off in my privacy setting) and neighbors in the secured neighborhood can see it (e.g., default not turn-offable, but I can delete my broadcast), according to one embodiment.

3. If I post a Broadcast in different unsecured neighborhood then my own, my neighbors can see it (unless I turn this off in my privacy setting) and the broadcast is publicly visible on user pages of public user profiles in the unsecured neighborhood until profiles are claimed and/or the neighborhood is secured, according to one embodiment.

4. If an outsider in a secure neighborhood posts a broadcast in my secure neighborhood, it's not public, according to one embodiment.

5. If an outsider in a unsecure neighborhood posts a broadcast in my secure neighborhood, the system does not post on profiles in his unsecure neighborhood (to prevent stalking, burglary), but does post in my secure neighborhood, according to one embodiment.

Privacy settings. For each verified residential or business location, the user may set Privacy to Default, Public, Private, or Inactive, according to one embodiment. The Default setting (which is the default) means that the profile will be public, until the neighborhood is secured; in a secured neighborhood, the profile will be Private, according to one embodiment. By changing this setting, the user may force the profile to be Public or Private, regardless of whether the neighborhood is secured, according to one embodiment.

For each verified residential location, the user may set edit access to Group Editable or Self Editable, according to one embodiment.

Residential Privacy example. The residential profiles can be: Public: anyone can search, browse, or view the user profile, according to one embodiment. This is the default setting for unsecured neighborhoods (initially, all the content on the site), according to one embodiment. Private: only people in my neighborhood can search, browse, or view the user's profile, according to one embodiment. This is the default for secured neighborhoods, according to one embodiment. Inactive: nobody can search, browse, or view the profile, even within a secured neighborhood, according to one embodiment. A user may have at least one active (public or private), verified profile in order to have edit capabilities, according to one embodiment; if the user makes all profiles inactive, that user is treated (for edit purposes) as an unverified user, according to one embodiment.

Verified users can edit the privacy setting for their profile and override the default, according to one embodiment. Group Editable: anyone with access to a profile based on the privacy roles above can edit the profile, according to one embodiment. This is the default setting, according to one embodiment Self Editable, only the verified owner of a profile can edit that profile, according to one embodiment.

Exceptions Guest User. A verified user in another neighborhood is given "Guest" access to a neighborhood for a maximum of 60 days by a verified user in the neighborhood in which the guest access is given, according to one embodiment. In effect, the guest becomes a member of the neighborhood for a limited period, according to one embodiment. Friend. When a user has self-elected being friends with someone in a different neighborhood, they can view each other's profiles only (not their neighbors), according to one embodiment. One way for a user to verify a location is to submit a scanned utility bill, according to one embodiment.

When a moderator selects the Verify Utility Bills function, the screen will display a list of items for processing, according to one embodiment. Accept the utility bill as a means of verification, according to one embodiment. This will verify the user's location, and will also generate an e-mail to the user, according to one embodiment. Or Decline the utility bill as a means of verification, according to one embodiment. There will be a drop-down list to allow the moderator to select a reason, according to one embodiment; this reason will be included in an e-mail message to the user. Reasons may include: Name does not match, address does not match, name/address can't be read, not a valid utility bill, according to one embodiment.

An example embodiment will now be described. A person confronted with an emergency situation (e.g. the user 106, the verified user 706) may send a broadcast on a geospatially constrained social network (e.g. Fatdoor.com, Nextdoor.com). To accomplish this broadcast the person may generate the broadcast data 102 which will be sent to the emergency response server 100 to generate the notification data 112. The notification data 112 may include any information contained in the broadcast data 102 such as the geospatial location, time, date, a textual description and live broadcast of audio and/or video generated by the user 106. The notification data 112 may then be radially distributed in the area with a threshold radial distance 119 of the epicenter 144 that may be the location of the device observing the emergency. The person may be hoping for immediate assistance from other people living nearby (e.g. the recipients 114) to help confront the emergency situation. Rather than attempt to contact those living nearby individually, the person experiencing the emergency may broadcast the notification 112 to proximate neighbors simultaneously, maximizing the chance that a relevant person will appreciate, view and/or respond to the broadcast.

Additionally, for example, the broadcast may even occur automatically upon the dialing of emergency services 109 as to allow concurrent notification of nearby recipients 114 without detracting from a conventional mode of contacting emergency services (e.g. the emergency call 1200). The emergency call 1200 may be monitored by the emergency response server 100 to automatically generate the emergency broadcast data 102, including live audio of the call which the emergency response server 100 may use to create a transcript 1204. The transcript 1204, along with metadata from the call that may include the geo spatial location of the mobile device on which the call was made may then be broadcast according to the radial distribution module 140 to nearby recipients 114. The recipients 114 may then be notified of the emergency situation and/or prompted to respond without detracting from a call to the emergency services 109.

For example, in an elementary school setting (e.g., the threshold radial distance 119 may be set to a boundaries of the elementary school using the radial algorithm 240 of the radial distribution module 140). A principal of the Sacred Brooks Elementary School Mr. Higgins may hear gunshots that he believes are coming from an on-campus location. Screams of panicked teachers and children may soon follow. Mr. Higgins may use his mobile device (e.g., his cellular phone) to call an emergency number '911'. Calling this emergency number '911' may also trigger an automatic alert to the geo-spatially constrained social network 142 to generate the emergency broadcast data 102 (or alternatively Mr. Higgins may separately send an emergency broadcast using the Fatdoor mobile application). All teachers at the school and parents in adjacent neighborhoods may be instantly notified (e.g., through the creation of the emergency broadcast data 102 distributed as the notification data 112).

Wilson Brighton at the Fatdoor Emergency Center may receive a message that there is an emergency at the Sacred Brooks Elementary school. Wilson Brighton may open up a communication channel with Mr. Brighton and invite adjacent neighborhoods and medical professionals having claimed profiles and/or living in the area to help. In addition, Wilson may merge the emergency transmissions into a single session so that Mr. Higgins initial emergency broadcast is automatically merged with related other broadcasts by teachers, parents, staff, and children at the school. This single thread of broadcasts related to the Sacred Brooks Elementary school may be provided as live-feed emergency broadcasts to all users of Fatdoor.com having a claimed profile (e.g., a home address and/or a work address) within the threshold radial distance from Mr. Higgins (e.g., the epicenter of the broadcast). Even when parents are at work, they may still receive the broadcast live on their mobile devices because they have downloaded the Fatdoor application and have claimed their home/business address around a location of the emergency.

As a result, local neighborhood parents may arrive from their work locations, even when they work at a different location than where they live. This may save lives at the Sacred Brooks elementary school because help may arrive sooner.

For example, one recipient of Mr. Higgin's broadcast may be Samuel Wilson ("Sam"), who has two children at Sacred Brooks Elementary School: John, a bright kindergartener 6, and Samantha, a talented artist of age 10. Sam may be alerted even when he is at work on a construction site 6 miles away from the Sacred Brooks Elementary School where John and Samatha are located. Sam may receive an alert on his mobile phone that there is an emergency in his neighborhood. Jumping into his truck, Sam may drive to the school to render assistance, tuning in to the live broadcast as events unfold. Others may join in and as well and communicate and provide instructions and reassurance to Mr. Higgins and other broadcasters.

Nearby resident Chen Su, whose backyard fence adjoins the playground of Sacred Brooks, may also receive the broadcast. Chen may run outside and unlock his gate, opening it so that children may not be trapped in the playground area. Chen may then send a separate broadcast a new escape route has been established. Mr. Higgins may gather as many nearby children as he can and lead them safety through Chen's gate.

Henry Stewart, a decorated army veteran who lives a few blocks away from Sacred Brooks Elementary, may also receive the broadcast. Alarmed for the safety of the children, and knowing that it may take the police several minutes to arrive at the school, Henry may decide that it will maximize the children chance at survival if he is the first responder. Equipping his .22 caliber rifle, he may run to the school and distract or defeat the shooter in time to save many lives.

Similarly, Dr. Juan Sanchez, M.D. may have an office in the neighborhood immediately adjacent to Sacred Brooks. Dr. Sanchez and his team of medical professionals may rush to the scene, engaging in bi-directional communications with the school staff during the live broadcast event so that he knows exactly which building to arrive at. Calming victims and putting pressure on wounds until ambulances arrive, Dr. Sanchez and his team may save the lives of wounded children.

When the incident is over, many people may want to recreate the events for journalistic or evidentiary purposes. They may also want to study generally the flow of information during emergencies in their neighborhood, and decide how their school could better prepare. Similarly, they may want to ensure they are part of the broadcast system in cast there are future incidents. Persons who have not yet claimed their verified profiles in the area surrounding Sacred Brooks Elementary School on Fatdoor may go online and find profiles pre-seeded with data associated with their address. Those pre-seeded profiles may have been updated with local broadcasts. These people may be able to claim their profile and have access to previous broadcasts, including those associated with the school shootings. This may help them to better prepare for the safety of their children.

Because of the technologies described herein, the neighborhood, city, and country is a better place because emergency response teams are supplemented with information from those who have a claimed geo-spatial location around a neighborhood in which there is trouble. In addition, evidence may be formed that is admissible to prove guilt of the gunmen, defeat a defense of insanity, or impose a maximum sentence.

In another example, a user Bob Jones may be walking around Menlo Park, Calif. when he observes a robber pull out a knife and threaten to harm Paula Nelson in a parking lot if she does not give the robber her car keys. Bob may take out his mobile device and select the emergency listing criteria "major violent crime" in the user interface of the mobile application that communicates with the emergency response server. Bob may center his viewfinder on the unfolding robbery and select the "broadcast live" indicator on the user interface, as well as entering the brief description "Car jacking in progress" in a small data field. The broadcast data, including live video and audio, may be generated and sent to the emergency response server where it may be radially distributed to user profiles at a threshold radial distance from the epicenter centered on Bob's mobile device. Because Bob specified the emergency as a "major violent crime" its threshold radial distance may be larger than if Bob had selected mere "vandalism."

To further illustrate, several relevant parties may receive the broadcast. Patrick Sloan, an off-duty police detective, is alerted to Bob Jones' broadcast data by a notification sent to his mobile device. Patrick, looks his mobile device to read Bob's brief description, and notices that the event is only "0.3 miles away." Patrick selects the "respond indicator" to let Bob know he is on his way, and also selects "dial broadcaster" to establish a bi-directional communication with Bob. A map on Patrick's mobile device and a set of directions may show Patrick the fastest way to travel to the epicenter, along with warning Patrick when he is within 100 yards of the emergency.

Jason Steinbrenner, a retired surgeon, also receives Bob's broadcast. Jason opts to view Bob's live video feed. Jason notices that the robber severely lacerates Paula with his knife as he grabs Paula's keys away. Jason sees that he is only 0.7 miles away from the emergency and also selects the "respond indicator" to let Bob know he will arrive shortly. Through his user interface he sends Bob a text message "I'm a doctor."

Jane Doe, a resident living within the threshold radial distance also receives Bob's broadcast. Jane, while viewing Bob's live feed, takes note of the vehicle make, model and color. As the robber gets in Paula's car and drives away, out of Bob's view, Jane goes to her apartment window and looks outside. A minute later, Jane sees the woman's car, driven by the robber, headed down her street, trying to keep a low profile. Jane generates her own broadcast including a video feed of the car stopped at a stoplight. Patrick Sloan, driving his car to reach Bob's location, receives Jane's broadcast. Patrick, now using Jane's epicenter, redirects his path to intercept the robber. Using Jane's live video broadcast to remotely view the intersection, Patrick is able to safely approach the robber from behind and surprise him at the stoplight, capturing him.

Emergency services, which may subscribe to all emergency broadcasts within the threshold radial distance of the epicenter, may also have been notified. The police department and an ambulance arrive after Patrick catches the robber and Jason stabilizes the woman.

Bob and Jane may receive a summary of their broadcast data that shows them how many recipients received his broadcast, the emergency services contacted, and who was responding. Their broadcast submissions may also include a unique identifies such that the live video, recorded by the emergency response server, which may be later retrieved to provide evidence against the robber with a unique identification code.

Because of the emergency response sever described in FIGS. 1-11, Jason was able to arrive on the scene faster than emergency services, putting pressure on Paula's wound to prevent detrimental bleeding. The broadcast system also allowed Patrick to catch the perpetrator both because he was a concerned local resident and because other nearby residents, such as Jane, were alerted by Bob's original broadcast and were therefore prepared to provide additional helpful broadcasts.

Bob and Jane may live in the Lorelei neighborhood of Menlo Park, and for this reason receive the emergency broadcast data. If Bob creates an emergency broadcast, Bob may choose to restrict dissemination of his emergency broadcast just to the Lorelei neighborhood because it is an 'active' neighborhood around where Bob lives. Particularly, a minimum number of Bob's neighbors in the Lorelei neighborhood, such as 10 neighbors in the Lorelei neighborhood, may have signed up and verified their profiles through an online neighborhood social network (e.g., Fatdoor.com). If Bob is the first user that creates a private network for his neighborhood (e.g., a 'founding member'), he may need to draw geospatial boundaries and/or claim geospatial boundaries around his neighborhood and invite a threshold number of neighbors (e.g., 10 neighbors) to activate it. An amount of time for Bob to invite and activate his neighborhood may be limited (e.g., 21 days). However, Bob may request an extension of time from the geospatially constrained social network 142 if Bob needs more time to invite users, and the geospatially constrained social network 142 may grant this extra time. In other words, if Bob is a founding member, he may have the ability to define the neighborhood boundary and choose the neighborhood name.

The geo-spatially constrained social network 142 may internally make corrections to either the boundaries or name that Bob set based on feedback from other neighbors and/or based on internal policies. These internal policies may include a preference for a use of official names for a community (e.g., based on local thoroughfares, a nearby park, or landmark for inspiration), a neighborhood name that is short and sweet (e.g., eliminating unnecessary words like city, state, neighbors, neighborhood, HOA, friends, etc.), with correct capitalization (e.g., to ensure that a first letter of each word is capitalized), and/or use of spaces between each word in a neighborhood name. In one embodiment, Bob may designate neighborhood 'leads' who can adjust boundaries of their neighborhood through an adjust boundaries tool. Bob may be part of an elite group of neighborhood 'leads' who keep the geospatially constrained social network 142 operating smoothly by organizing information and posting neighborhood-wide information. The neighborhood leads like Bob may have special privileges such as removing inappropriate messages, adjusting neighborhood boundaries, verifying unverified members, editing the about section on a neighborhood feed, and/or promoting other members to become neighborhood leads.

Bob and his neighbors may have each verified their addresses through a postcard verification system in which they received a postcard at their home with an access code that permits each of them to access their private Lorelei neighborhood community information including emergency broadcast alerts in the online neighborhood social network (e.g., the Fatmail postcard system through which an access code may have been received at a respective Lorelei home that uniquely identifies and verifies a home in the Lorelei neighborhood). Bob may have invited a threshold number (e.g., 10) of his Lorelei neighbors prior to the Lorelei neighborhood becoming active. Bob may choose to disseminate his emergency broadcast data to a neighborhood adjacent to Lorelei, such as Menlo Park downtown (e.g., using the radial algorithm 240 of the radial distribution module 140). Optionally, Bob may choose to restrict his emergency broadcast data just to Lorelei neighbors (e.g., using the radial algorithm 240 of the radial distribution module 140). In other words, users of the neighborhood social network in an entirely different neighborhood, such as the Financial District neighborhood of San Francisco (about 20 miles away) may not be able to access the emergency broadcast data that Bob generates.

For example, the emergency broadcast data may be disseminated to adjacent neighborhoods that have been claimed by different users in a manner such that the emergency broadcast data is optionally disseminated to the surrounding claimed neighborhoods based on Bob's preference.

It will be understood with those skill in the art that in some embodiments, the radial distribution module 140 may restrict dissemination of broadcast data by verified users to claimed neighborhoods in a private neighborhood social network (e.g. the geospatially constrained social network 142 may be a private social network, the neighborhood curation system described herein may also be part of the private neighborhood social network) in which the broadcaster resides (e.g., has a home) using the radial algorithm 140. The geo-spatially constrained social network 142 may include online communities designed to easily create private websites to facilitate communication among neighbors and build stronger neighborhoods (e.g., to help neighbors build stronger and safer neighborhoods).

Further, it follows that the threshold radial distance 119 may take on a variety of shapes other than purely circular and is defined to encompass a variety of shapes based on associated geographic, historical, political and/or cultural connotations of associated boundaries of neighborhoods and/or as defined by a city, municipality, government, and/or data provider (e.g., Maponics®, Urban Mapping®), in one embodiment. For example, the threshold radial distance 119 may be based on a particular context, such as a school boundary, a neighborhood boundary, a college campus boundary, a subdivision boundary, a parcel boundary, and/or a zip code boundary.

In an alternative embodiment, the threshold radial distance 119 generated by the geospatially constrained social network 142 may be restricted to a shared apartment building (e.g., and/or an office building). In addition, it will be understood with those skilled in the art that the emergency response server 100 may be operate as a function of the geo-spatially constrained social network 142 (e.g., a neighborhood social network).

In addition, it will be understood that in some embodiments, the emergency broadcast data 102 is generated by the police department 309C (e.g., and/or others of the emergency services 109) in the form of crime alerts, health alerts, fire alerts, and other emergency alerts and provided as a feed (e.g., a Real Simple Syndication (RSS) feed) to the geo-spatially constrained social network 142 for distribution to relevant ones of the claimed neighborhoods in the geo-spatially constrained social network 142. It will be understood that the emergency broadcast data 102 may appear in a 'feed' provided to users of the geo-spatially constrained social network 142 (e.g., a private social network for neighbors) on their profile pages based on access control privileges set by the radial broadcast module 140 using the radial algorithm 240. For example, access to the emergency broadcast data 102 may be limited to just a claimed neighborhood (e.g., as defined by neighborhood boundaries) and/or optionally adjacent neighborhoods.

In one embodiment, the geo-spatially constrained social network 142 may provide police departments and other municipal agencies with a separate login in which they can invite neighbors themselves, provide for a virtual neighborhood watch and emergency preparedness groups, and conduct high value crime and safety related discussions from local police and fire officials without requiring any technical integration. This may provide police departments and municipalities with a single channel to easily broadcast information across neighborhoods that they manage, and receive and track neighborhood level membership and activity to identify leaders of a neighborhood.

For example, communications defined from one broadcasting user to an adjacent neighborhood o may involve sharing information about a suspicious activity that might affect several neighborhoods, explaining about a lost pet that might have wandered into an adjoining neighborhood, to rally support from neighbors from multiple neighborhoods to address civic issues, to spread the word about events like local theater production or neighborhood garage sales, and/or to ask for advice or recommendations from the widest range of people in a community). In one embodiment, the geospatially constrained social network 142 may prevent self-promotional messages that are inappropriate (e.g., a user sending such messages may be suspended from the geospatially constrained social network using the crowd sourced moderation algorithm 204. In one embodiment, the user 106 may personalize nearby neighborhoods so that the user can choose exactly which nearby neighborhoods (if any) they wish to communicate with. The user 106 may be able to flag a neighborhood feeds from adjacent neighborhoods. In addition, leaders from a particular neighborhood may be able to communicate privately with leaders of an adjoining neighborhood to plan and organize on behalf of an entire constituency. Similarly, users 106 may be able to filter feeds to only display messages from the neighborhood that they reside in. The user 106 may be able to restrict posts (e.g., pushpin placements) only in the neighborhood they are presently in. In one embodiment, nearby neighbors may (or may not) be able to access profiles of adjacent neighborhoods.

It will also be understood that in some embodiments, that users may be 'verified through alternate means, for example through a utility bill verification (e.g., to verify that a user's address on a utility bill matches the residential address they seek to claim), a credit card verification (e.g., or debit card verification), a phone number verification (e.g., reverse phone number lookup), a privately-published access code (e.g., distributed to a neighborhood association president, and/or distributed at a neighborhood gathering), and a neighbor vouching method (e.g., in which an existing verified neighbor 'vouches' for a new neighbor as being someone that they personally know to be living in a neighborhood.

In one embodiment, the geospatially constrained social network 142 ensures a secure and trusted environment for a neighborhood website by requiring all members to verify their address. In this embodiment, verification may provide assurance the assurance that new members are indeed residing at the address they provided when registering for an account in the geo-spatially constrained social network 142. Once a neighborhood has launched out of pilot status, only members who have verified their address may be able access to their neighborhood website content.

It will be understood that among the various ways of verifying an address, a user of the geo-spatially constrained social network 142 may uses the following methods to verify the address of every member:

A. Postcard. The geo-spatially constrained social network 142 can send a postcard to the address listed on an account of the user 106 with a unique code printed on it (e.g., using the Fatmail postcard campaign). The code may allow the user 106 to log in and verify their account.

B. Credit or debit card. The geo-spatially constrained social network 142 may be able to verify a home address through a credit or debit card billing address. In one embodiment, billing address may be confirmed without storing personally identifiable information and/or charging a credit card.

C. Home phone. If a user 106 has a landline phone, the user may receive an automated phone call from the geo-spatially constrained social network 142 that may provide with a unique code to verify an account of the user 106.

D. Neighborhood leader. A neighborhood leader of the geo-spatially constrained social network can use a verify neighbors feature of the geo-spatially constrained social network 142 to vouch for and verify neighbors.

E. Mobile phone. A user 106 may receive a call to a mobile phone associated with the user 106 to verify their account.

F. Neighbor invitations. A neighbor who is a verified member of the geo-spatially constrained social network 142 can vouch for, and may invite another neighbor to join the geo-spatially constrained social network 142. Accepting such an invitation may allow the user 106 to join the geo-spatially constrained social network 142 as a verified member, according to one embodiment.

H. Social Security Number (SSN). The geo-spatially constrained social network 142 can verify a home address when the user 106 provides the last 4 digits of a SSN (e.g., not stored by the geospatially constrained social network 142 for privacy reasons).

It will be also understood that in a preferred embodiment neighborhood boundaries defined by the radial distribution module 140 using the radial algorithm 140 may be constrained to work in neighborhoods having a threshold number of homes (e.g., 100 homes in a neighborhood) and more (e.g., up to thousands of homes) as this may be needed to reach the critical mass of active posters that is needed to help the geo-spatially constrained social network 142 succeed. In one embodiment, 'groups' may be creatable in smaller neighborhoods having fewer than the threshold number of homes for communications in micro-communities within a claimed neighborhood.

It will also be appreciated that in some embodiments, a mobile device 104 may be a desktop computer, a laptop computer, and/or a non-transitory broadcasting module. In addition, it will be understood that the prepopulated data (e.g., preseeded data) described herein may not be created through data licensed from others, but rather may be user generated content of organically created profiles in the geospatial social network created by different users who have each verified their profiles.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:

1. A method of an emergency response server comprising:
validating that an emergency broadcast data generated through a mobile device is associated with a verified user of the emergency response server using a processor and a memory;
verifying that a set of geospatial coordinates associated with the emergency broadcast data generated through the mobile device are trusted based on a claimed geospatial location of the verified user of the emergency response server;
determining that a time stamp associated with a creation date and a creation time of the emergency broadcast data generated through the mobile device is trusted based on the claimed geospatial location of the verified user of the emergency response server; and
automatically publishing the emergency broadcast data generated through the mobile device on a set of user profiles having associated verified addresses in a threshold distance from the set of geospatial coordinates associated with the emergency broadcast data generated through the mobile device of the verified user of the emergency response server using an algorithm, wherein the emergency response server to optionally verify the emergency broadcast data through a performance, by any one of the emergency response server and a police department, of elective operations comprising at least one of:
to monitor when the mobile device associated with the verified user is used to generate an emergency telephone call,
to capture an audio data associated with the emergency telephone call through the mobile device through an emergency capture algorithm of the emergency response server,
to generate a transcript of the audio data through a transcription algorithm of the emergency response server,
to automatically broadcast at least one of a notification of the emergency telephone call, the audio data associated with the emergency telephone call, a summary posting of a crime event, and the transcript of the emergency telephone call through at least one of an on-page posting, an electronic communication, and a push notification delivered to desktop and mobile devices associated with users and their user profiles around an epicenter defined at the set of geospatial coordinates associated with the emergency broadcast data generated through the mobile device using the algorithm, and
to extract the geospatial coordinates from a metadata associated with the emergency broadcast data generated through the mobile device when verifying that the set of geospatial coordinates associated with the emergency broadcast data generated through the mobile device are trusted based on the claimed geospatial location of the verified user of the emergency response server;
determining a relative match between a persistent clock associated with the emergency response server and a digital clock of the mobile device to determine that the time stamp associated with the creation date and time of the emergency broadcast data generated through the mobile device is accurate and therefore trusted; and
automatically deleting of the emergency broadcast data generated through the mobile device on a set of user profiles having associated verified addresses in the threshold radial distance from the set of geospatial coordinates associated with the emergency broadcast data generated through the mobile device of the verified user of the emergency response server based on an emergency alert expiration time.

2. The method of claim 1 further comprising:
determining that the emergency broadcast data is generated by the verified user of the emergency response server when validating that the emergency broadcast data is associated with the mobile device;
determining that an application on the mobile device is communicating the emergency broadcast data to an emergency response network when the emergency broadcast data is processed;
associating the verified user with a verified user profile in the emergency response network through the application on the mobile device; and
presenting the emergency broadcast data generated through the mobile device as an emergency alert pushpin of the emergency broadcast data in a geospatial map surrounding pre-populated residential and business listings in a surrounding vicinity, such that the emergency alert pushpin of the emergency broadcast data is automatically presented on the geospatial map in addition to being presented on the set of user profiles having associated verified addresses in the threshold distance from the set of geospatial coordinates associated with the emergency broadcast data generated through the mobile device of the verified user of the emergency response server,
wherein the emergency broadcast data generated through the mobile device is distributed through at least one of an on-page posting, an electronic communication, and a push notification delivered to desktop and mobile devices associated with users and their user profiles around the epicenter defined at the set of geospatial coordinates associated with the emergency broadcast data generated through the mobile device to all subscribed user profiles in a circular geo-fenced area defined by the threshold distance from the set of geospatial coordinates associated with the emergency broadcast data generated through the mobile device through the algorithm of the emergency response network that measures a distance away of each address associated with each user profile from the current geospatial location at the epicenter.

3. The method of claim 2 further comprising:
permitting the verified user to drag and drop the emergency alert pushpin on any location on the geospatial map, and automatically determining a latitude and a longitude associated with a placed location; and
automatically notifying at least one of a police department, a fire department, and a hospital in a surrounding geospatial area to the set of geospatial coordinates associated with the emergency broadcast data generated through the mobile device.

4. The method of claim 1 further comprising:
geocoding a set of residential addresses each associated with a resident name in a neighborhood surrounding the mobile device; and prepopulating the set of residential addresses each associated with the resident name as the set of user profiles in the threshold distance from the claimed geospatial location of the verified user of the emergency response server in a neighborhood curation system communicatively coupled with the emergency response server.

5. The method of claim 4 further comprising:

permitting the verified user to modify content in each of the set of user profiles;

tracking the modified content through the neighborhood curation system;

generating a reversible history journal associated with each of the set of user profiles such that a modification of the verified user can be undone on a modified user profile page;

determining an editing credibility of the verified user based on an edit history of the verified user and a community contribution validation of the verified user by other users of the neighborhood curation system; and automatically publishing the emergency broadcast data generated through the mobile device to the set of user profiles having associated verified addresses in the threshold distance from the claimed geospatial location of the verified user of the emergency response server using the algorithm.

6. The method of claim 5 further comprising:

processing a claim request of the verified user generating the emergency broadcast data generated through the mobile device through the mobile device to be associated with an address of the neighborhood curation system;

determining if a claimable neighborhood in the neighborhood curation system is associated with a private neighborhood community in the claimable neighborhood of the neighborhood curation system;

associating the verified user with the private neighborhood community in the claimable neighborhood of the neighborhood curation system if the private neighborhood community has been activated by at least one of the verified user and a different verified user;

permitting the verified user to draw a set of boundary lines in a form of a geospatial polygon such that the claimable neighborhood in a geospatial region surrounding the claim request creates the private neighborhood community in the neighborhood curation system if the private neighborhood community is inactive;

verifying the claim request of the verified user generating the emergency broadcast data generated through the mobile device through the mobile device to be associated with a neighborhood address of the neighborhood curation system when the address is determined to be associated with at least one of a work address and a residential address of the verified user; and simultaneously publishing the emergency broadcast data generated through the mobile device on the private neighborhood community associated with the verified user generating the emergency broadcast data generated through the mobile device through the mobile device in the threshold distance from the address associated with the claim request of the verified user of the neighborhood curation system when automatically publishing the emergency broadcast data generated through the mobile device on a set of user profiles having associated verified addresses in the threshold distance from the claimed geospatial location of the verified user of the emergency response server based on a set of preferences of the verified user using the radial algorithm.

7. The method of claim 6 further comprising:

providing a summary data to the verified user generating the emergency broadcast data generated through the mobile device through the mobile device of how many user profile pages were updated with an alert of the emergency broadcast data generated through the mobile device when publishing the emergency broadcast data generated through the mobile device in at least one of the private neighborhood community and the set of user profiles having associated verified addresses in the threshold distance from the claimed geospatial location of the verified user of the emergency response server based on the set of preferences of the verified user.

8. The method of claim 7 further comprising:

live broadcasting the emergency broadcast data generated through the mobile device to the different verified user and other verified users in at least one of the private neighborhood community and currently within the threshold distance from the current geospatial location through a multicast algorithm of the emergency response server such that a live broadcast multicasts to a plurality of data processing systems associated with each of the different user and the other verified users simultaneously when the mobile device of the verified user generating the live-broadcast enables broadcasting of the emergency broadcast data generated through the mobile device to any one of a geospatial vicinity around the mobile device of the verified user generating the broadcast and in any private neighborhood community in which the verified user has a non-transitory connection; and permitting the different verified user and other verified users in at least one of the private neighborhood community to bi-directionally communicate with the verified user generating the broadcast through the emergency response server, wherein any private neighborhood community in which the verified user has the non-transitory connection is at least one of the residential address of the verified user and a work address of the verified user that has been confirmed by the emergency response server as being associated with the verified user, wherein the threshold distance is between 0.2 and 0.4 miles from the set of geospatial coordinates associated with the emergency broadcast data generated through the mobile device to optimize a relevancy of the live-broadcast, wherein the emergency response server includes a crowd-sourced moderation algorithm in which multiple neighbors to a geospatial area determine what content contributed to the emergency response server persists and which is deleted, wherein the emergency response server permits users to mute messages of specific verified users to prevent misuse of the emergency response server, wherein the emergency response server permits the emergency broadcast data to be disseminated to adjacent neighborhoods that have been claimed by different users in a manner such that the emergency broadcast data is optionally disseminated to the surrounding claimed neighborhoods based on a preference of the verified user, wherein a claimed neighborhood of the verified user is activated based on a minimum number of other verified users in the threshold distance that have been verified through a primary residential address associated with each of the other verified users through at least one of a post card verification, a utility bill verification, a privately-published access code, and a neighbor vouching method, wherein access to the emergency broadcast data is restricted to the claimed neighborhood of the verified user, and wherein access to the emergency broadcast data is denied to users having verified addresses outside the claimed neighborhood of the verified user.

\* \* \* \* \*